United States Patent
Kitagawa et al.

(10) Patent No.: US 6,817,654 B2
(45) Date of Patent: Nov. 16, 2004

(54) REINFORCING STRUCTURE FOR BODY FRAME OF VEHICLE

(75) Inventors: Yuichi Kitagawa, Kanagawa-ken (JP); Yuuichi Oki, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/337,847

(22) Filed: Jan. 8, 2003

(65) Prior Publication Data

US 2004/0201253 A1 Oct. 14, 2004

(30) Foreign Application Priority Data

| Jan. 16, 2002 | (JP) | P2002-007903 |
| Feb. 28, 2002 | (JP) | P2002-054410 |
| Apr. 17, 2002 | (JP) | P2002-115136 |
| Apr. 23, 2002 | (JP) | P2002-120714 |
| Apr. 23, 2002 | (JP) | P2002-120716 |

(51) Int. Cl.[7] .................. B62D 25/02; B62D 25/04
(52) U.S. Cl. .................. 296/187.03; 296/187.12; 296/203.03
(58) Field of Search ............ 296/187.03, 187.09, 296/187.11, 187.12, 203.01, 205, 209, 203.03, 193.03

(56) References Cited

U.S. PATENT DOCUMENTS

| 4,457,555 | A | * | 7/1984 | Draper ................... 296/181.4 |
| 4,822,096 | A | * | 4/1989 | Fujii ..................... 296/203.02 |
| 4,938,525 | A | * | 7/1990 | Yamauchi ............... 296/203.03 |
| 5,118,160 | A | | 6/1992 | Kitagawa et al. |
| 5,203,436 | A | * | 4/1993 | Wieting et al. ......... 296/187.12 |
| 5,692,797 | A | | 12/1997 | Dancasiu |
| 6,170,906 | B1 | * | 1/2001 | Kasuga ................... 296/203.02 |
| 6,378,933 | B1 | * | 4/2002 | Schoen et al. ......... 296/187.02 |
| 6,474,723 | B2 | * | 11/2002 | Czaplicki et al. ...... 296/187.02 |
| 6,523,884 | B2 | * | 2/2003 | Czaplicki et al. ...... 296/187.03 |
| 6,540,259 | B2 | * | 4/2003 | Sugimoto et al. ........ 280/751 |
| 6,578,909 | B1 | * | 6/2003 | Reed et al. ................ 296/210 |

FOREIGN PATENT DOCUMENTS

| DE | 195 18 946 | 11/1995 |
| EP | 05319301 | 12/1993 |
| EP | 11198852 | 7/1999 |
| EP | 1 149 757 | 10/2001 |
| JP | 9-11935 | 1/1997 |
| JP | 9-20267 | 1/1997 |
| JP | 9-76937 | 3/1997 |
| JP | 9-254809 | 9/1997 |
| JP | 9-263264 | 10/1997 |
| JP | 10-218017 | 8/1998 |
| JP | 11-129932 | 5/1999 |
| JP | 2000-177629 A | 6/2000 |
| JP | 2000-177631 | 6/2000 |
| JP | 2000-219152 A | 8/2000 |
| JP | 2001-151149 A | 6/2001 |
| JP | 2001-180518 | 7/2001 |

* cited by examiner

Primary Examiner—D. Glenn Dayoan
Assistant Examiner—Greg Blankenship
(74) Attorney, Agent, or Firm—McDermott Will & Emery LLP

(57) ABSTRACT

A reinforcing structure is provided to improve reinforcing effect for a body frame of a vehicle. A front pillar 10 as the body frame includes an outer member and a reinforcement 13. The reinforcing structure has a waveform adjusting mechanism 100 in addition to the outer member 11, 12 and the reinforcement 13. The waveform adjusting mechanism 100 adjusts various properties of peaks of respective waveforms in the buckling mode of the outer member 11, 12 and the reinforcement 13. The reinforcement 13 is connected to the outer member 11, 12 at its part except a minimum strength part of the outer member 11, 12. The waveform adjusting mechanism 100 is formed by the minimum strength part and a relief space S between the vicinity of the minimum strength part of the outer member and the reinforcement 13. Owing to the provision of the relief space S, it is possible to prevent a deformation of the outer member 11, 12 from transmitting to the reinforcement 13 immediately.

41 Claims, 59 Drawing Sheets

FIG. 2
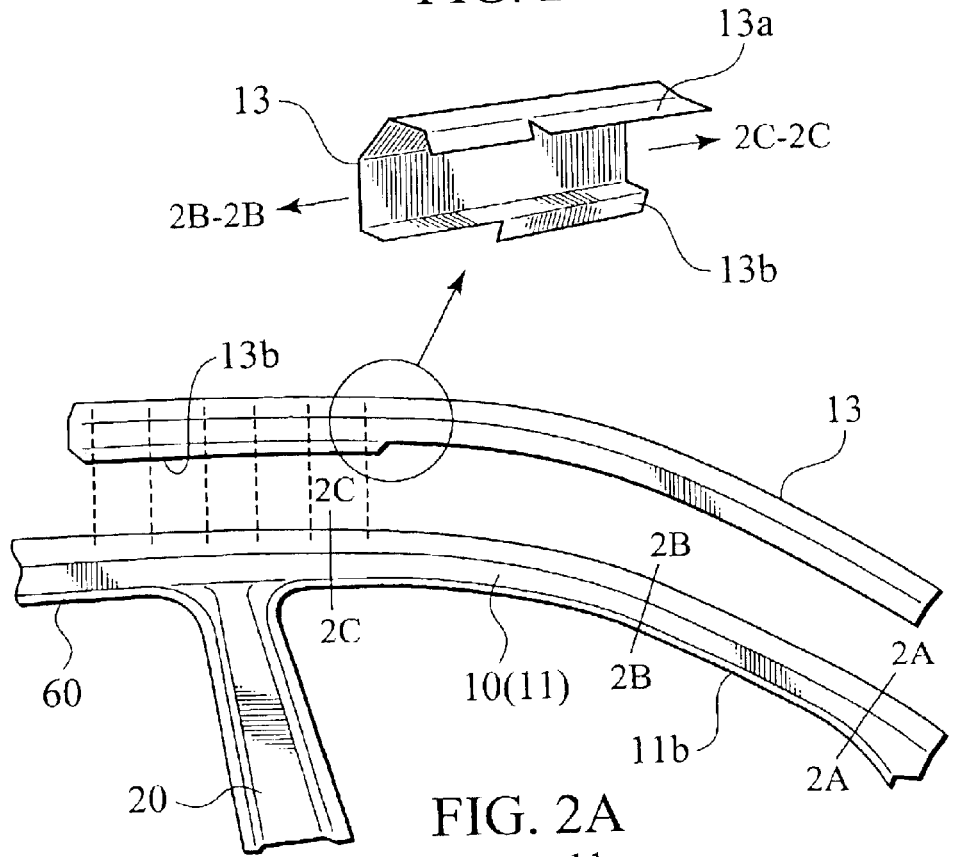
FIG. 2A
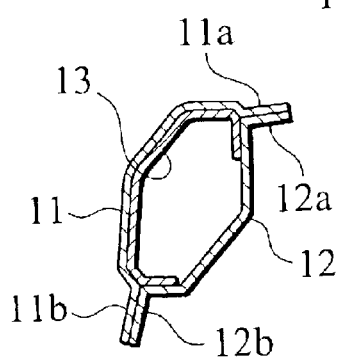
FIG. 2B
FIG. 2C
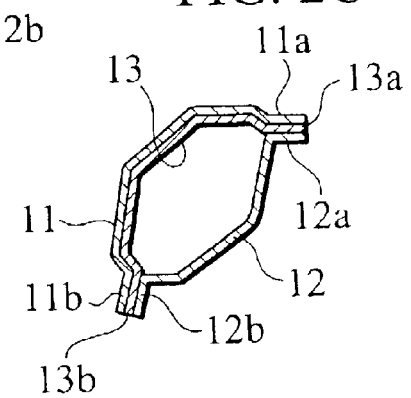

REINFORCING STRUCTURE FOR BODY FRAME OF VEHICLE

BACKGROUND OF THE INVENTION

The present invention relates to a reinforcing structure for a body frame of a vehicle.

Japanese Patent Application Laid-open No. 2001-180518 discloses a reinforcing structure for body frames of an automobile. In this reinforcing structure, a framework member as a constituent of a vehicle frame is formed by an outer member having a hollow section and a reinforcement inside the outer member. By the integral forming method, the reinforcement is shaped so as to overlap the whole inside of the outer member, thereby reinforcing it effectively and lightly.

SUMMARY OF THE INVENTION

However, as the reinforcement is configured so as to follow an uneven inside profile of the outer member, the strength distribution of an integrated element (i.e. the outer member and the reinforcement) is still unchanged in comparison with that of the outer member though its strength is improved by the addition of the reinforcement. Therefore, as to the position of folding deformation, there is no difference between the outer member with the reinforcement and the outer member with no reinforcement. That is, despite the whole area of the outer member being covered with the reinforcement, it merely has effect to reinforce such a deformable part(s) of the outer member, exhibiting an ineffective reinforcing effect.

In such a situation, it is an object of the present invention to provide a reinforcing structure for a body frame, which allows respective buckling modes of the outer member and also the reinforcement to be established suitably, thereby improving the reinforcing effect with neither increasing a plate thickness of the outer member nor adding any other reinforcing means.

According to the present invention, the above-mentioned object is accomplished by a reinforcing structure for a body frame of a vehicle, comprising:

a hollow outer member arranged on an exterior side of the vehicle;

a reinforcement arranged inside the outer member to extend in the longitudinal direction of the outer member; and a waveform adjusting mechanism for adjusting respective peaks of waveforms in the buckling mode of the outer member and the reinforcement.

BRIEF DESCRIPTION OF THE DRAWINGS

FIG. 2 is an exterior side view of a reinforcing structure in accordance with a first embodiment of the invention, FIG. 2A is a sectional view taken along a line 2A—2A of FIG. 2, FIG. 2B is a sectional view taken along a line 2B—2B of FIG. 2 and FIG. 2C is a sectional view taken along a line 2C—2C of FIG. 2;

DESCRIPTION OF THE PREFERRED EMBODIMENT

Referring to accompanying drawings, various embodiments of the present invention will be described below. The following descriptions are divided broadly into five embodiments each containing various modifications. In advance of describing these embodiments, we first describe a body frame of an automobile to which the present invention is to be applied.

Figure 1:
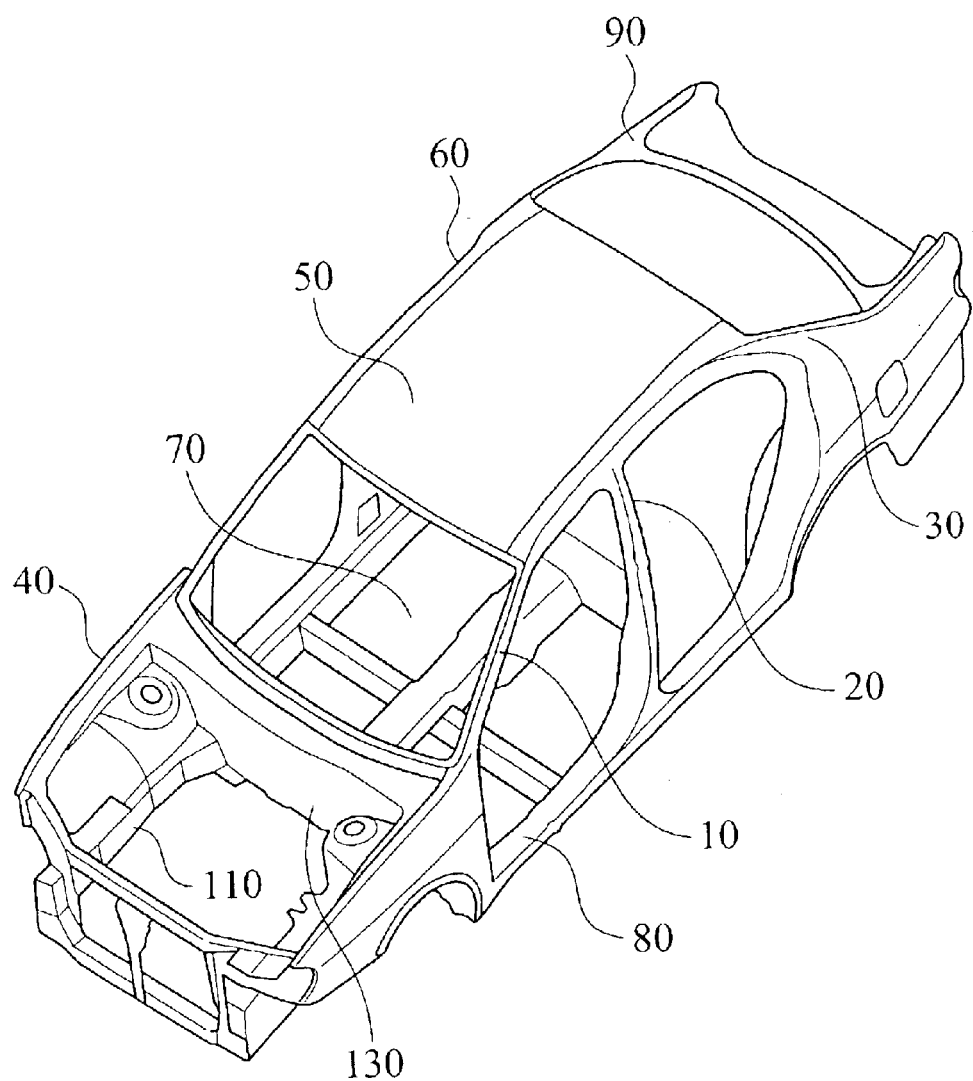
FIG. 1 is a perspective view showing a body frame of an automobile, to which the present invention is applied.

FIG. 1 shows the body frame of an automobile. In this figure, reference numeral 10 designates a front pillar which connects a rear end of a hood ridge member 40 on the front side of a vehicle with a front end of a roof rail 60 on one side of a cabin ceiling 50, obliquely in the fore-and-aft direction of the vehicle. A center pillar 20 connects a substantial center of the roof rail 60 with a substantial center of a body side sill 80 on each side of a floor panel 70.

A rear pillar 30 connects the rear end of the roof rail 60 with a front end of a trunk ridge member 90 on the rear side of the vehicle.

These framework members are provided in common with general automobiles.

[1st. Embodiment]

The first embodiment and the modifications will be described with reference to FIGS. 1 to 18. In advance of describing the constitution of the invention, the structure of a general front pillar is described as an comparative example of the invention with reference to FIGS. 17, 18 and the others.

Figure 17:
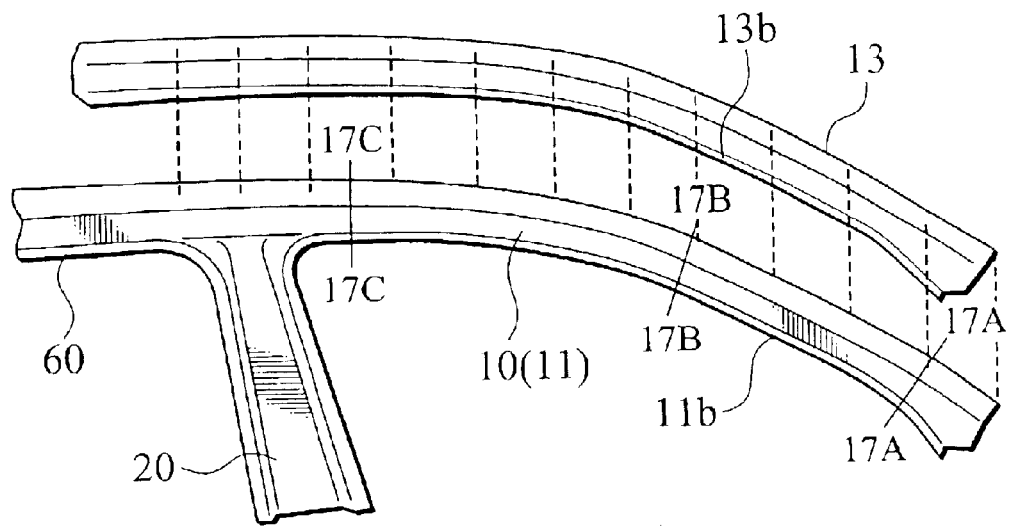
FIG. 17 is an exterior side view of a reinforcing structure of an example for comparison with the first embodiment of the present invention.
Figure 17A:
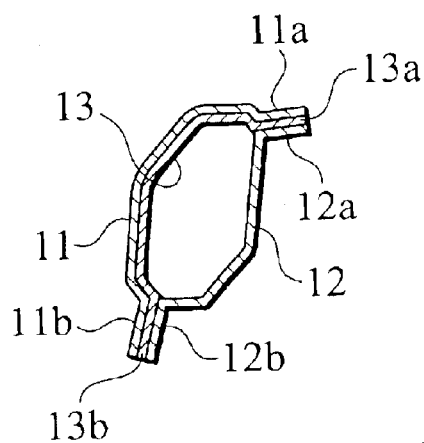
FIG. 17A is a sectional view taken along a line 17A—17A of FIG. 17.
Figure 17B:
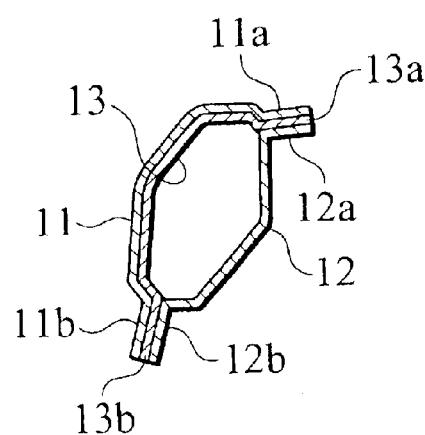
FIG. 17B is a sectional view taken along a line 17B—17B of FIG. 17
Figure 17C:
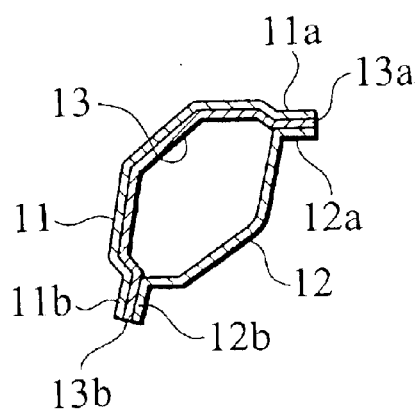
FIG. 17C is a sectional view taken along a line 17C—17C of FIG. 17.

FIG. 17 is an exterior side view of a general front pillar structure and FIGS. 17A to 17C are respective sectional views of the FIG. 17.

As an outer member of the invention, there is provided a pillar body which is indicated by the same reference numeral as the front pillar 10 (FIG. 1). The pillar body 10 is formed by a pillar outer piece 11 and a pillar inner piece 12, each of which is in the form of a sheet of panel. The pillar body 10 has a closed section obtained by spot-welding respective flange parts 11a, 11b of the pillar outer piece 11 with respective flange parts 12a, 12b of the pillar inner piece 12, respectively.

Noted that the pillar inner piece 12 is not shown in FIG. 17 because it is an exterior side view of the vehicle body. Although a reinforcement 13 inside the pillar body 10 could not be seen from the outside of the vehicle body essentially, FIG. 17 shows the reinforcement 13 in parallel with the pillar body 10, for ease of understanding.

The whole reinforcement 13 is shaped so as to follow the inner wall of the pillar outer piece 11 of the pillar body 10. The reinforcement 13 is joined to the pillar outer piece 11 and the pillar inner piece 12 by means of spot-welding while respective flange parts 13a, 13b are pinched between the flange parts 11a, 11b of the pillar outer piece 11 and the flange parts 12a, 12b of the pillar inner piece 12, respectively.

Broken lines in FIG. 17 denote welding positions of these members in brief. FIG. 17A is a sectional view taken along a line 17A—17A of FIG. 17 in the vicinity of the front end of the pillar body 10. FIG. 17B is a sectional view taken along a line 17B—17B of FIG. 17 in the vicinity of the longitudinal center of the pillar body 10. FIG. 17C is a sectional view taken along a line 17C—17C of FIG. 17 in the vicinity of the rear end of the pillar body 10. With reference to these figures, it will be understood that the flange part 13a of the reinforcement 13 is pinched between the flange part 11a of the pillar outer piece 11 and the flange part 12a of the pillar inner piece 12, while the flange part 13b of the reinforcement 13 is pinched between the flange part 11b of the pillar outer piece 11 and the flange part 12b of the pillar inner piece 12.

Figure 18:
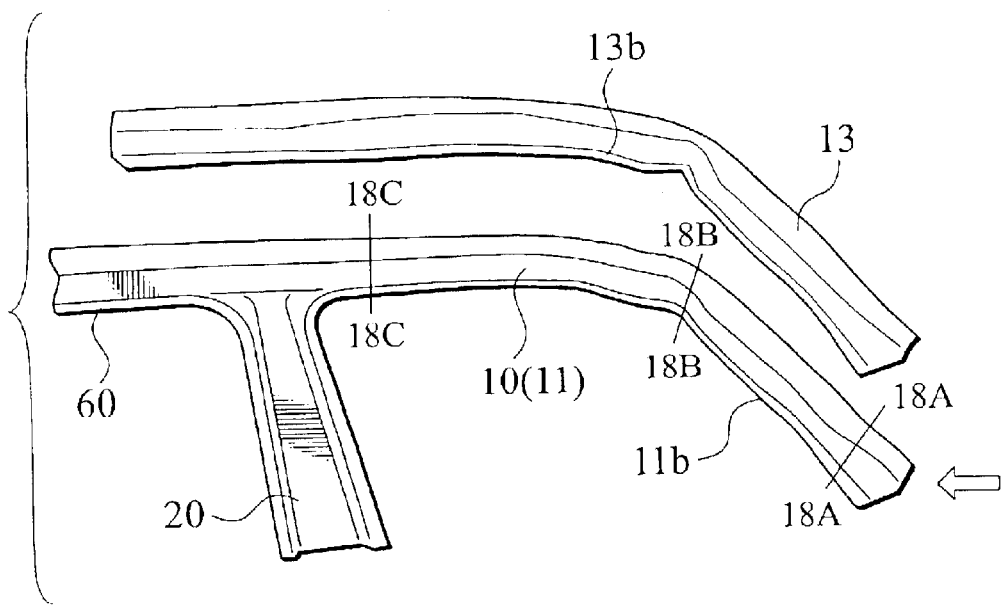
FIG. 18 is an exterior side view of the deformed reinforcing structure of the example of FIG. 17.
Figure 18A:
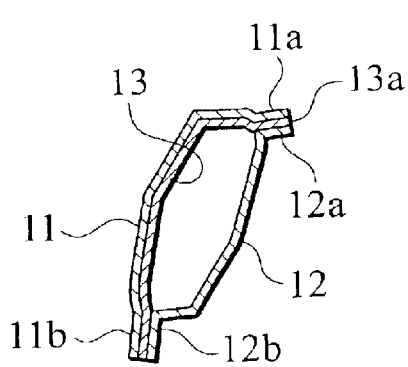
FIG. 18A is a sectional view taken along a line 18A—18A of FIG. 18.
Figure 18B:
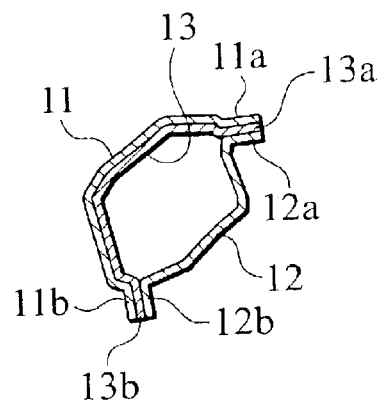
FIG. 18B is a sectional view taken along a line 18B—18B of FIG. 18
Figure 18C:
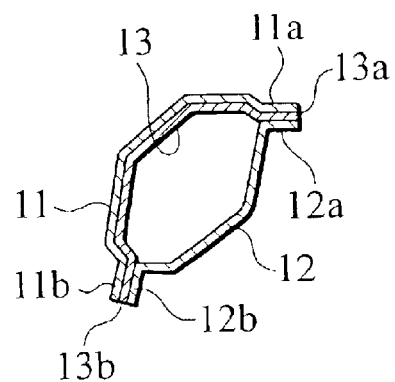
FIG. 18C is a sectional view taken along a line 18C—18C of FIG. 18.

FIG. 18 shows a condition that the above-mentioned front pillar structure is deformed due to a vehicle collision.

According to the structure of this comparative example, as a result that the vicinity of the front end (section 18A—18A) of the pillar body 10 moves back in a direction of arrow by the front collision, there is produced a folding deformation in the vicinity of the longitudinal center of the pillar body 10 (section 18B—18B).

The reason why the folding deformation is caused near the longitudinal center of the pillar body 10 is that the front end of the pillar body 10 is different from the rear end in terms of its sectional profile and that the second moment of area is greatly changed in the vicinity of the longitudinal center of the pillar body 10, providing a minimum strength part.

Although the bending strength of the pillar body 10 is reinforced by the inside reinforcement 13, the deformation produced near the longitudinal center (section 18B—18B) of the pillar body 10 causes the flange parts 13a, 13b of the reinforcement 13 to be simultaneously deformed through the flange parts 11a, 12a since the pillar body 10 comes in close contact with the reinforcement 13. Thus, the reinforcement 13 is also deformed at the same position (vicinity of section 18B—18B) as that of the pillar body 10.

Figure 4:
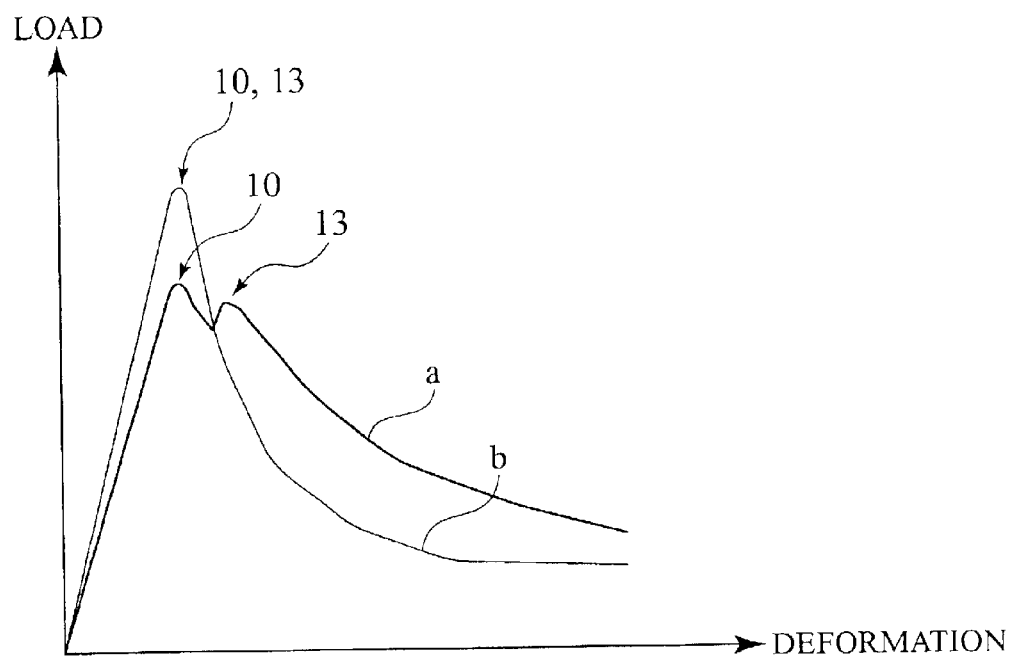
FIG. 4 is a graph showing a load change curve of the reinforcing structure of the first embodiment at a collision and also showing a comparative example.

A load-deformation curve of the above-mentioned front pillar as a whole is illustrated with a line (b) of FIG. 4. At a maximum peak point of the load, the pillar body 10 and the reinforcement 13 begin to be deformed substantially simultaneously. Consequently, although the front pillar exhibits a maximum of load increased by the provision of the reinforcement 13, a bearing force of the pillar is abruptly reduced as soon as exceeding its limiting value because of the simultaneous deformations of the body 10 and the reinforcement 13.

FIGS. 2, 2A, 2B and 2C show the first embodiment of the present invention. In these figures, elements identical to those of the above-mentioned comparative example are indicated with the same reference numerals, respectively.

Similarly, the pillar body 10 is formed by the pillar outer piece 11 and the pillar inner piece 12, each of which is in the form of a sheet of panel. The pillar body 10 is formed with a closed section obtained by spot-welding the flange parts 11a, 11b of the pillar outer piece 11 with the flange parts 12a, 12b of the pillar inner piece 12, respectively.

The reinforcement 13 is arranged inside the pillar body 10 and shaped so as to follow the inner wall of the pillar outer piece 11 of the pillar body 10 generally.

Broken lines in FIG. 2 denote welding positions of these members. According to the embodiment, the reinforcement 13 is provided, only in the vicinity of the rear end (i.e. near the section 2C—2C), with the flange parts 13a, 13b. That is, only near the section 2C—2C out of the minimum strength portion of the pillar body 10, the flange part 13a of the reinforcement 13 is pinched between the flange part 11a of the pillar outer piece 11 and the flange part 12a of the pillar inner piece 12, while the flange part 13b of the reinforcement 13 is pinched between the flange part 11b of the pillar outer piece 11 and the flange part 12b of the pillar inner piece 12.

In the frontal portion of the reinforcement 13 (i.e. from the section 2A—2A to the section 2B—2B), it has no flange part and merely comes into contact with the inner face of the pillar outer piece 11.

In order to increase the number of ridgelines thereby ensuring a sufficient rigidity, however, respective margins (both edges) of the reinforcement 13 are formed to pass over the welding part of the flange parts 11a, 12a and 11b, 12b and have a substantial C-shaped cross section, so that the reinforcement's lateral direction facilitating its deformation in section agrees with a bending direction of the pillar body 10.

The boundary between the reinforcement's portion having the above-mentioned margins and the other portion having the flange parts 13a, 13b is positioned in somewhat front of the section 2C—2C. As shown in an enlarged part of FIG. 2, the C-shaped cross section is formed by slitting the flange parts 13a, 13b of the reinforcement 13 and subsequently folding back them.

In this way, since the reinforcement 13 is partially welded to the part of the pillar body 10 except the minimum strength part and the direction to facilitate the deformation of the closed section of the reinforcement 13 agrees with the bending direction of the pillar body 10, there is defined a dynamic relief space S (see the section 3B—3B of FIG. 3) between the pillar body 10 and the reinforcement 13, against the bending deformation.

Therefore, according to the first embodiment, both of the minimum strength part of the pillar body 10 and the relief space S between the pillar body 10 and the reinforcement 1 form a waveform adjusting mechanism 100 for adjusting respective peaks of waveforms in the buckling mode of the outer member (pillar body 10) and the reinforcement 13.

Figure 3:
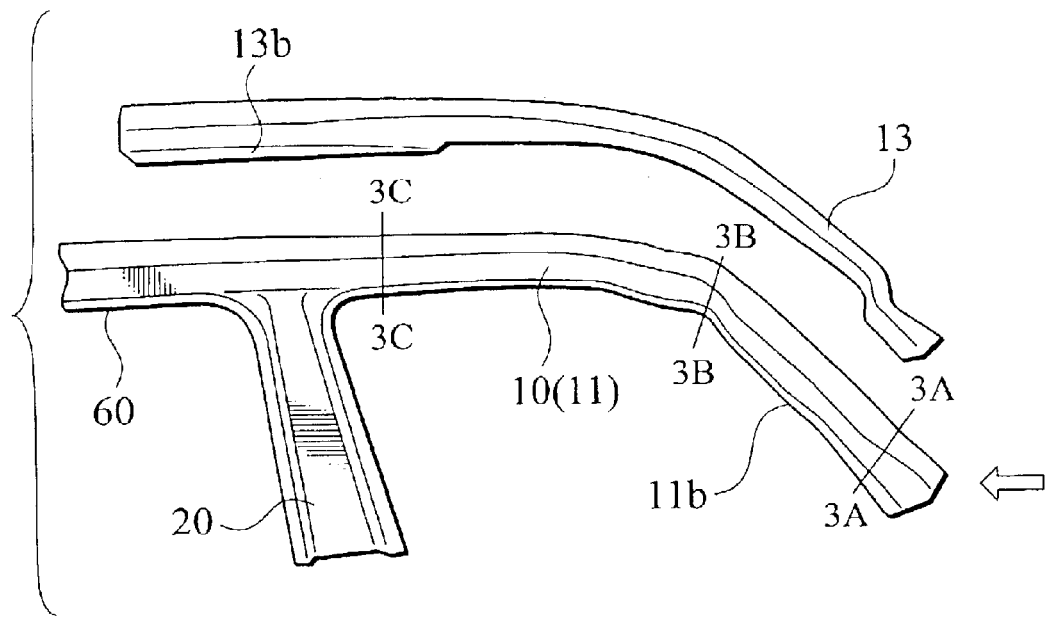
FIG. 3 is an exterior side view of the deformed reinforcing structure of is the first embodiment.
Figure 3A:
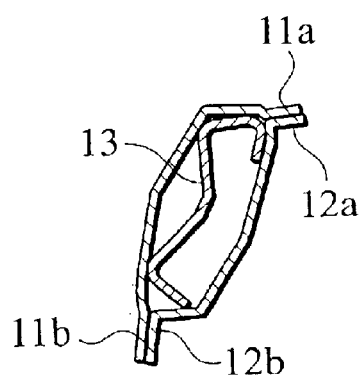
FIG. 3A is a sectional view taken along a line 3A—3A of FIG. 3.

FIG. 3 shows a condition that the front pillar structure of this embodiment is deformed at a vehicle collision.

Also in the structure of this embodiment, as similar to the before-mentioned comparative example, the pillar body 10 has a bending deformation in the vicinity of the longitudinal center (near the section 3B—3B) corresponding to a changing part in the secondary moment area.

Since the pillar body 10 is not welded to the reinforcement 13 into close contact at this area, the reinforcing effect of the reinforcement 13 is smaller than that in the comparative example and the maximum load value is lowered as shown with a line (a) of FIG. 4.

Figure 3B:
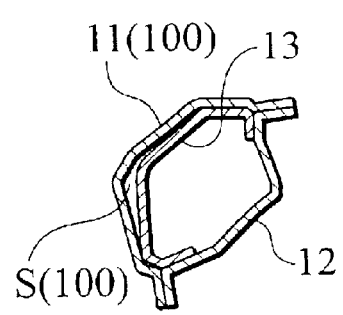
FIG. 3B is a sectional view taken along a line 3B—3B of FIG. 3
Figure 3C:
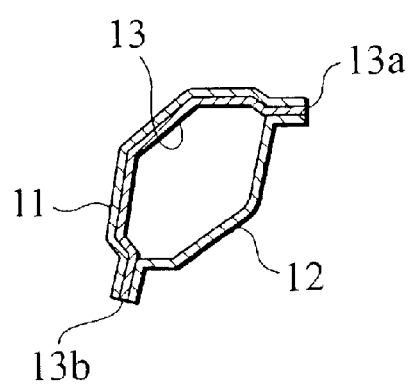
FIG. 3C is a sectional view taken along a line 3C—3C of FIG. 3.

Nevertheless, due to the formation of the dynamic relief space S, a deformation generated near the minimum strength part of the pillar body 10 does no more than compressing the closed section of the reinforcement 13 slightly as shown in FIG. 3B and does not cause an overall bending deformation of the reinforcement 13 at this minimum strength part.

Or rather, a bending deformation is caused in the vicinity of the leading end (near the section 3A—3A) close to the collision end. That is, even if a bending deformation is produced in the pillar body 10, the deformation does not induce the bending deformation of the reinforcement 13.

Consequently, as shown with the line (a) of FIG. 4, as soon as the pillar body 10 is deformed, a load does not decrease abruptly but decreases since the reinforcement 13 begins to be deformed. In other words, it is possible to delay the reduction in load after a load inputted to the pillar body 10 has exceeded its limit.

Here noted that since the first embodiment of the invention is directed to the pillar body 10 resulting from welding two sheets of panel members (the pillar outer piece 11 and the pillar inner piece 12) with other, the structure of the first embodiment is applicable to a monocoque body structure employed in various cars.

Further, since the changing part in the secondary moment area of the pillar body 10 is regarded as the minimum strength part, the structure of the embodiment can cope with various pillar configurations designed in views of not only its rigidity but also design and viewing-ability.

Additionally, since the inside reinforcement 13 is welded to the other part except the minimum strength part of the pillar body 10, it is possible to prevent the minimum strength part of the reinforcement 13 from agreeing with that of the pillar body 10 and also possible to allow the deformation of the pillar body 10 to be transmitted to the reinforcement 13 with difficulty.

(1st. Modification)

Figure 5:
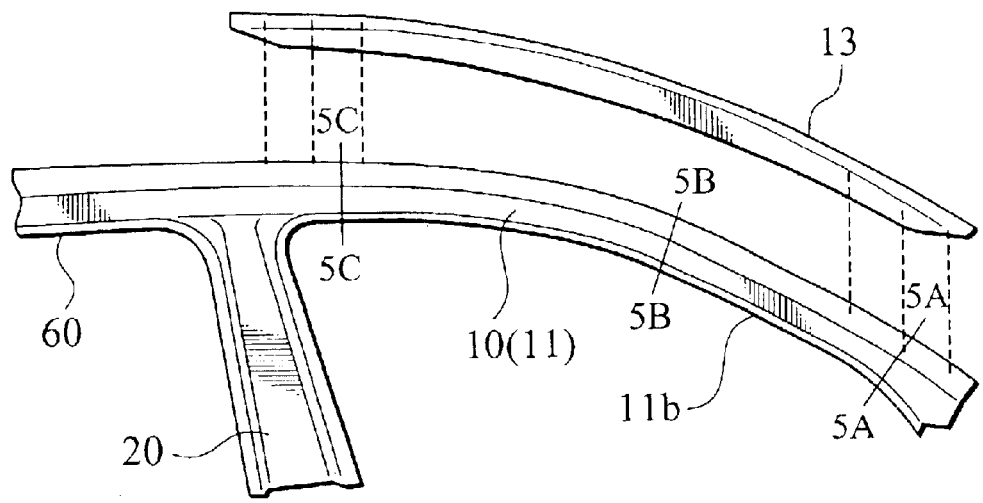
FIG. 5 is an exterior side view of the reinforcing structure in a first modification of the first embodiment of the invention.
Figure 5A:
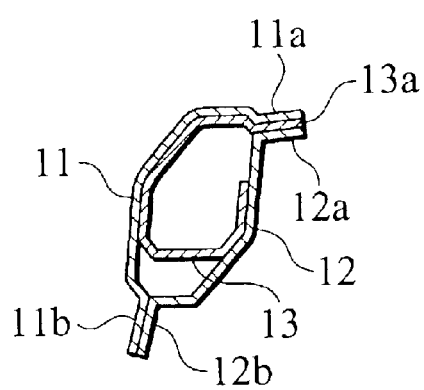
FIG. 5A is a sectional view taken along a line 5A—5A of FIG. 5.
Figure 5B:
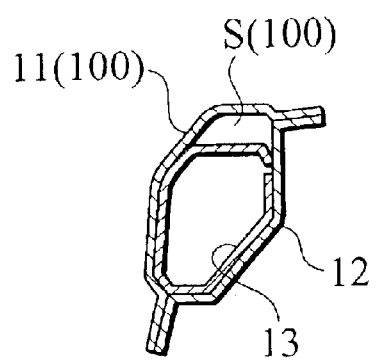
FIG. 5B is a sectional view taken along a line 5B—5B of FIG. 5
Figure 5C:
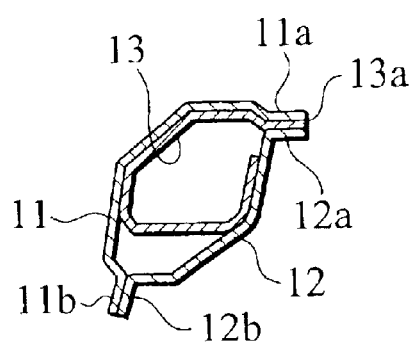
FIG. 5C is a sectional view taken along a line 5C—5C of FIG. 5.

FIG. 5 shows the first modification of the first embodiment.

Also in this modification, the pillar body 10 is formed by the pillar outer piece 11 and the pillar inner piece 12, each of which is in the form of a sheet of panel. The pillar body 10 is formed with a closed section obtained by spot-welding the flange parts 11a, 11b of the pillar outer piece 11 with the flange parts 12a, 12b of the pillar inner piece 12, respectively.

According to the first modification, the reinforcement 13 inside the pillar body 10 is formed with a radius of curvature larger than that of the pillar body 10.

That is, in common with the vicinity of the front end (the section 5A—5A) and the vicinity of the rear end (the section 5C—5C), a clearance inside in the radial direction of the curvature is defined between the reinforcement 13 and the inner wall of the pillar body 10, while a clearance outside in the radial direction of the curvature is defined between the reinforcement 13 and the inner wall of the pillar body 10 in the vicinity of the center (the section 5B—5B) as the minimum strength part, thereby providing a relief space S against the bending deformation.

Further, only in the vicinity of the front end (the section 5A—5A) and the vicinity of the rear end (the section 5C—5C), the reinforcement 13 has the flange part 13a pinched between the flange part 11a of the pillar outer piece 11 and the flange part 12a of the pillar inner piece 12.

In the vicinity of the center (the section 5B—5B) having no flange part, the reinforcement 13 is formed with a substantial C-shaped cross section. Respective margins (both edges) of the reinforcement 13 are formed to pass over the welding part of the flange parts 11a, 12a and 11b, 12b of the pillar body 10.

Figure 6:
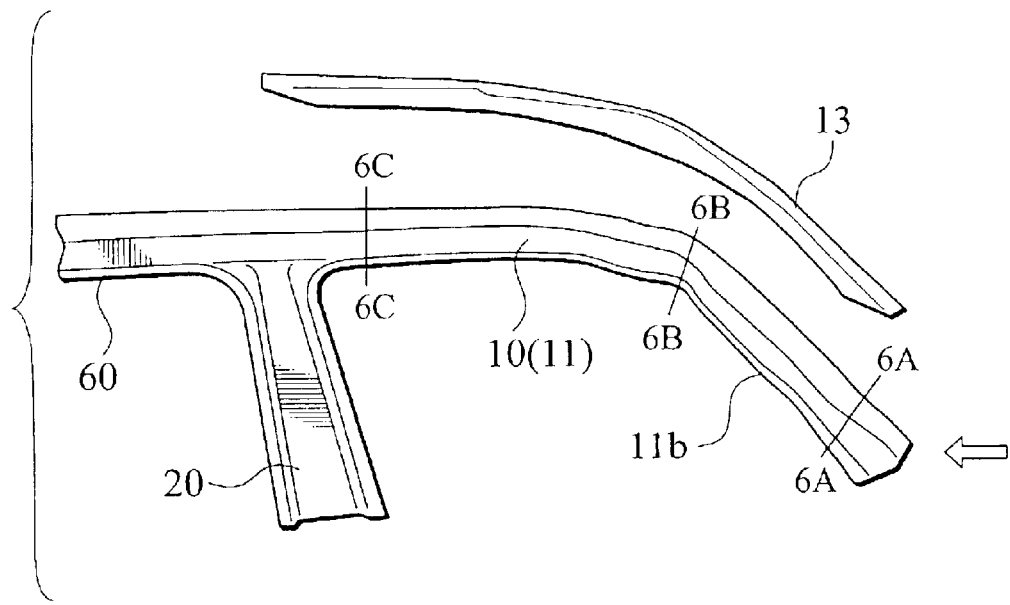
FIG. 6 is an exterior side view of the deformed reinforcing structure of the first modification of the first embodiment.
Figure 6A:
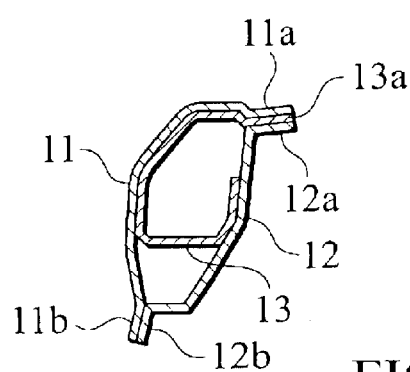
FIG. 6A is a sectional view taken along a line 6A—6A of FIG. 6.
Figure 6B:
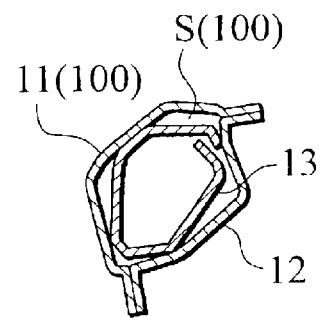
FIG. 6B is a sectional view taken along a line 6B—6B of FIG. 6
Figure 6C:
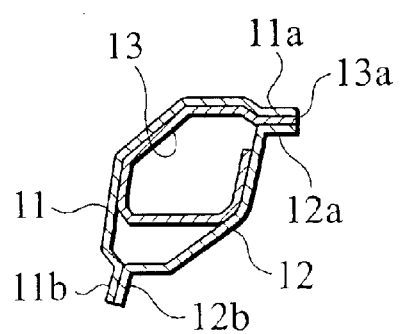
FIG. 6C is a sectional view taken along a line 6C—6C of FIG. 6.

FIG. 6 shows a condition that the front pillar structure of this modification is deformed at a vehicle collision.

Also in the structure of this modification, the pillar body 10 has a bending deformation in the vicinity of the longitudinal center (near the section 6B—6B) corresponding to a changing part in the secondary moment area.

The bending strength of the pillar body 10 is reinforced by the reinforcement 13. However, since the pillar body 10 is not welded to the reinforcement 13 in the vicinity of the longitudinal center (near the section 6B—6B), the reinforcing effect of the reinforcement 13 is smaller than that in the comparative example.

Nevertheless, due to the formation of the dynamic relief space S against the bending deformation at such a non-welding area, a deformation generated near the minimum strength part of the pillar body 10 moves outside in the radial direction of the curvature relatively without almost causing the section of the reinforcement 13 to be deformed. That is, the sectional deformation produced in the pillar body 10 is absorbed by the relief space S, whereby it is possible to prevent the reinforcement 13 from being compressed immediately.

Consequently, a load in producing the bending deformation in the vicinity of the section 6B—6B of the pillar body 10 is born by the rigidity for bending of the reinforcement's part between two positions (vicinities of the sections 6A—6A, 6C—6C) where the reinforcement 13 is welded to the pillar body 10.

Figure 7A:
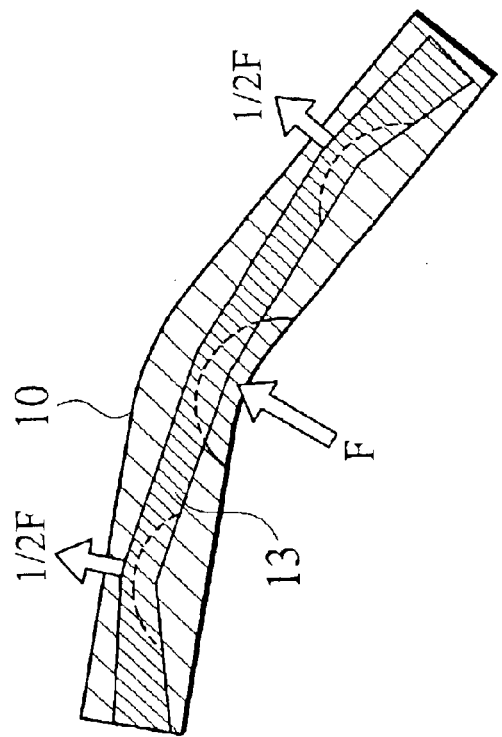
FIGS. 7A and 7B are conceptual views showing respective deformation modes of the reinforcing structure of the first modification and a comparative example at a collision.
Figure 7B:
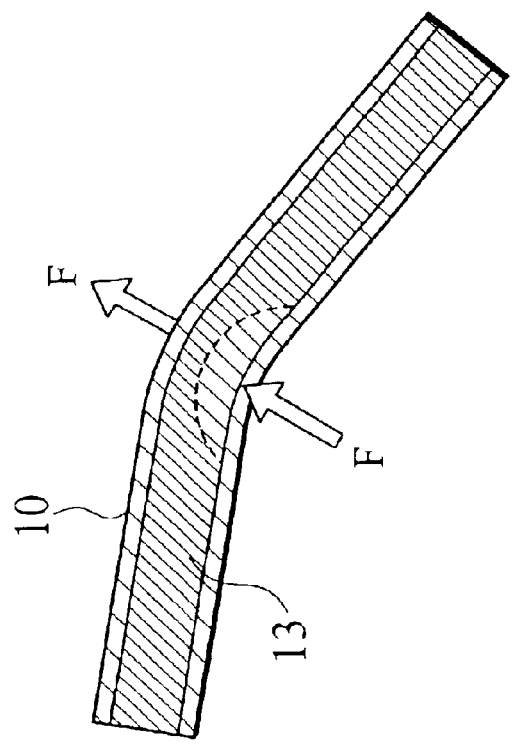

FIGS. 7A and 7B are conceptual views showing respective deformation modes of the reinforcing structure of the first modification and a comparative example at a collision. As shown in FIG. 7A, in the comparative example where the pillar body 10 comes into close contact with the reinforcement, a load F for bending the pillar body 10 and the resultant deformation are directly transmitted to the reinforcement 13. Consequently, the reinforcement 13 is deformed at the same position as the deformed part of the pillar body 10.

FIG. 7B shows the deformation mode of the first modification schematically. In the vicinity of the minimum strength part of the pillar body 10, it does not come into close contact with the reinforcement 13, while the reinforcement 13 is welded to the pillar body 10 at its front and rear ends except the minimum strength part. Thus, since the above load F and the resultant deformation are transmitted to the reinforcement 13 while being dispersed into two welding parts (with ½ of F), the reinforcement 13 still generates a resistant force even after the pillar body 10 has been deformed.

Figure 8:
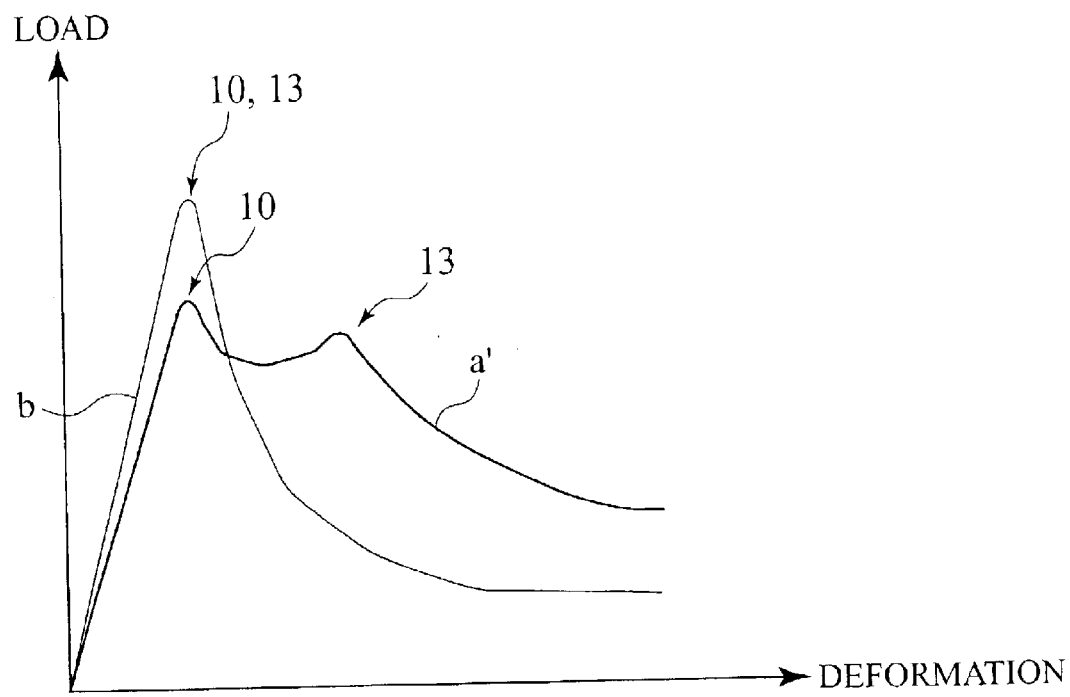
FIG. 8 is a graph showing a load change curve of the reinforcing structure of the first modification at a collision and also showing a comparative example.
Figure 9:
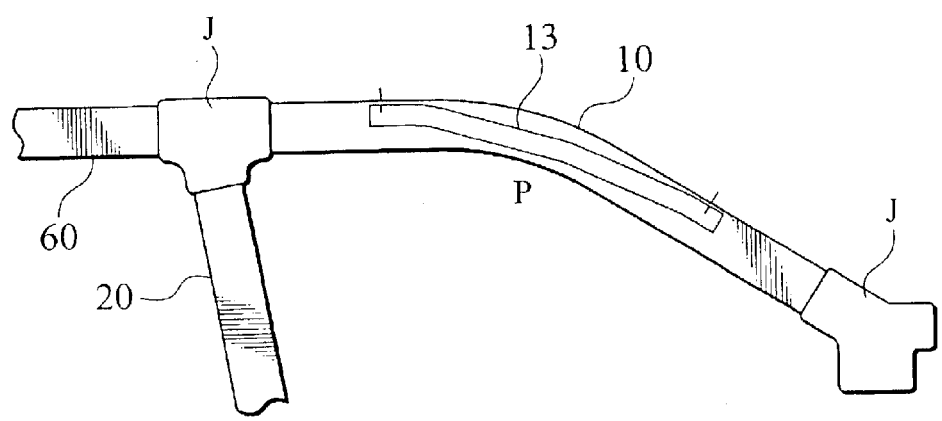
FIG. 9 is an exterior side view of the reinforcing structure in a second modification of the first embodiment of the invention.
Figure 10:
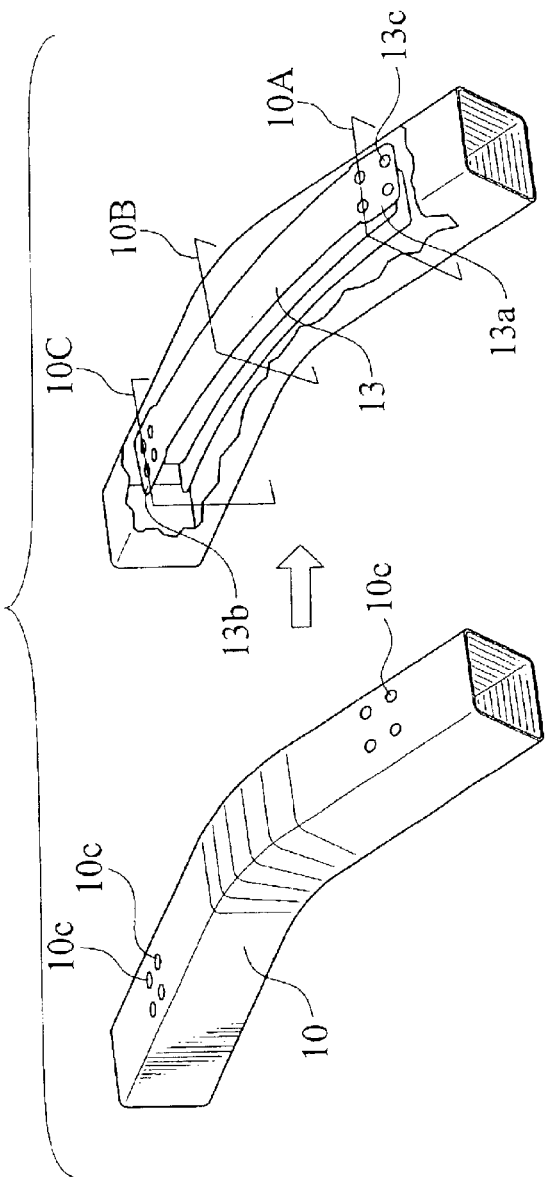
FIG. 10 is an exterior perspective view showing main parts of the reinforcing structure of the second modification.
Figure 10A:
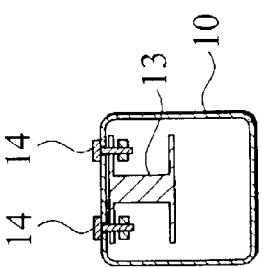
FIG. 10A is a sectional view taken along a line 10A of FIG. 10.
Figure 10B:
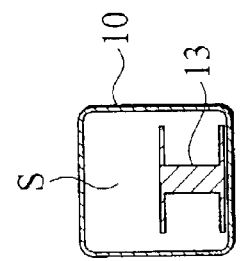
FIG. 10B is a sectional view taken along a line 10B of FIG. 10
Figure 10C:
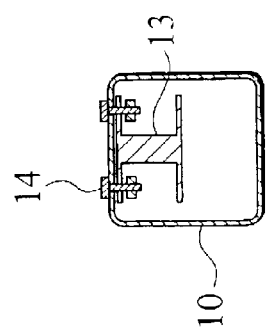
FIG. 10C is a sectional view taken along a line 10C of FIG. 10.

FIG. 8 is a graph showing the load-deformation curve of the structure of the first modification. As shown with a line (a'), since the reinforcement 13 of the structure of the first modification can generate a resistant force even after the pillar body 10 has reached its limit, it is possible to restrict the abrupt reduction of a load and also possible to maintain a relatively high load for a while.

In this way, according to the first modification of the first embodiment, since the reinforcement 13 is formed with a different curvature from the curvature of the pillar body 10, the minimum strength part of the former is arranged in a different position from the position of the minimum strength part of the latter, so that respective bending deformations of the reinforcement 13 and the pillar body 10 arise in their positions apart from each other. Further, since there is defined, near the minimum strength part of the pillar body 10, a relief space S of a physical clearance between the pillar body 10 and the reinforcement 13, the sectional deformation on the pillar body 10 is absorbed by the relief space S, whereby it is possible to prevent the pillar body 10 from compressing the reinforcement 13 immediately.

(2nd. Modification)

FIGS. 9, 10, 10A to 10C show the second modification of the first embodiment of the present invention.

According to this modification, the pillar body 10 is formed by a pipe member having a rectangular section, such as an aluminum extrusion. The so-formed pillar body 10 has its front and rear ends inserted into cast joints J. That is, the pillar body 10 of this modification is joined to other framework members through the cast joints J. The intermediate portion of the pillar body 10 is curved.

The reinforcement 13 is formed by a H-shaped structural steel. Regarding an inflection point P in the vicinity of the longitudinal center of the pillar body 10 as the minimum strength part, the reinforcement 13 is arranged so in the pillar body 10 as to stride over the inflection point P.

The reinforcement 13 is also curved to have a uniform curvature as a whole. The curvature of the reinforcement 13 is established to be larger than that of the pillar body 10.

That is, as similar to the first modification, a clearance inside in the radial direction of the curvature is defined between the reinforcement 13 and the inner wall of the pillar body 10, near the front and rear ends of the pillar body 10 each. While, in the vicinity of the inflection point P, a clearance outside in the radial direction of the curvature is defined between the reinforcement 13 and the inner wall of the pillar body 10, thereby providing a relief space S against the bending deformation.

The reinforcement 13 is provided, at the front and rear ends, with the flange parts 13a, 13b for contact with the inner wall of the pillar body 10. Each of the flange parts 13a, 13b has a plurality of threaded holes 13c formed therein.

Correspondingly, the pillar body 10 has a plurality of holes 10c formed at respective positions corresponding to the threaded holes 13c. With the above-mentioned structures of the pillar body 10 and the reinforcement 13, both ends of the reinforcement 13 in the longitudinal direction are fixed on the pillar body 10 by means of bolts 104.

Figure 11:
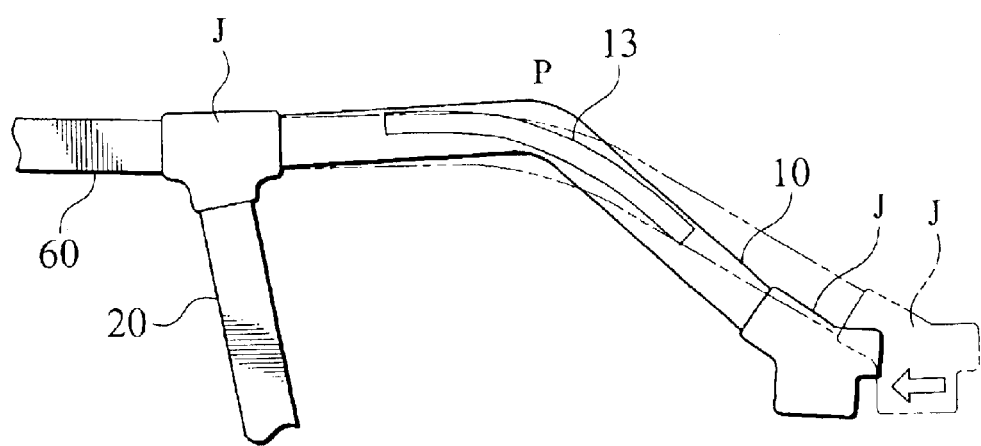
FIG. 11 is an exterior side view of the deformed reinforcing structure of the second modification of the first embodiment.

FIG. 11 shows a condition that the front pillar structure of this modification is deformed by a vehicle collision.

The pillar body 10 is subjected to a bending deformation, at the inflection point P near the curved central portion of the body 10.

With the progress of bending deformation on the pillar body 10, the reinforcement 13 is also curved. Nevertheless, since the pillar body 10 does not sticks to the reinforcement 13 in the vicinity of the center part (i.e. the section 10B—10B of FIG. 10), a resistant force of the reinforcement 13 is transmitted to the pillar body 10 through the intermediary of the flange parts 13a, 13b on both ends of the reinforcement 13.

That is, although the minimum strength part of the pillar body 10 is identical to the vicinity of the center (i.e. the inflection point P) in the original condition, the deformation load is dispersed to three parts, i.e., one inflection point P (at the section 10B—10B) and two welding points (at the sections 10A—10A, 10C—10C) on both ends of the reinforcement 13 once the bending deformation has been started. At the section 10B—10B, a deformation about the pillar body 10 relatively moves outward in the radial direction of the curvature without allowing the section of the reinforcement 13 at the same position to be deformed. Then, the sectional deformation of the pillar body 10 is absorbed by the above relief space S, thereby preventing the reinforcement 13 from being compressed immediately.

Consequently, it is possible to restrict an occurrence of phenomenon where the strength of the pillar abruptly decreases after the pillar body 10 has reached its limit,.

Additionally, owing to the adoption of H-shaped steel as the reinforcement 13, it is possible to enhance its resistant force against the bending deformation in spite of its lightweight structure.

Additionally, since the pipe member, such as extrusion, is employed as the pillar body 10, the pillar structure of this modification is applicable to a so-called "space-frame" body which is used in a small group of vehicles.

According to this modification, both front end and rear end of the reinforcement 13 are fixed to the pillar body 10 through the flange parts 13a, 13b. Alternatively, the flange parts 13a, 13b may be pressed on the inner wall of the pillar body 10 simply. Then, since the flange parts 13a, 13b can slip on the inner wall of the pillar body 10, it is possible to allow a bending deformation on the pillar body 10 to be directly transmitted to the reinforcement 13 with difficulty.

(3rd. Modification)

Figure 12:
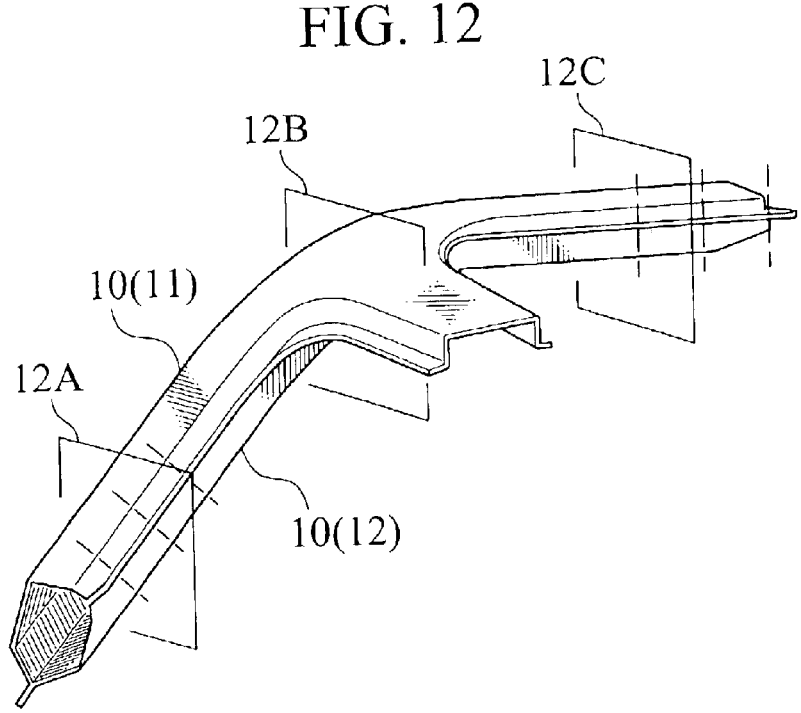
FIG. 12 is a perspective view of the reinforcing structure in a third modification of the first embodiment of the invention.
Figure 12A:
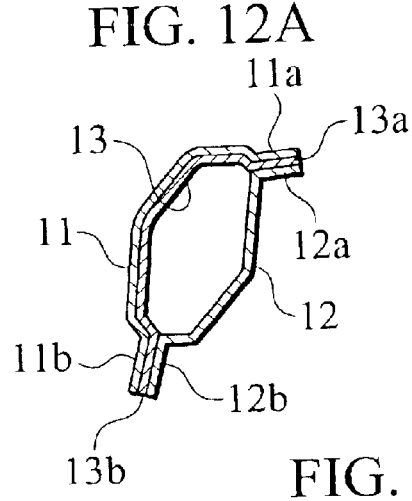
FIG. 12A is a sectional view taken along a line 12A of FIG. 12.
Figure 12B:
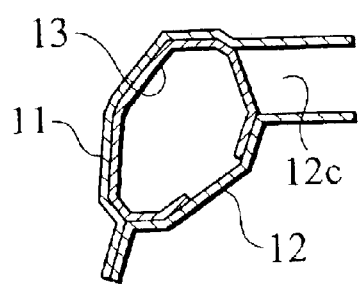
FIG. 12B is a sectional view taken along a line 12B of FIG. 12
Figure 12C:
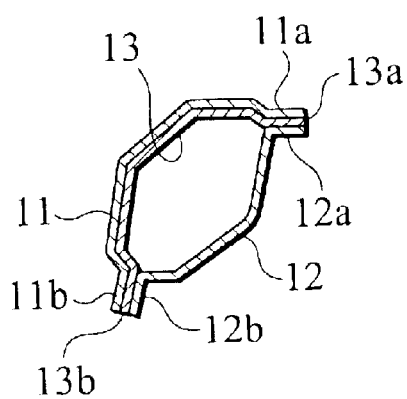
FIG. 12C is a sectional view taken along a line 12C of FIG. 12.
Figure 13:
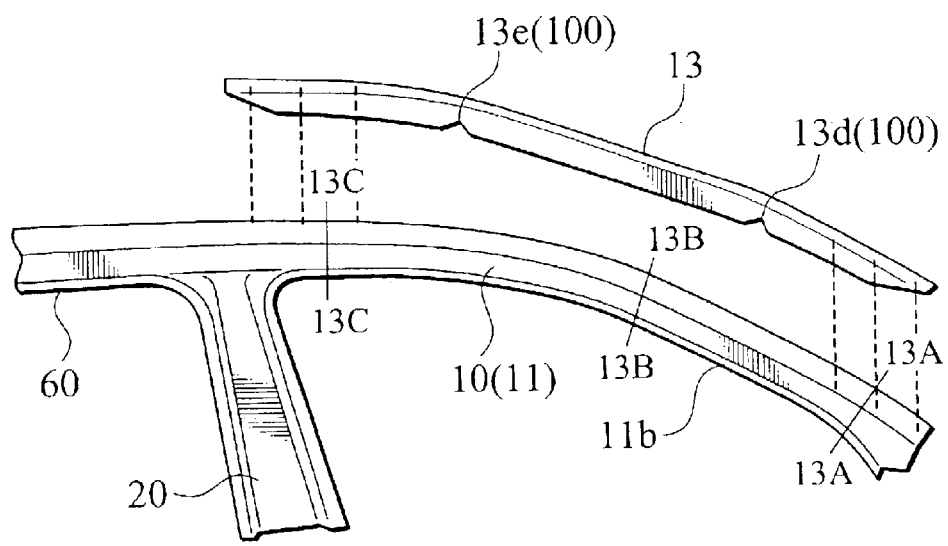
FIG. 13 is an exterior side view of the reinforcing structure in a fourth modification of the first embodiment of the invention.
Figure 13A:
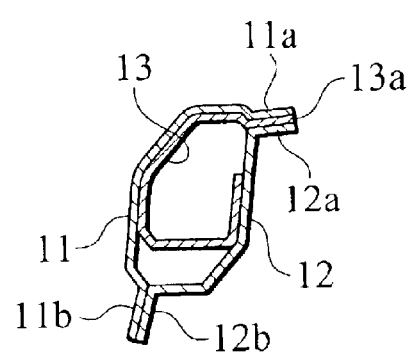
FIG. 13A is a sectional view taken along a line 13A of FIG. 13.
Figure 13B:
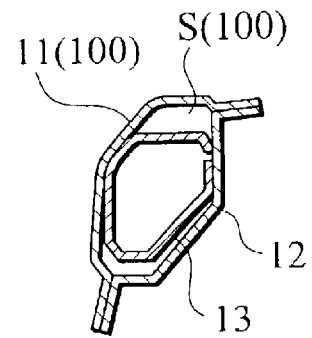
FIG. 13B is a sectional view taken along a line 13B of FIG. 13
Figure 13C:
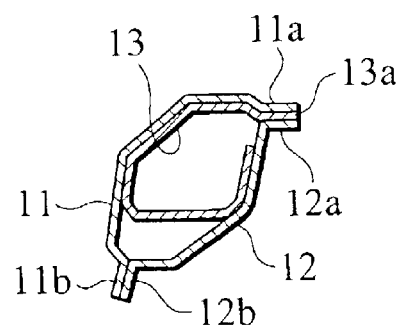
FIG. 13C is a sectional view taken along a line 13C of FIG. 13.

FIG. 12 shows the third modification of the first embodiment of the present invention.

Although the constitution of the pillar structure of the modification is similar to that of the first embodiment, the pillar body 10 is provided, near the center (the vicinity of the section 12B—12B), with a three-forked structure for connection with another framework member, forming an opening 12c on the side of the pillar inner piece 12.

Similarly to that of the first embodiment, the reinforcement 13 of this modification is also shaped so as to follow the inner wall of the pillar outer piece 11 of the pillar body 10 generally. The reinforcement 13 is provided, only in the vicinities of the front and rear ends (i.e. near the sections 12A—12A, 12C—12C), with the flange parts 13a, 13b which are pinched between the flange part of the pillar outer piece 11 and the flange part of the pillar inner piece 12 for welding.

No flange part is formed at the intermediate part (the section 12B—12B) of the reinforcement 13, providing a substantial C-shaped cross section forming a ridgeline. This ridgeline continues within a range including the opening 12c of the pillar inner piece 12.

Both deformation mode and load-deformation curve of the front pillar structure of this modification at a vehicle collision are similar to those of the first embodiment. Accordingly, when the pillar body 10 has a three-forked or four-forked structure for connection with another framework member (e.g. cross member) and when the opening 12c is formed in the pillar body 10 to fix an interior component (e.g. speaker, fixing tool for seat belt, etc.) thereon, the front pillar structure of this modification can disperse both load and deformation without concentrating the deformation on the vicinity of the concerned part.

(4th. Modification)

FIGS. 5 and 5A to 5C show the fourth modification of the first embodiment of the present invention.

The basic constitution of this modification is similar to that of the first modification of the first embodiment.

That is, the reinforcement 13 inside the pillar body 10 is formed with a radius of curvature larger than that of the pillar body 10, so that a physical clearance outside in the radial direction of the curvature is defined between the reinforcement 13 and the inner wall of the pillar body 10 in the vicinity of the center (the section 13B—13B), thereby providing a relief space S against the bending deformation.

The fourth modification resembles the first modification in that the flange part 13a is formed only in the vicinities of the front end (the section 13A—13A) and the rear end (the section 13C—13C) and pinched between the flange part 11a and the flange part 12a of the pillar body 12 for welding. However, the fourth modification differs from the first modification in that the reinforcement 13 has foldable beads 13d, 13e a little to the center of both ends of the reinforcement 13, as its weakened parts.

According to this modification, these foldable beads 13d, 13e and the relief space S form the waveform adjusting mechanism 100.

Figure 14:
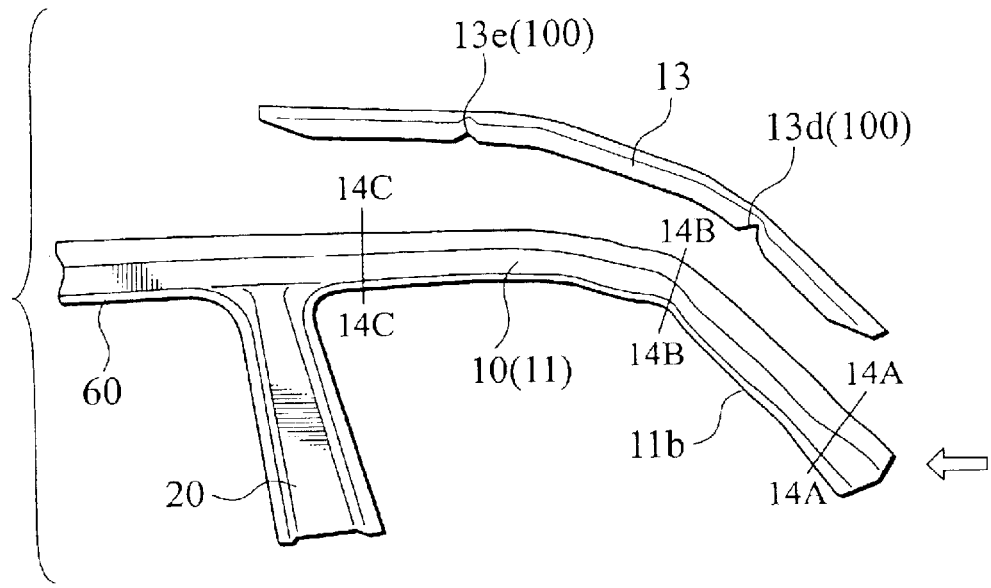
FIG. 14 is an exterior side view of the deformed reinforcing structure of the fourth modification of the first embodiment.
Figure 14A:
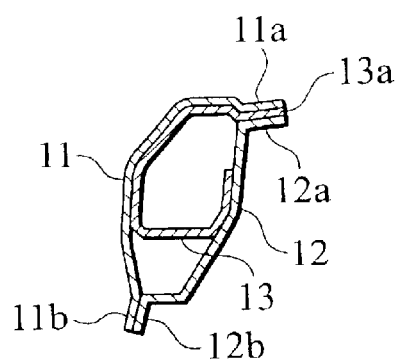
FIG. 14A is a sectional view taken along a line 14A—14A of FIG. 14.
Figure 14B:
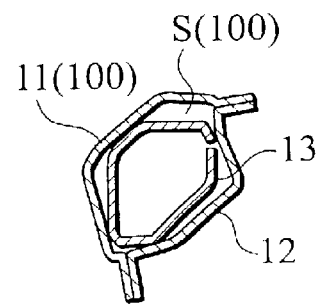
FIG. 14B is a sectional view taken along a line 14B—14B of FIG. 14
Figure 14C:
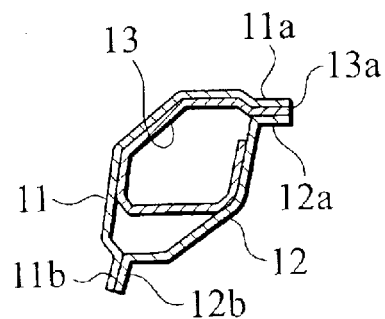
FIG. 14C is a sectional view taken along a line 14C—14C of FIG. 14.

FIG. 14 shows a condition that the front pillar structure of the fourth modification is deformed by a vehicle collision.

In addition to the effects similar to those of the first modification, since the minimum strength parts of the reinforcement 13 are provided by the foldable beads 13d, 13e, the reinforcement 13 is deformed with the beads 13d, 13e as the starting points of deformation positively. Thus, the deformed part of the pillar body 10 disagrees with the deformed part(s) of the reinforcement 13 and therefore, the front pillar structure of the fourth modification would be effective for a situation where a sufficient clearance could not be ensured between the pillar body 10 and the reinforcement 13 in the circumference of the minimum strength part of the body 10.

(5th. Modification)

Figure 15:
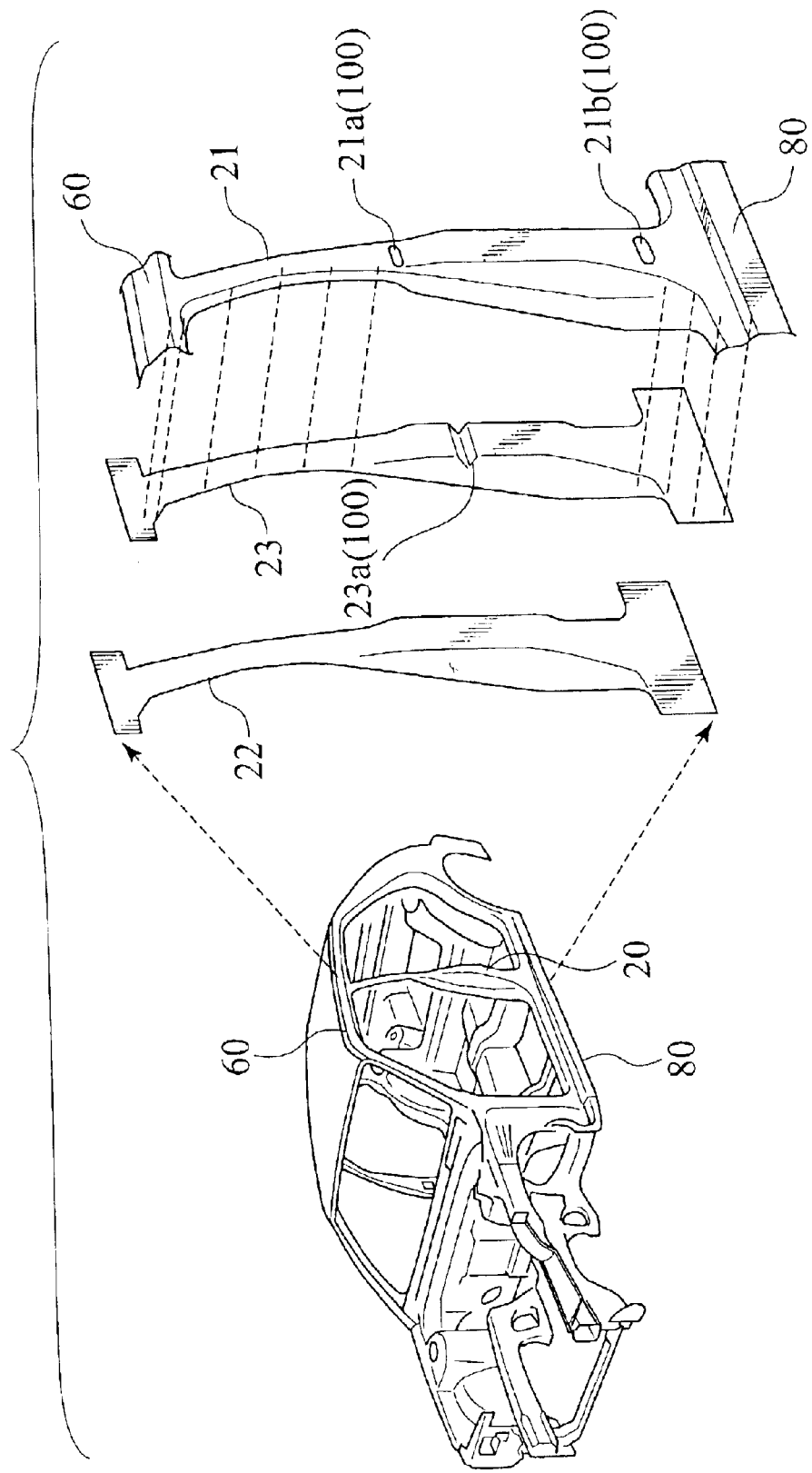
FIG. 15 is a perspective view of the reinforcing structure in a fifth modification of the first embodiment of the invention.

FIG. 15 shows the fifth modification of the first embodiment of the present invention. According to this modification, the above-mentioned structure is applied to the center pillar 20.

A pillar body, which is indicated by the same reference numeral as the center pillar 20 (FIG. 1), is formed by a pillar outer piece 21 and a pillar inner piece 22, each of which is in the form of a sheet of panel. The pillar body 20 is formed with a closed section obtained by spot-welding the pillar outer piece 21 to the pillar inner piece 22.

When a vehicle has a side collision, the center pillar is generally subjected to a load for bending the center pillar. However, on consideration of an interference with a passenger, the deformation mode of the center pillar is controlled in a manner that the configuration of the deformed center pillar is substantially perpendicular to the body side sill 800 or maintains to be substantially parallel with the passenger's body.

According to this modification, the pillar outer piece 21 is provided, on its upper and lower portions, with foldable beads 21a, 21b for controlling the above deformation mode.

A reinforcement 23 is arranged inside the pillar body 20. Although an overall configuration of the reinforcement 23 is formed so as to generally follow the inner wall of the pillar outer piece 21, there is defined a slight clearance between the pillar outer piece 21 and the reinforcement 23 throughout, providing a relief space S against the bending deformation.

The pillar outer piece 21 is welded, only at upper and lower ends thereof, to the reinforcement 23. That is, in a range from the foldable bead 21a to the foldable end 21b through the intermediate part, the pillar outer piece 21 is not welded to the reinforcement 23. Further, the reinforcement 23 is provided, at its center part, with a foldable bead 23a as one weakened part.

According to this modification, the beads 21a, 21b of the pillar outer piece 21, the bead 23a of the reinforcement 23 and the relief space S form the waveform adjusting mechanism 100.

Figure 16B:
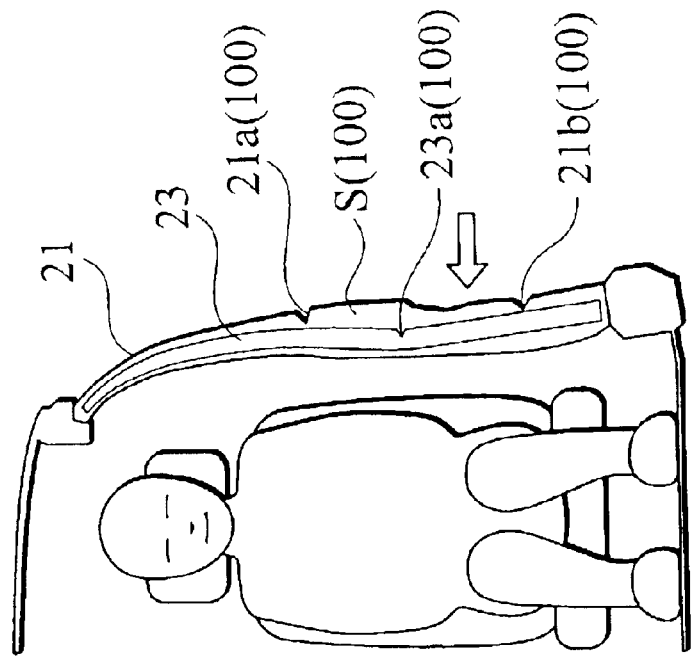
FIGS. 16A and 16B are front views explaining a deformation mode of the reinforcing structure of the fifth modification of the first embodiment at a collision.
Figure 16A:
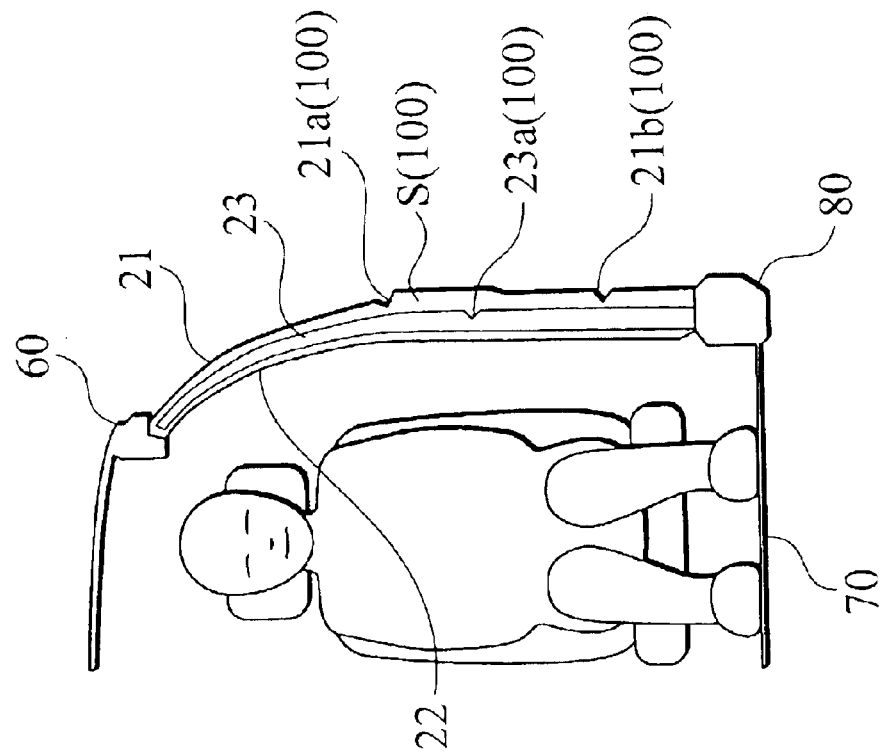

FIGS. 16A and 16B show situations where the center pillar structure of this modification is deformed by a vehicle side collision.

As shown in the figures, the pillar body 20 is deformed at positions of the foldable beads 21a, 21b formed on the pillar outer piece 21.

Since the pillar body 20 is not welded to the reinforcement 23 in a range between the foldable bead 21a and the foldable bead 21b and the relied space S of a slight clearance is established therebetween, there is no possibility that the deformation of the pillar body 20 exerts pressure on the reinforcement 23 immediately.

On the other hand, the reinforcement 23 begins to be deformed at the foldable bead 23a, in accordance with a different deformation mode from that of the pillar body 20. That is, a progress in the deformation mode of the pillar body 20 is controlled due to its interference with the reinforcement 23.

Consequently, although the deformation mode of the pillar body 20 does not change, it can be expected to restrict the reduction of the pillar strength while the bending deformation is progressing.

Further since the foldable beads 21a, 21b on the pillar body 20 are regarded as the minimum strength parts in the modification, it is possible to prevent the beads 21a, 21b, which are established to control the deformation mode at the side collision, from making a factor of reducing a load under the other collision conditions.

Additionally, also in this modification, since the reinforcement 23 has the weakened part 23a formed in a position except the minimum strength parts 21a, 21b of the pillar body 20, the center pillar structure of the fifth modification would be effective for a situation where a sufficient clearance could not be ensured between the pillar body 20 and the reinforcement 23, in the circumference of the minimum strength part of the body 20.

[2nd. Embodiment]

FIGS. 19 to 22 show the second embodiment of the present invention. According to this embodiment, the reinforcing structure of the invention is applied to the center pillar (pillar body).

Figure 19:
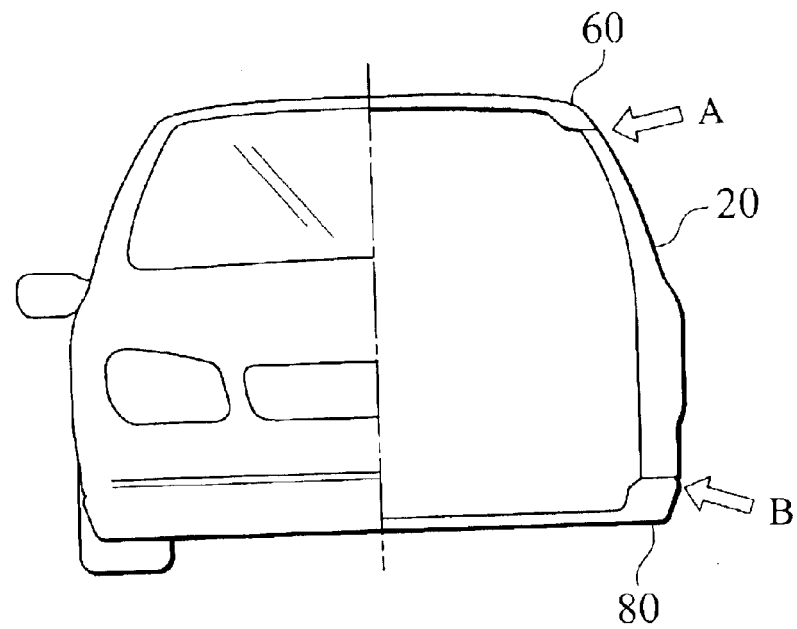
FIG. 19 is a half-sectional view of the vehicle, showing a center pillar embodying the reinforcing structure in accordance with a second embodiment of the present invention.

FIG. 19 is a partial sectional view of the automobile shows, taken along the position of the center pillar. As previously-mentioned with reference to FIG. 1, the center pillar is connected, at its upper end A, with the roof side rail 60 and also connected, at the lower end B, with the side sill 80.

Figure 20:
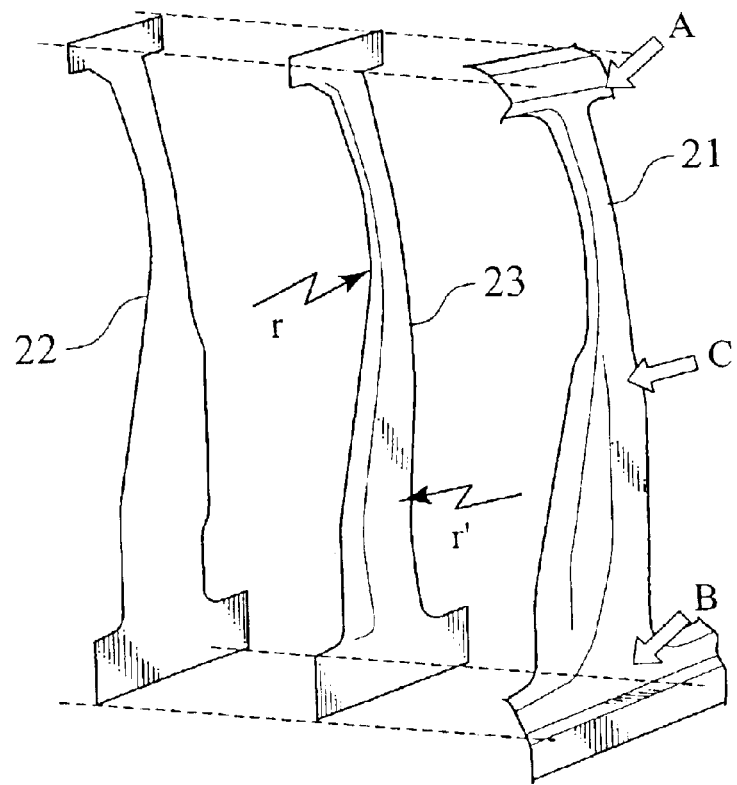
FIG. 20 is an exploded perspective view showing the center pillar of the second embodiment.
Figure 21:
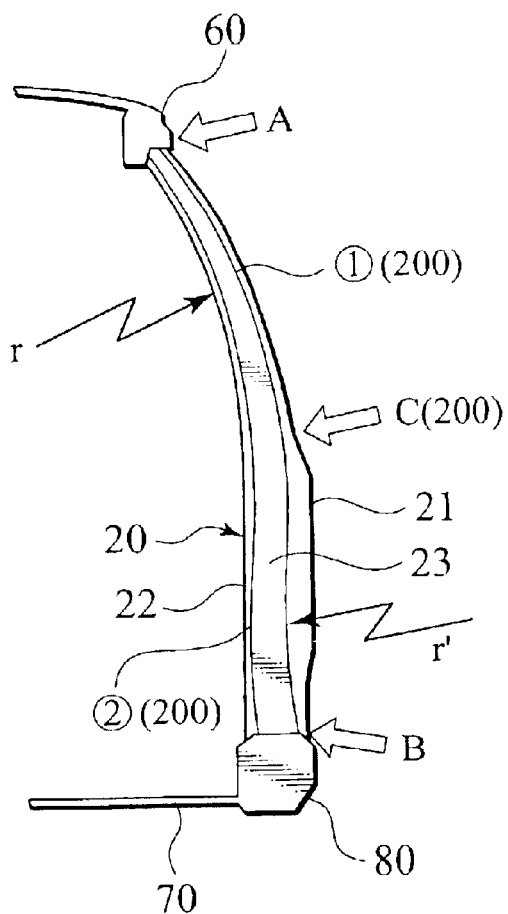
FIG. 21 is a longitudinal sectional view of the center pillar of FIG. 20 in its assembled condition.
Figure 22:
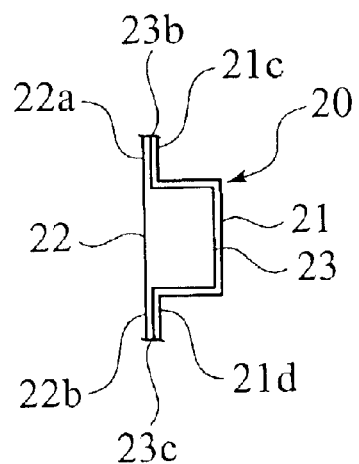
FIG. 22 is a cross sectional view of the center pillar of FIG. 21.

FIGS. 20 to 22 show the structure of the center pillar. FIG. 20 is an exploded perspective view of the center pillar. FIG. 21 is a longitudinal sectional view and FIG. 22 is a cross sectional view of the pillar.

The center pillar 20 includes the pillar body (the "hollow" outer member) having the pillar outer piece 21 and the pillar inner piece 22, and the reinforcement 23 arranged in the outer member 20 to extend from the upper end A to the lower end B.

The pillar outer piece 21 is shaped so as to have a substantial hat-shaped section, while the pillar inner piece 22 is shaped in the form of a flat plate. The pillar outer piece 21 has respective flange parts 21c, 21d joined to respective flange parts 22a, 22b of the pillar inner piece 22 by spot-welding, providing a closed section.

The reinforcement 23 is also shaped so as to have a substantial hat-shaped section. The reinforcement 23 is provided with respective flange parts 23b, 23c. In assembling, the flange parts 23b, 23c are respectively pinched between the flange parts 21c, 21d of the pillar outer piece 21 and the flange parts 22a, 22b of the pillar inner piece 22 and welded each other by means of spot-welding.

According to the second embodiment of the invention, the so-constructed center pillar is provided with a waveform (deformation-mode) adjusting mechanism 200 which allows the number of peaks in a buckling-mode waveform of the outer member (i.e. an assembly of the pillar outer piece 21 and the pillar inner piece 22) to differ from the number of peaks in a buckling-mode waveform of the reinforcement 23. For example, if the number of peaks in a buckling-mode waveform of the outer member 20 is set to n, then it is established that the number of peaks in a buckling-mode waveform of the reinforcement 23 is equal to (n+1).

In the pillar's part extending from the upper end A to a point C of FIG. 21, which corresponds to an arranging area of a not-shown side window, the outer member 20 is partially shaped so as to draw an outward arc of a radius (r), following the curved configuration of the side window. While, in the pillar's part extending from the point C to the lower end B to support a not-shown door, the outer member 20 is shaped so as to be substantially perpendicular to the cabin floor 70 for reasons of the strength of the center pillar.

That is, the above point C forms an inflection point in the outside appearance of the outer member 20 (21, 22).

On the other hand, in the reinforcement's part extending from the upper end A to the point C of FIG. 21, the reinforcement 23 is partially shaped so as to draw an outward arc of a radius (r), following the outer member 20, above all, an inner face of the pillar outer piece 21. While, in the reinforcement's part extending from the point C to the lower end B, the reinforcement 23 is shaped so as to draw an inward arc of a radius (r'). That is, respective peaks ①, ② of the upper and lower curves in the opposite directions form inflection points in the outside appearance of the reinforcement 23.

Accordingly, in the second embodiment the above inflection points C, ① and ② of the outer member 20 and the reinforcement 23 form the above-mentioned waveform adjusting mechanism 200.

Figure 23:
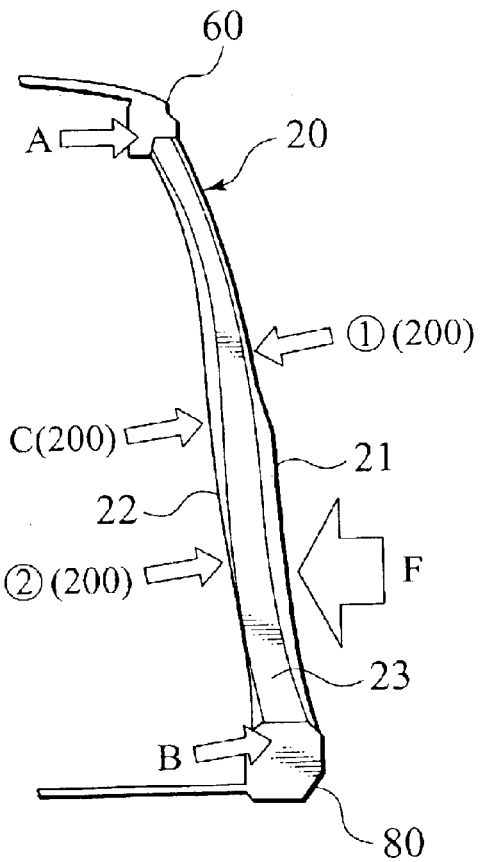
FIG. 23 is a longitudinal sectional view similar to FIG. 20, explaining the operation of the center pillar of the second embodiment.

FIG. 23 shows the center pillar of the second embodiment, which is subjected to an external force F due to a vehicle side collision.

Since the outer member 20 is provided with the inflection point at the point C, this portion corresponds to a part of discontinuity in strength, thereby forming the starting point of bending deformation on the outer member 20.

While, since a direction of the arc extending from the point C to the point B is opposite to the direction of an arc extending from the point A to the point C, the reinforcement 23 exhibits a substantial S-shaped deformation mode in case of the external force F.

That is, the number of peaks of a buckling-mode waveform of the outer member 20 is one (n: point C), while the number of peaks in a buckling-mode waveform of the reinforcement 23 is two (n+1: peak points ①, ② of respective curves).

As a result, the reinforcement 23 interferes with the pillar outer piece 21 of the outer member 20 at the point ①, while the reinforcement 23 interferes with the pillar inner piece 22 of the outer member 20 at the point ②. The peak in the deformation mode of the center pillar 20 as a whole is dispersed to three points (C, ①, ②).

Figure 24:
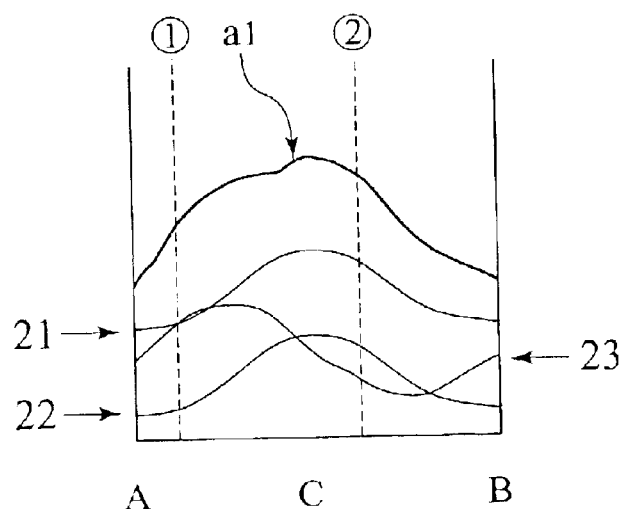
FIG. 24 is a graph explaining a deformation level of the center pillar of the second embodiment.

FIG. 24 illustrates effect brought by the above dispersion of peak in the deformation mode. From the figure, it will be understood that since the respective peaks of the elements 21, 22, 23 are deviated from each other, a peak in the deformation mode of the whole center pillar is dispersed to lower a deformation level of the center pillar, as shown with a line ($a_1$) in the figure.

Figure 25:
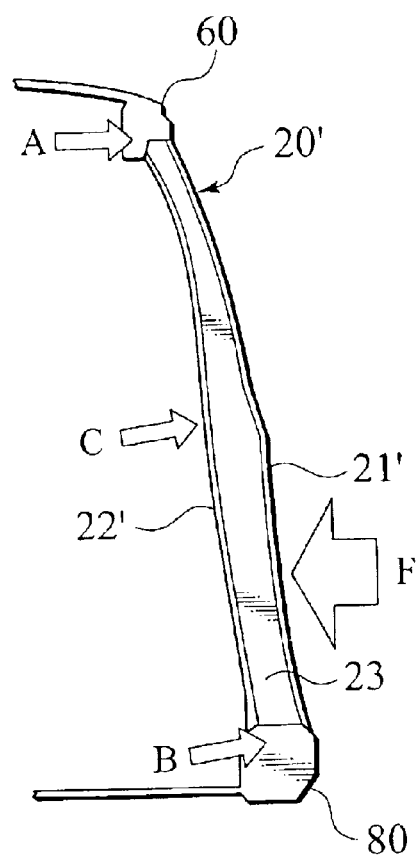
FIG. 25 is a longitudinal sectional view similar to FIG. 23, showing the structure of an example for comparison with the center pillar of the second embodiment.
Figure 26:
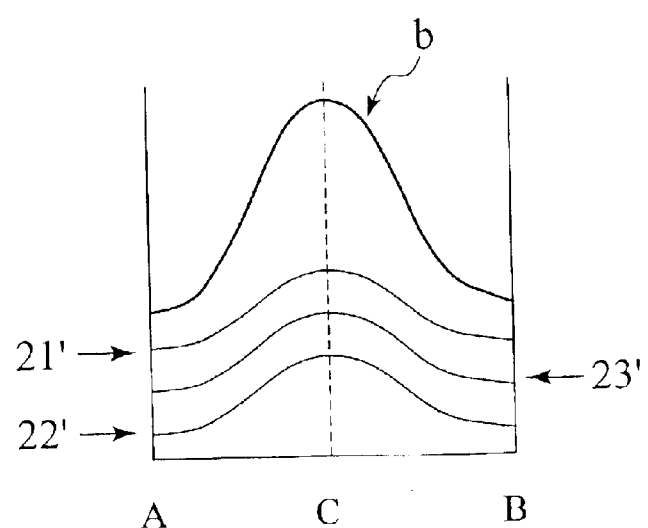
FIG. 26 is a graph similar to FIG. 24, explaining a deformation level of the comparative example.

FIGS. 25 and 26 show a comparative example against the center pillar of this embodiment.

In the comparative example, a center pillar comprises an outer member 20' having a pillar outer piece 21' and a pillar inner member 22', and a reinforcement 23'.

Different from the center pillar of this embodiment, the reinforcement 23' of the comparative example is formed so as to follow the profiles of respective inner faces of the members 21', 22".

Thus, if an external force F is applied on the center pillar in the example, the outer member 20' begins to be deformed at the point C of discontinuity in strength and simultaneously, the reinforcement 23 begins to be deformed at the same position as the point C substantially.

Therefore, as shown in FIG. 26, the respective peaks of the elements 21', 22', 23' coincide with each other at the point C, so that a peak in the deformation mode of the whole center pillar converges at one position thereby raising a deformation level of the center pillar, as shown with a line (b) in the figure.

According to the second embodiment of the present invention, it is established to make the number of peaks of a buckling-mode waveform of the outer member 20 (21, 22) different from the number of peaks in a buckling-mode waveform of the reinforcement 23 by the waveform adjusting mechanism 200. Therefore, when the collision load F is applied on the center pillar to buckle the outer member 20 and the reinforcement 23, it is possible to prevent a local deformation from developing in these elements since their deformation modes interfere with each other in the longitudinal direction.

Further, by a resisting power as a result of the interference between the outer member 20 and the reinforcement 23, it is possible to restrict the deformation on the center pillar and also possible to increase an energy absorption of the center pillar with an enhanced reaction force against collapse.

In other words, without either increasing plate-thicknesses of the outer member 20 (21, 22) and the reinforcement 23 or establishing the other reinforcement, it is possible to enhance the reinforcing effect in the center pillar thereby improving its collision performance.

Noted that there is an actual case that the outer member is provided with an exterior inflection point(s) for reasons of molding the vehicle body. In such a case, if an exterior inflection point(s) is provided on the reinforcement 23 on consideration of the concept of the waveform adjusting mechanism 200 of this embodiment, it is possible to adjust the numbers of peaks in respective buckling-mode waveforms of the outer member 20 and the reinforcement 23 easily.

(1st. Modification)

Figure 27:
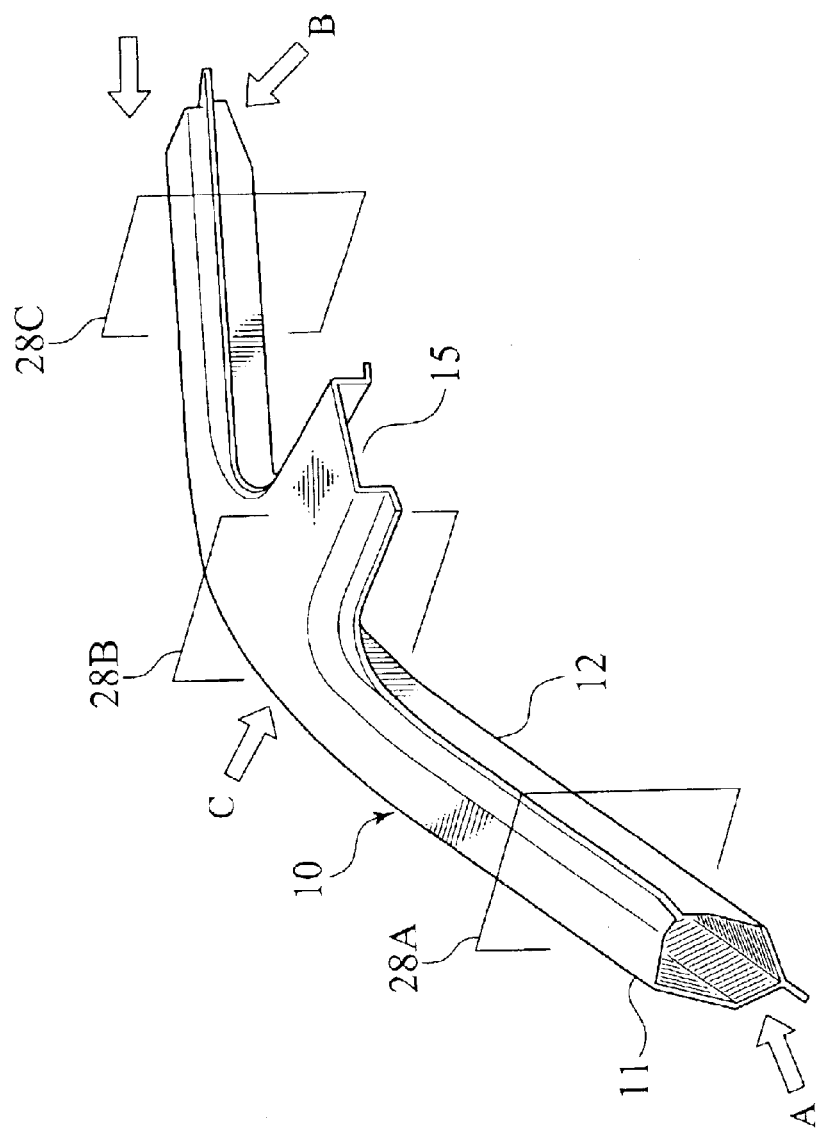
FIG. 27 is a perspective view of a front pillar embodying the reinforcing structure in a first modification of the second embodiment of the invention.
Figure 28C:
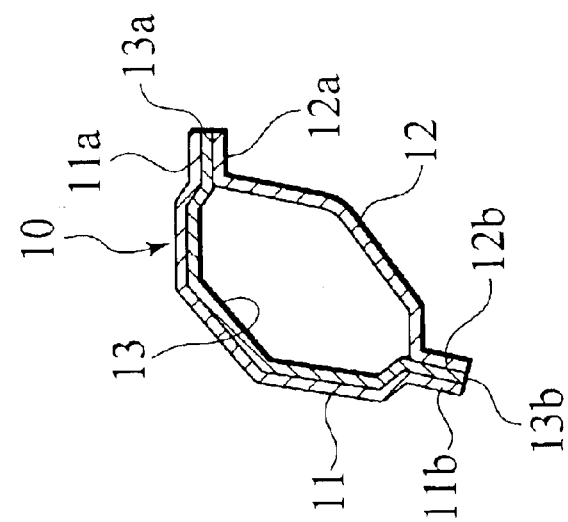
FIG. 28C is a sectional view taken along a line 28C of FIG. 27.
Figure 28B:
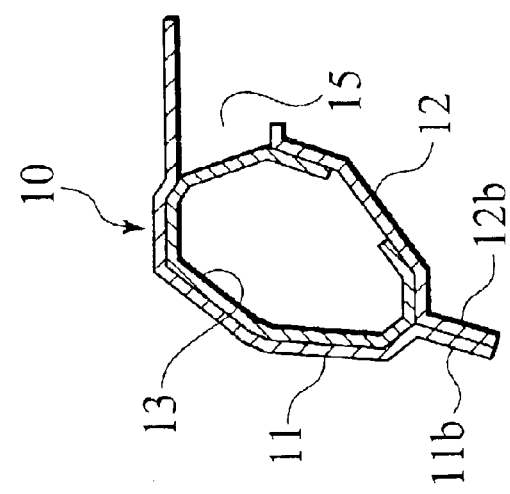
FIG. 28B is a sectional view taken along a line 28B of FIG. 27
Figure 28A:
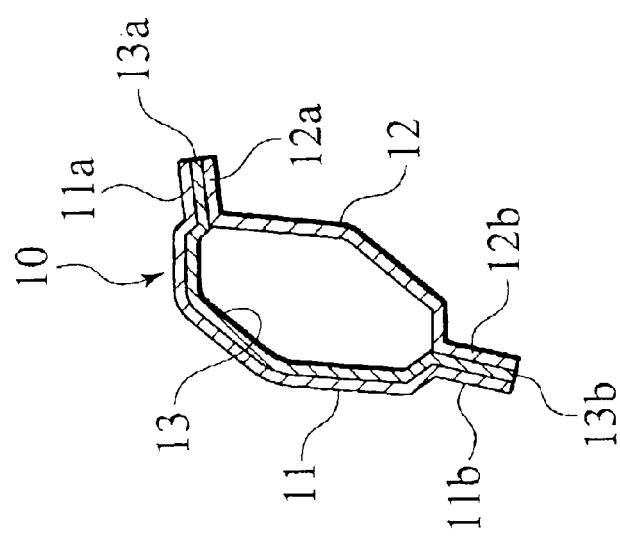
FIG. 28A is a sectional view taken along a line 28A of FIG. 27.
Figure 29:
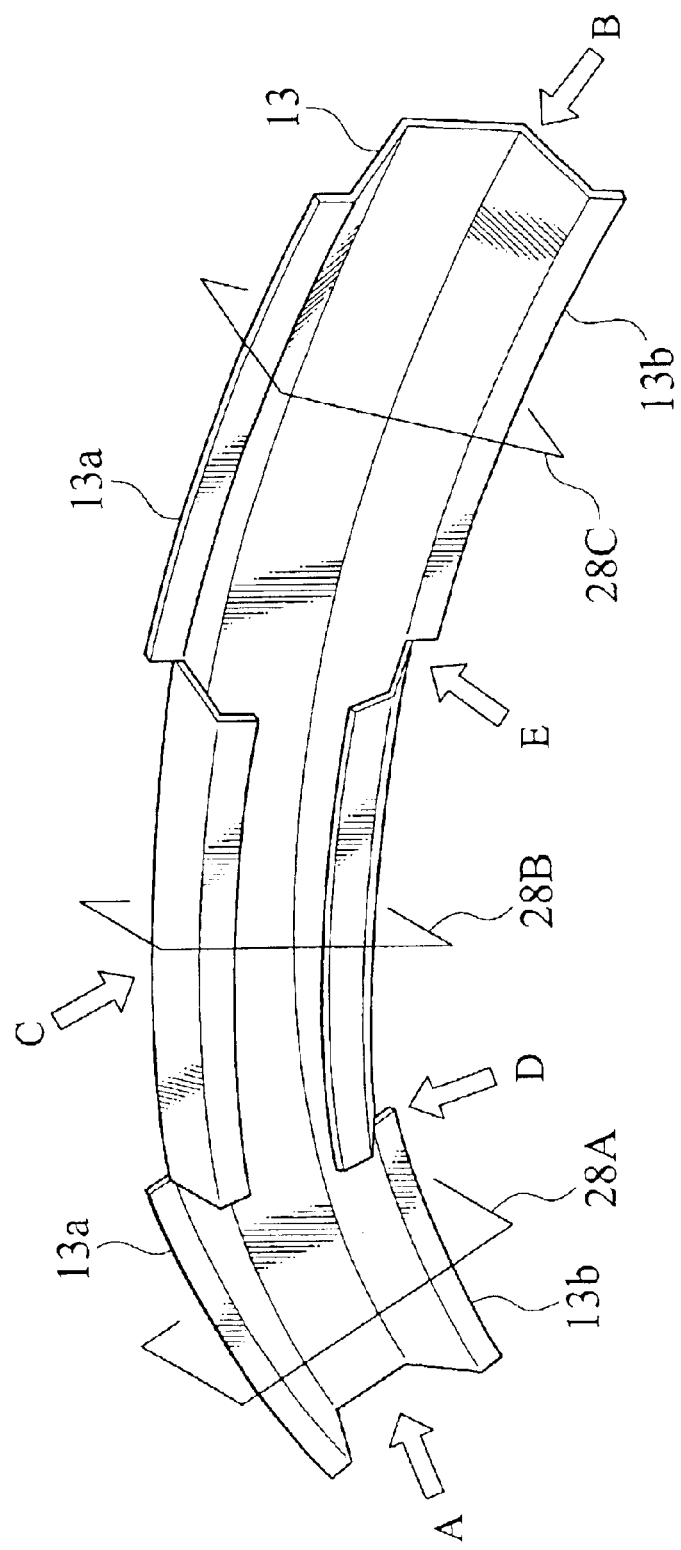
FIG. 29 is an exterior perspective view of a reinforcement forming the front pillar in the first modification of the second embodiment.

FIGS. 27, 28 and 29 show the first modification of the second embodiment of the present invention. In this modification, the reinforcing structure in accordance with the above concept of the second embodiment is applied to the front pillar.

FIG. 27 is a perspective view of the front pillar. FIG. 28A is a sectional view taken along a line 28A of FIG. 27, FIG. 28B is a sectional view taken along a line 28B and FIG. 28C is a sectional view taken along a line 28C.

The front pillar is formed by the outer member (i.e. the pillar body) 10 having the pillar outer piece 11 and the pillar inner piece 12, and the reinforcement 13 arranged inside the outer member 10 to extend from the front end A of the outer member 11 to the rear end B in the longitudinal direction.

Both of the pillar outer piece 11 and the pillar inner piece 12 are formed to have substantial hat-shaped sections. The closed section of the outer member 10 is obtained by spot-welding the flange parts 11a, 11b of the pillar outer piece 11 with the flange parts 12a, 12b of the pillar inner piece 12, respectively.

The outer member 10 is formed, at a point C near the center part bending up and down, with a three-forked structure for connection with another framework member (e.g. header rail), providing an opening 110 on the side of the pillar inner piece 12.

Similarly to the pillar outer piece 11 and the pillar inner piece 12, the reinforcement 13 is formed with a substantial hat-shaped section. In this modification, the reinforcement 13 is arranged so as to extend along the inner face of the pillar outer piece 11. Alternatively, according to the specifications of design, the reinforcement 13 may be arranged so as to extend along the inner face of the pillar inner piece 12.

In common with the sections along the lines 28A, 28C of FIG. 27, which are close to the front end A and the rear end B of the front pillar respectively, the flange parts 13a, 13b of the reinforcement 13 are pinched between the flange parts 11a, 11b of the pillar outer piece 11 and the flange parts 12a, 12b of the pillar inner piece 12, respectively (see FIGS. 28A and 28C). These flange parts are welded to each other by means of spot-welding. While, in the section along the line 28B of FIG. 27, which is close to the diverging point C, the reinforcement 13 extends over the welding part of the flange parts 11a, 12a, 11b, 12b, forming a substantial C-shaped section. This C-shaped section is defined so as to continue in a pillar's region including the opening 15 of the pillar inner piece 12.

That is, the outer member 10 is provided, at the point C, with a change part in terms of sectional shape. While, the reinforcement 13 has a changing part D positioned between the front end A and the point C and another changing part E positioned between the point C and the rear end B, in terms of sectional shape.

In the second modification, the above changing parts C, D, E of the outer member 10 and the reinforcement 13 constitute the waveform adjusting mechanism 200.

Figure 30:
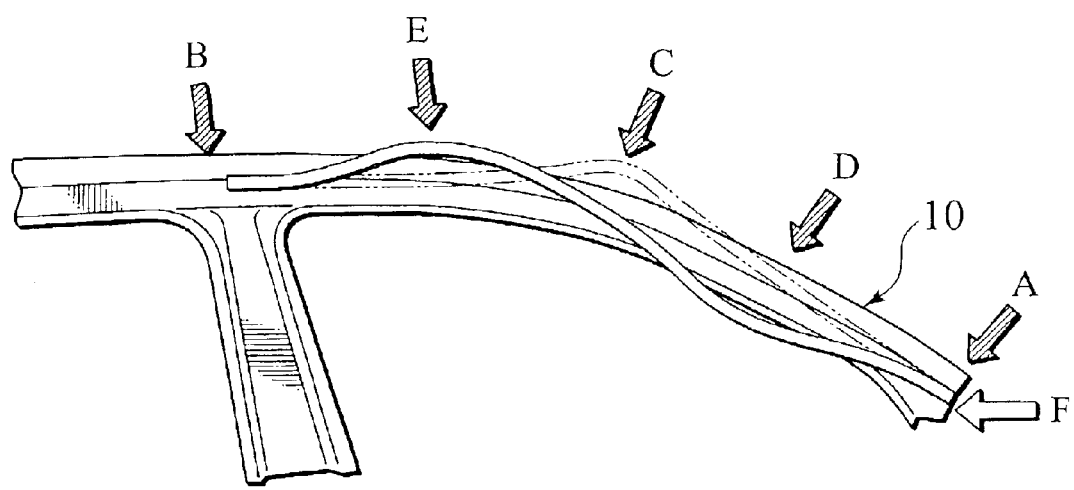
FIG. 30 is a side view explaining the operation of the front pillar in the first modification of the second embodiment.

FIG. 30 shows a condition that the front pillar mentioned above is subjected to an external force F by a vehicle front collision.

Since the outer member 10 is provided with the "sectional" changing part at the point C, this portion corresponds to a part of discontinuity in strength, thereby forming the starting point of bending deformation on the outer member 10.

Since the reinforcement 13 has the sectional changing parts D, E apart from the point C before and behind, the reinforcement's part between the point (front end) A and the point C is deformed in a downward arc about the changing part D as the center of deformation, while the reinforcement's part between the point C and the point (rear end) B is deformed in an upward arc about the changing part E as the center of deformation. Thus, the reinforcement 13 exhibits a substantial S-shaped deformation mode in case of the external force F.

That is, the number of peaks (n) of a buckling-mode waveform of the outer member 10 is one, while the number of peaks in a buckling-mode waveform of the reinforcement 13 is two (n+1: peak points D, E).

As a result, the reinforcement 13 interferes with the pillar outer piece 11 of the outer member 10 at the point D, while the reinforcement 13 interferes with the pillar inner piece 12 of the outer member 10 at the point E. The peak in the deformation mode of the front pillar as a whole is dispersed to three points C, D, E.

Figure 31:
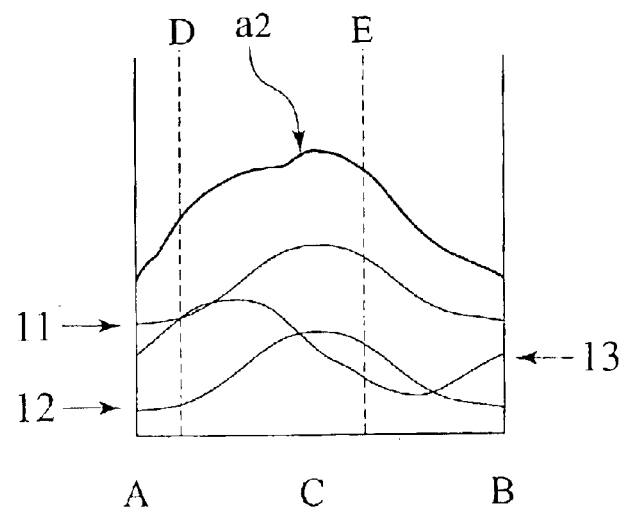
FIG. 31 is a graph explaining a deformation level of the front pillar in the first modification of the second embodiment.

FIG. 31 illustrates effect brought by the above dispersion of peak in the deformation mode. From the figure with a line ($a_2$), it will be understood that since the respective peaks of the elements 11, 12, 13 are deviated from each other (C≠D≠E), a peak in the deformation mode of the whole front pillar is dispersed to lower a deformation level of the front pillar, thereby taking effect similar to that of the above-mentioned second embodiment.

Noted that there is an actual case that the outer member 10 is provided with a sectional changing part(s) for reasons of molding the vehicle body. In such a case, if a sectional changing part(s) is provided on the reinforcement 13 on consideration of the concept of the waveform adjusting mechanism 200 of the second embodiment, it is possible to adjust the numbers of peaks in respective buckling-mode waveforms of the outer member 10 and the reinforcement 13 easily.

(2nd Modification)

Figure 32:
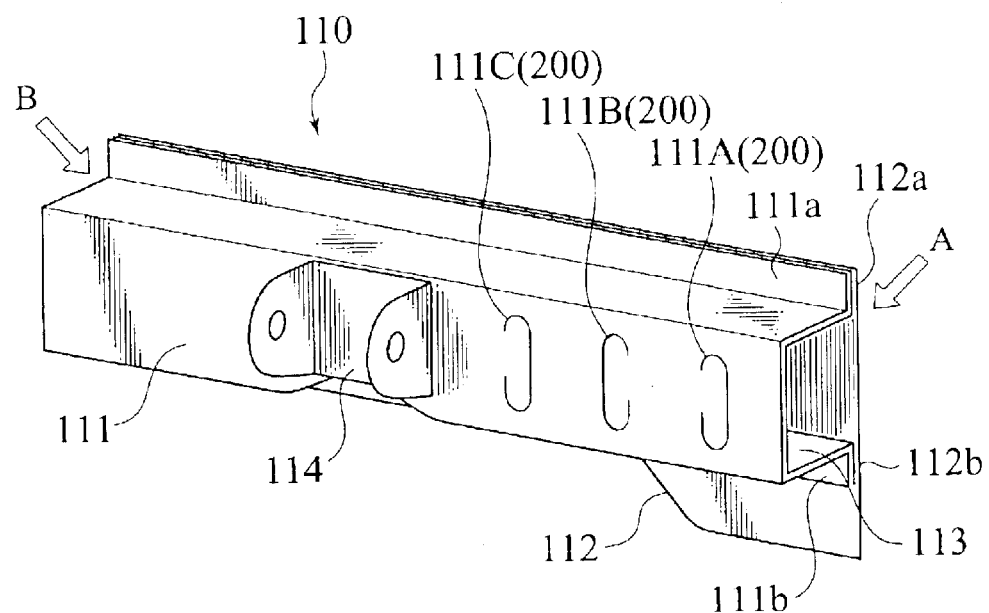
FIG. 32 is an exterior perspective view of a front side member embodying the reinforcing structure in a second modification of the second embodiment.
Figure 33:
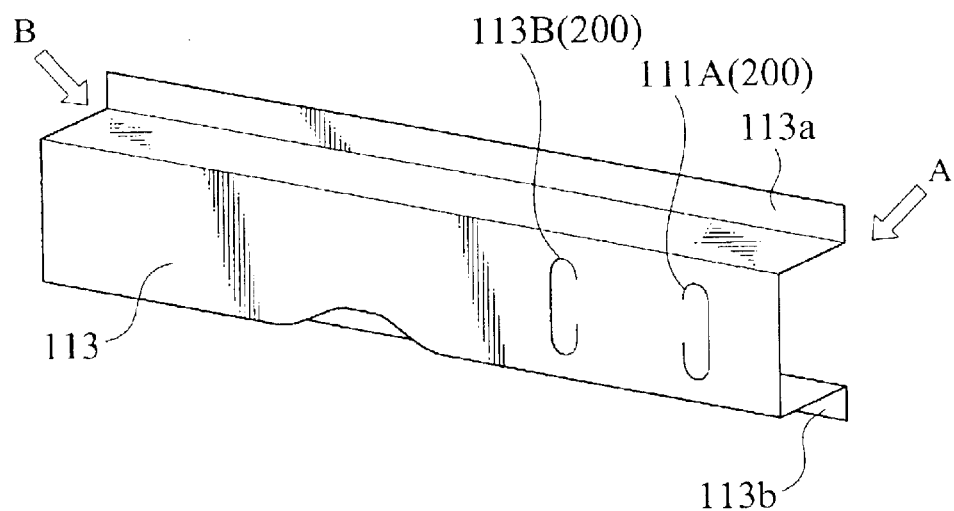
FIG. 33 is an exterior perspective view of a reinforcement forming the front side member in the second modification of the second embodiment.

FIGS. 32 and 33 show the second modification of the second embodiment of the present invention. In this modification, the reinforcing structure in accordance with the above concept of the second embodiment is applied to a front side member 110 (also see FIG. 1).

FIG. 32 is a perspective view of the front side member 110. FIG. 33 is a perspective view of a reinforcement 113 of this modification.

The front side member 110 is formed by an outer member having a "member" inner piece 111 and a "member" outer piece 112, and a reinforcement 113 arranged inside the outer member (111, 112) to extend from the front end A of the outer member to the rear end B in the longitudinal direction.

The member inner piece 111 is shaped so as to have a substantial hat-shaped section, while the member outer piece 112 is shaped in the form of a flat plate. The member inner piece 111 has respective flange parts 111a, 111b joined to respective flange parts 112a, 112b of the member outer piece 112 by spot-welding, providing a closed section.

The reinforcement 113 is also shaped so as to have a substantial hat-shaped section. The reinforcement 113 is provided with respective flange parts 113a, 113b. In assembling, the flange parts 113a, 113b are respectively pinched between the flange parts 111a, 111b of the member inner piece 111 and the flange parts 112a, 112b of the member outer piece 112 and welded each other by means of spot-welding.

At the intermediate part of the member inner piece 111 in the fore-and-aft direction of the vehicle, a bracket 114 is welded to support a power unit.

According to the second modification of the second embodiment, the waveform adjusting mechanism 200 is provided in a front area extending from the front end A of the front side member 110 to its welding part for the bracket 114.

The waveform adjusting mechanism 200 is embodied in the form of respective "strength" changing parts formed in the outer member (111, 112) and also the reinforcement 113.

The "strength" changing parts comprise respective beads 111A to 110C as three weakened parts juxtaposed on a side wall of the member inner piece 111 in the fore-and-aft direction of the vehicle, and respective beads 113A, 113B as two weakened parts juxtaposed on a side wall of the reinforcement 113 in the fore-and-aft direction.

In the member inner piece 111, the foremost bead 111A and the third bead 111C are provided in the form of dents sinking into the inside of the front side member 110, while the second bead 111B is in the form of a protrusion projecting out of the member 110.

In the reinforcement 113, the foremost bead 113A is provided in the form of a dent sinking into the inside of the reinforcement 113, while the second bead 113B is in the form of a protrusion projecting out of the reinforcement 113. In plan view, the bead 113A in the reinforcement 113 is positioned between the bead 111A and the bead 111B of the member inner piece 111, and the bead 113B in the reinforcement 113 is positioned between the bead 111B and the bead 111C of the member inner piece 111.

Figure 34:
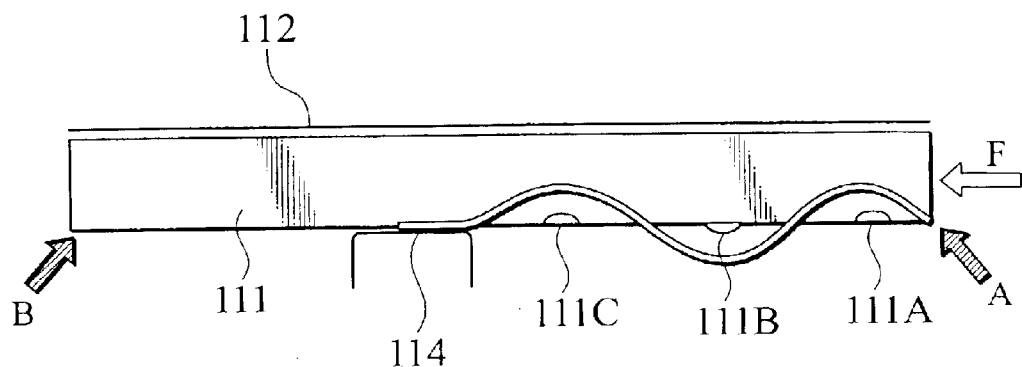
FIG. 34 is a plan view explaining the operation of an outer member forming the front side member in the second modification of the second embodiment.
Figure 35:
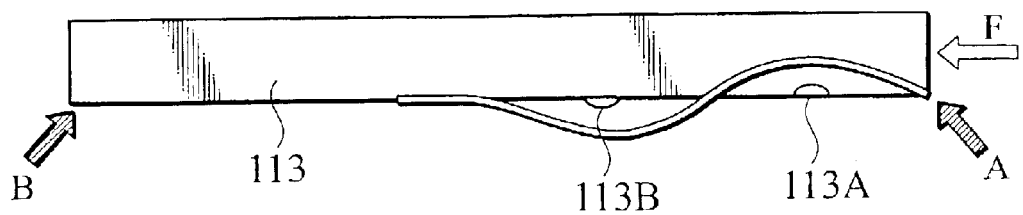
FIG. 35 is a plan view explaining the operation of a reinforcement forming the front side member in the second modification of the second embodiment.

FIGS. 34 and 35 shows the operation of the front side member 110 of the modification when it is subjected to an external force F by a vehicle front collision. FIG. 34 shows the buckling mode of the outer member (111, 112), while FIG. 35 shows the buckling mode of the reinforcement 113.

In common with the outer member (111, 112) and the reinforcement 113, their walls are buckled in accordance with the projecting directions of the beads, respectively.

That is, the wall of the member inner piece 111 is buckled inward at the bead 111A, outward at the bead 111B and again inward at the bead 111C, thereby exhibiting the deformation mode having three peaks. While, the wall of the reinforcement 113 is buckled inward at the bead 113A and outward at the bead 113B, thereby exhibiting the deformation mode having two peaks.

Figure 36:
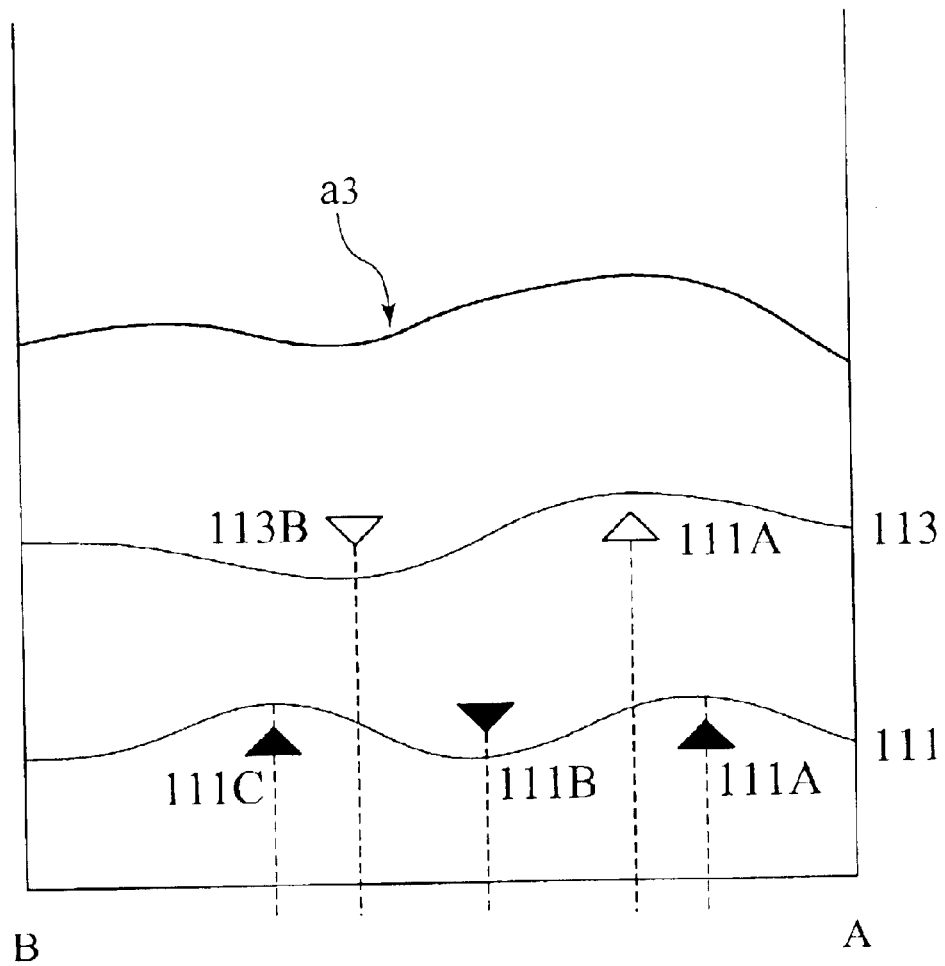
FIG. 36 is a graph explaining a deformation level of the front side member in the second modification of the second embodiment.

FIG. 36 illustrates an effect brought by the above dispersion of peak in the deformation mode. From the figure, it will be understood that since the positions of the peaks of the outer member (111, 112) are deviated from the positions of the peaks of the reinforcement 113, a peak in the deformation mode of the whole front side member 110 is dispersed to lower a deformation level of the center pillar, as shown with a line ($a_3$) in the figure, taking effect similar to the effects of the second embodiment and the first modification.

Additionally, since the waveform adjusting mechanism 200 comprises the "strength" changing parts established in the outer member (111, 112) and the reinforcement 113 in this modification, it is possible to adjust the numbers of peaks in respective buckling-mode waveforms of both the outer member (111, 112) and the reinforcement 113 with ease, irrespective of their outer profiles and sectional shapes.

Alternatively, the "strength" changing part may be formed by a reinforced part (e.g. reinforcement of a patch member, thickened wall, etc.) in place of the weakened part, such as bead.

Although the reinforcing structure is embodied by the front side member in this modification, it is also possible to apply the above structure on a front side-member extension which is arranged behind the front side member in succession to extend to the underside of the vehicle floor.

Furthermore, although the number of n+1 in peaks is established against the number of n in the above-mentioned embodiment, the number of n−1 in peaks may be established against the number of n instead.

[3rd. Embodiment]

FIGS. 37 to 41 show the third embodiment of the present invention. According to this embodiment, the reinforcing structure of the invention is applied to a side-member extension the center pillar (pillar body).

Figure 37:
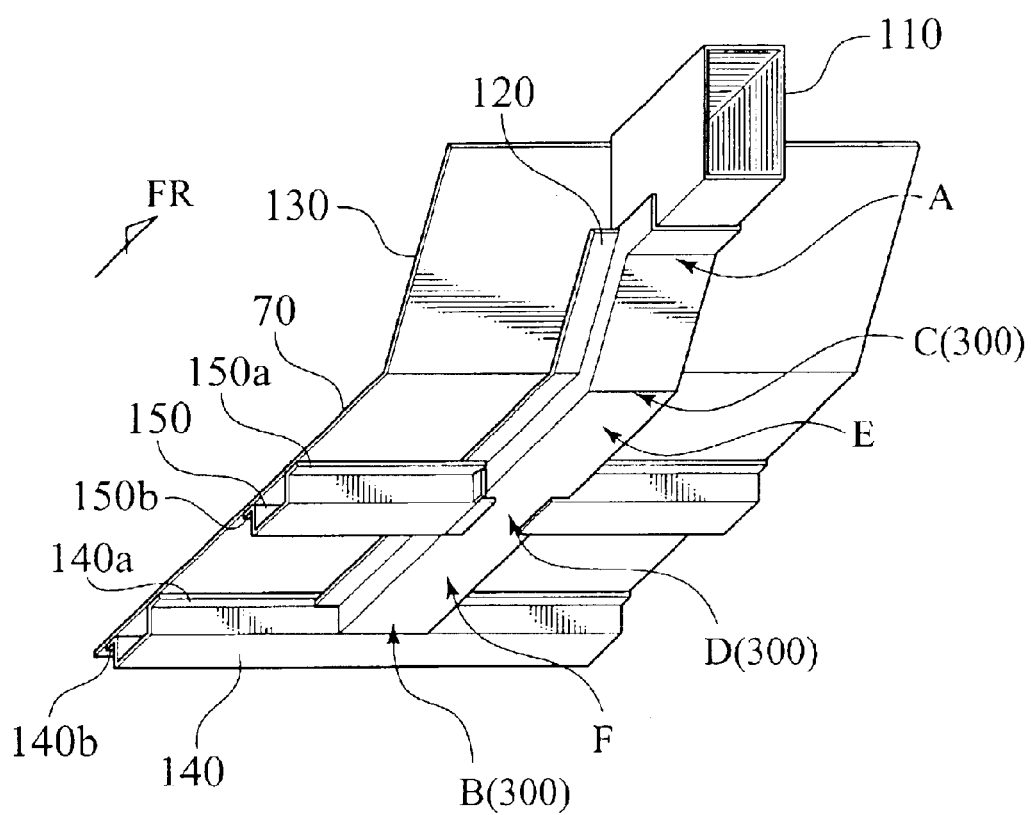
FIG. 37 is a perspective view of a side member extension embodying the reinforcing structure in accordance with a third embodiment of the invention, also viewed from the underside of a vehicle floor.
Figure 38:
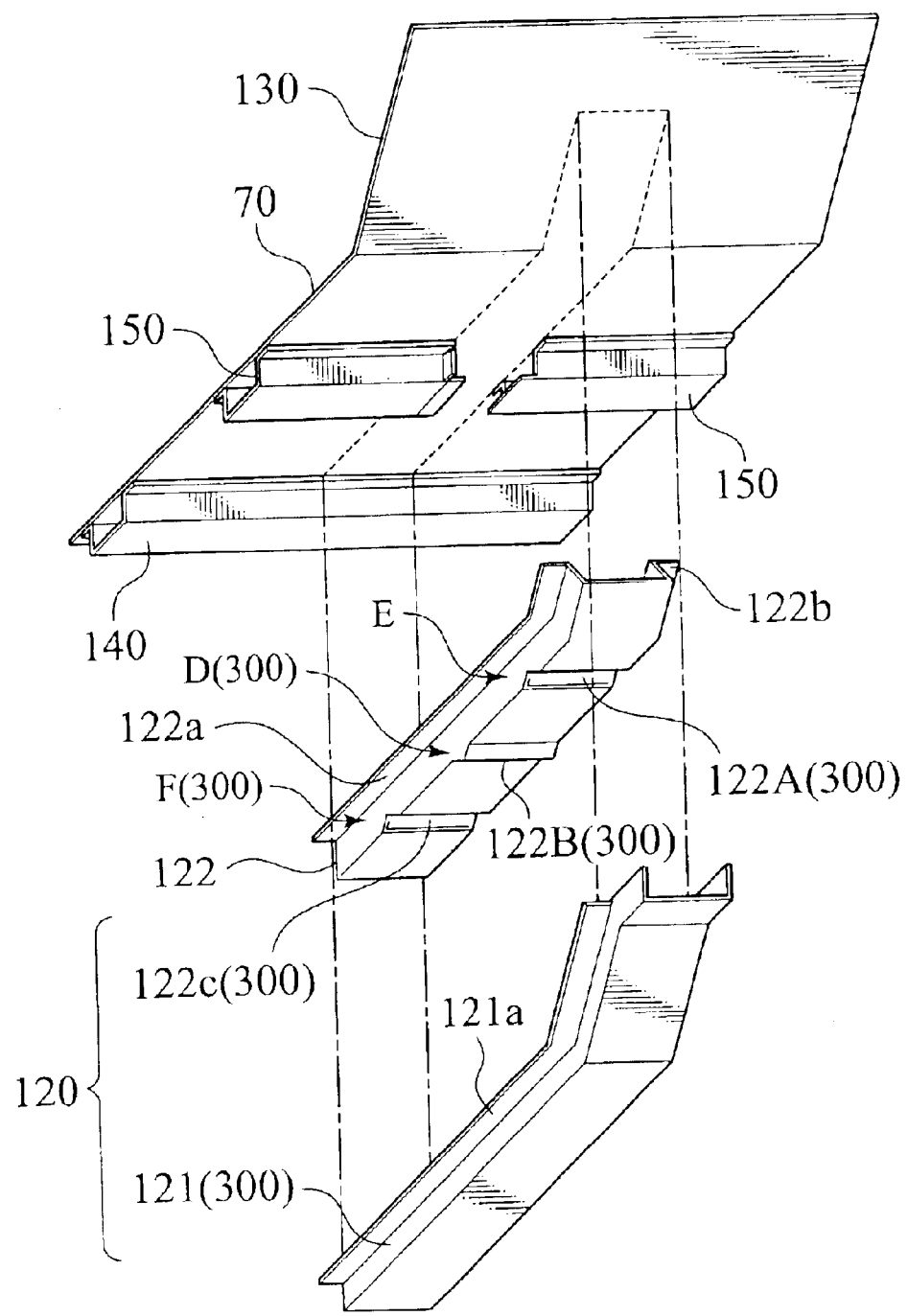
FIG. 38 is an exploded perspective view of FIG. 37.

FIGS. 37 and 38 are perspective views of the side-member extension 120, also viewed from the underside of the floor panel 70.

The front side member 110 is joined to a dash panel 130 between a front compartment and a vehicle cabin so that the rear end of the member 110 abuts on a slanted toe-board of the panel 130.

The side-member extension 120 is joined to a lower part of the rear end of the front side member 110. Additionally, the side-member extension 120 is welded to a slanted face of the dash panel 130 and an underface of the floor panel 70 to extend in the fore-and-aft direction of the vehicle. The side-member extension 120 has its rear end connected with a rear cross member 140. The rear cross member 140 is welded to the underface of the floor panel 70 to extend in a width direction of the vehicle.

Further, at the center of the floor panel 70, the side-member extension 120 intersects with floor cross members 150 welded to the underface of the floor panel 70.

The rear cross member 140 and the floor cross members 150 are together formed to have substantial hat-shaped sections and also welded to the underface of the floor panel 70 through their flange parts 140a, 140b, 150a, 150b, thereby forming hollow (closed) sections respectively.

The side-member extension 120 is formed by an outer member 121 as an outer shell and a reinforcement 122 inside the outer member 121. The outer member 121 has a front end fitted to the rear end of the front side member 110 from its outside and the rear end connected to the rear cross member 140. The outer member 121 is welded to the slanted face of the dash panel 130 and the underface of the floor panel 70, thereby forming a hollow (closed) sections together with the floor panel 70 and the dash panel 130. While, the reinforcement 122 is arranged so as to extend between both ends of the outer member 121 in the longitudinal direction.

Thus, the outer member 121 consists of a substantial S-shaped (in side view) portion extending from the rear end of the front side member 110 to the front end of the floor panel 70, and a substantially straight portion extending from the front end of the floor panel 70 up to the rear cross member 140.

Here, it is defined that a point A represents the position where the front end of the outer member 121 is joined to the rear end of the front side member 110, a point B the position where the rear end of the outer member 121 is joined to the rear cross member 140, a point C the position of the front end of the floor panel 70, and a point D represents the position where the outer member 121 intersects with the floor cross members 150. According to the third embodiment of the invention, the reinforcement 122 is formed with a length from the point C to the point B.

The outer member 121 and the reinforcement 122 are together formed to have substantial hat-shaped sections. In assembling, flange parts 122a, 122b of the reinforcement 122 are respectively pinched between flange parts 121a, 121b of the outer member 121 and the floor panel 70 (and also the dash panel 130), respectively. In this state, the flange parts 122a, 121a and 122b, 121b are welded to the floor panel 70 and also the dash panel 130 by means of spot-welding.

According to the third embodiment, a waveform (deformation-mode) adjusting mechanism 300 is provided in both of the outer member 121 and the reinforcement 122.

By this deformation-mode adjusting mechanism 300, it is established that the number of peaks of a waveform in the buckling mode of the outer member 121 and the number of peaks of a waveform in the buckling mode of the reinforcement 122 are prime numbers different from each other.

Figure 39:
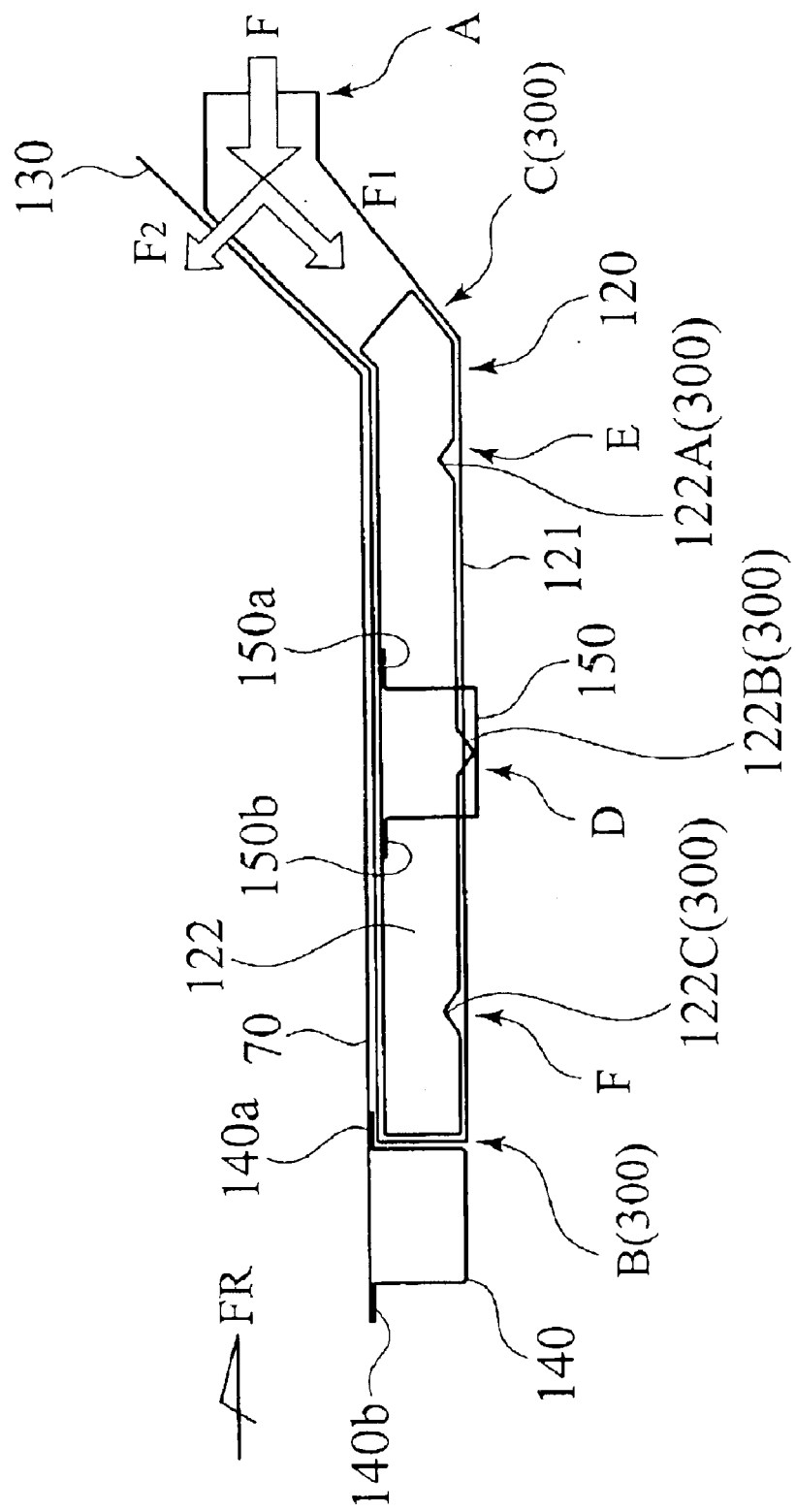
FIG. 39 is an explanatory side view of FIG. 37.

FIG. 39 shows a condition that the front side member 110 is subjected to a collision load F by a vehicle front collision.

At the vehicle front collision, the collision load F exerted to the front side member 110 in the axial direction is transmitted to the side member extension 120 at the above point A. Due to an inclination of the front end of the side member extension 120 directing the point C, the collision force F is divided at the point A into a component $F_1$ that directs the point C in the axial direction of the front portion of the side member extension 120 and another component $F_2$ perpendicular to the axial direction that induces a deformation to lift the front end of the extension 120.

Figure 40:
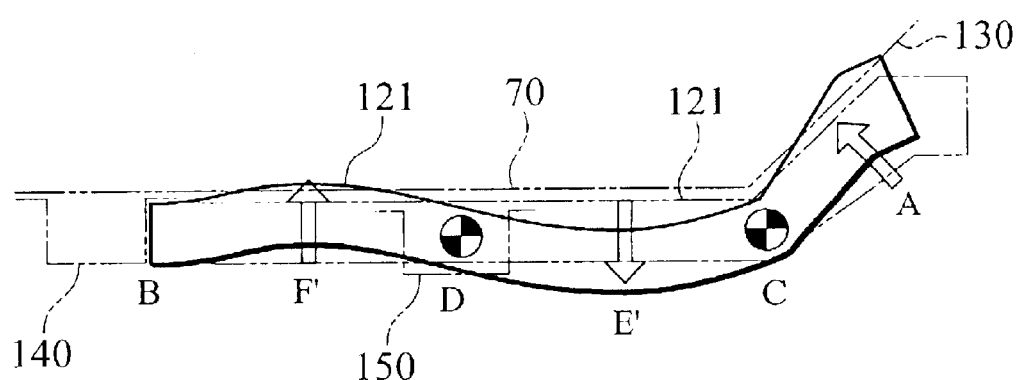
FIG. 40 is an explanatory side view of an outer member of FIG. 39, showing its buckling behavior.

Since the extension's portion at the point C forms a weakened part in the side member extension 120 in terms of strength, the front end becomes apt to be deformed behind the point A around the point C as a fulcrum of deformation. While, the extension's portions at the points D and B form strengthened parts due to the connections of the side member extension 120 with the floor cross member 150 and the rear cross member 140. Consequently, as shown in FIG. 40, these points C, D and B form so-called "nodes" in a wavy deformation about the side member extension 120, so that the extension's portions between the points C and D is buckled downward on the establishment of an intermediate point E' therebetween as a peak of buckling deformation, while the extension's portions between the points D and B is buckled upward on the establishment of an intermediate point F' therebetween as a peak of buckling deformation.

Therefore, in this embodiment, the so-called "strength changing parts" of the points C, D and B in the outer member 121 form the deformation-mode adjusting mechanism 300, and the number (n) of peaks in a buckling waveform is 2(two) of an even number.

As for the reinforcement 122, the deformation-mode adjusting mechanism 300 is arranged in positions shifted from the peak points E' and F' of the outer member 121 in the fore-and-aft direction, for example, a point E in about one-to-six position of the length of the reinforcement 122 from the front end, a point F in about one-to-six position of the length of the reinforcement 122 from the rear end and a position substantially identical to the point D.

The deformation-mode adjusting mechanism 300 is embodied by beads 122A, 122B, 122C as the weakened parts, formed on the bottom wall of the reinforcement 122 in the width direction. While allowing the beads 122A to 122C to coincide with the peak positions (i.e. the points E, F, D) of buckling deformation of FIG. 41 respectively, it is established that the number (n) of peaks in a buckling waveform is 3(three) of a prime number different from the number of peaks of the outer member 121.

Figure 41:
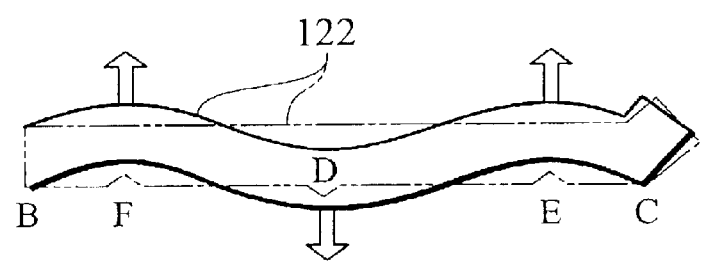
FIG. 41 is an explanatory side view of a reinforcement of FIG. 39, showing its buckling behavior.

FIGS. 40 and 41 show the operation of the side member extension 120 being subjected to the external force F by the vehicle front collision. FIG. 40 shows the deformation of the outer member 121, while FIG. 41 shows the deformation of the reinforcement 122.

The outer member 121 is buckled to be substantial S-shaped in side view while making the nodes in the wavy deformation of the points C, D 15 and B. On the other hand, in accordance with the projecting directions of the beads 122A, 122B, 122C, the reinforcement 122 is buckled upward at the point E by the bead 122A, downward at the point D by the bead 122B and again upward at the point B by the bead 122C.

Figure 42:
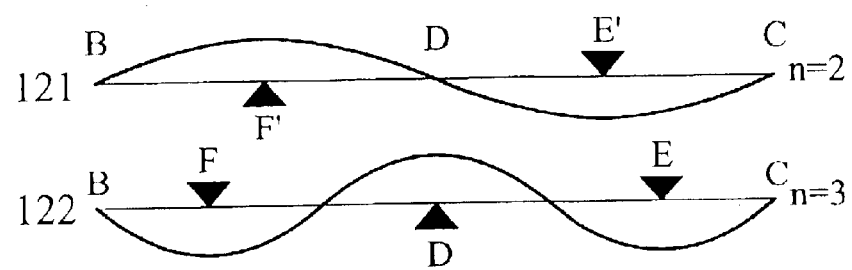
FIG. 42 is a waveform diagram to explain the buckling mode of the side member extension of the third embodiment of the invention.

That is, as shown in FIG. 42, the number of peaks of a waveform in the buckling mode of the outer member 121 is 2(two) of the points E' and F', while the number of peaks of a waveform in the buckling mode of the reinforcement 122 is 3(three) of the points E, D and F.

As a result, the side member extension 120 as a whole has six peaks of the points A, E, E', D, F' and F in a "bucking mode" waveform in the longitudinal direction, so that the deformation is dispersed in a wide area. Thus, at the initial stage of deformation, the outer member 121 and the reinforcement 122 are independently buckled to share the collision load, thereby allowing dispersion of the deformation to the whole side member extension 120.

With the progress of deformation, the outer member 121 interferes with the reinforcement 122 at the points A, E, E', D, F' and F; nevertheless these points are shifted from each other. Therefore, the growth of local deformations in both the outer member 121 and the reinforcement 122 can be restricted by interference therebetween and additionally, the deformation of the side member extension 120 can be restricted by a resistance force due to the interference. Further, a reaction force against collapse can be enhanced to increase an absorption of energy.

Figure 43:
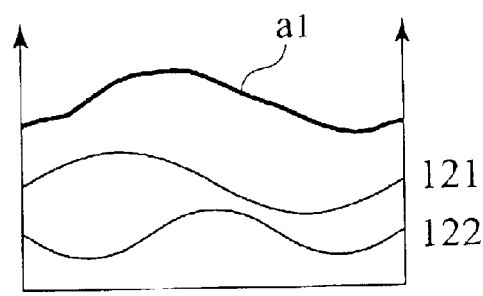
FIG. 43 is a graph to explain a deformation level of the side member extension of the third embodiment of the invention.

FIG. 43 illustrates an effect brought by the above dispersion of peak in the deformation mode. From the figure, it will be understood that since the positions of the peaks of the outer member 121 are deviated from the positions of the peaks of the reinforcement 122, a peak in the deformation mode of the whole side member extension 120 is dispersed to lower a deformation level of the center pillar, as shown with a line ($a_1$) in the figure. Accordingly, it is possible to enhance the reinforcing effect in the side member extension 120 without increasing the plate thicknesses of the outer member 121 and the reinforcement 122 or installing another reinforcing member, improving the performance of the side member extension 120 against collision.

Figure 44:
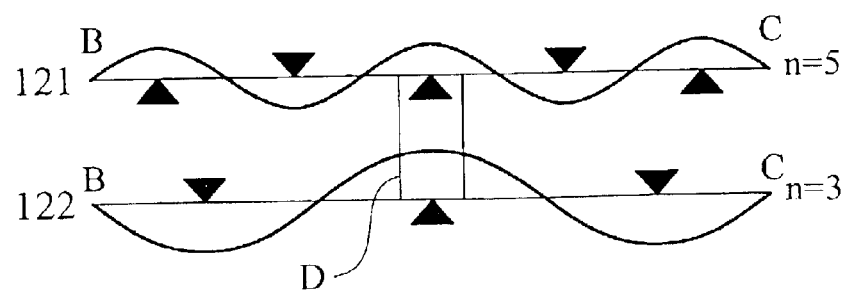
FIG. 44 is a waveform diagram showing an example of the different buckling mode.
Figure 45:
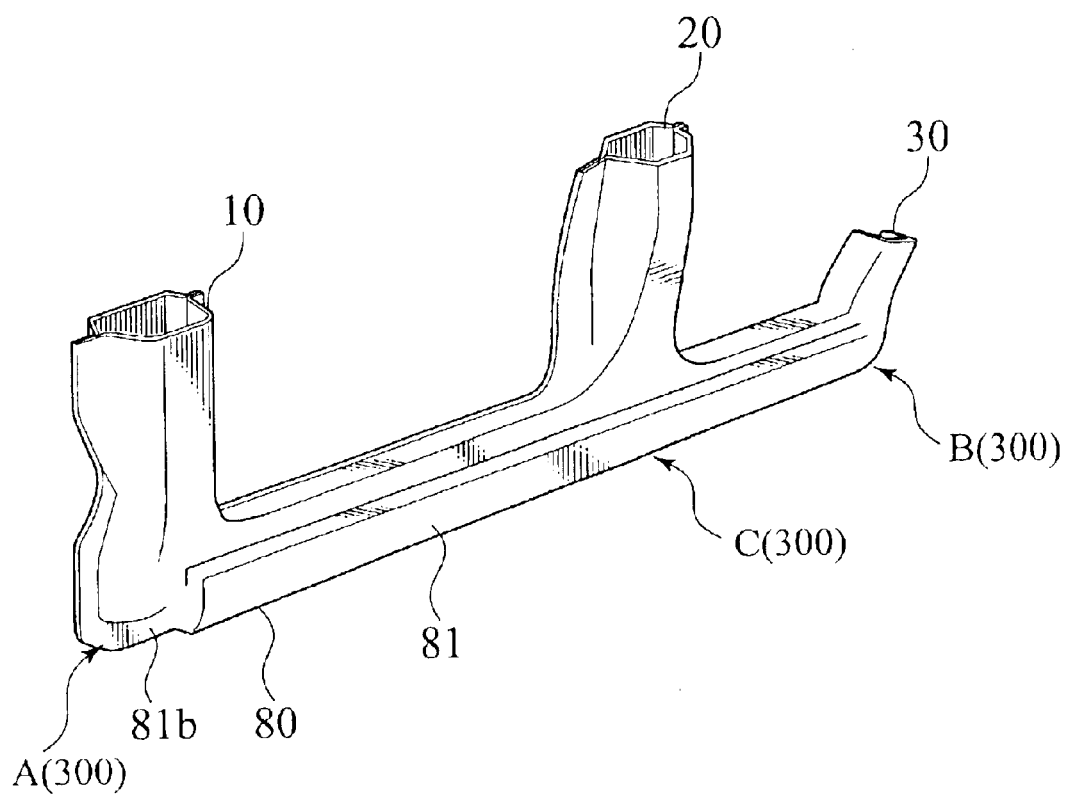
FIG. 45 is a perspective view of a side sill embodying the reinforcing structure in a first modification of the third embodiment of the invention.
Figure 46:
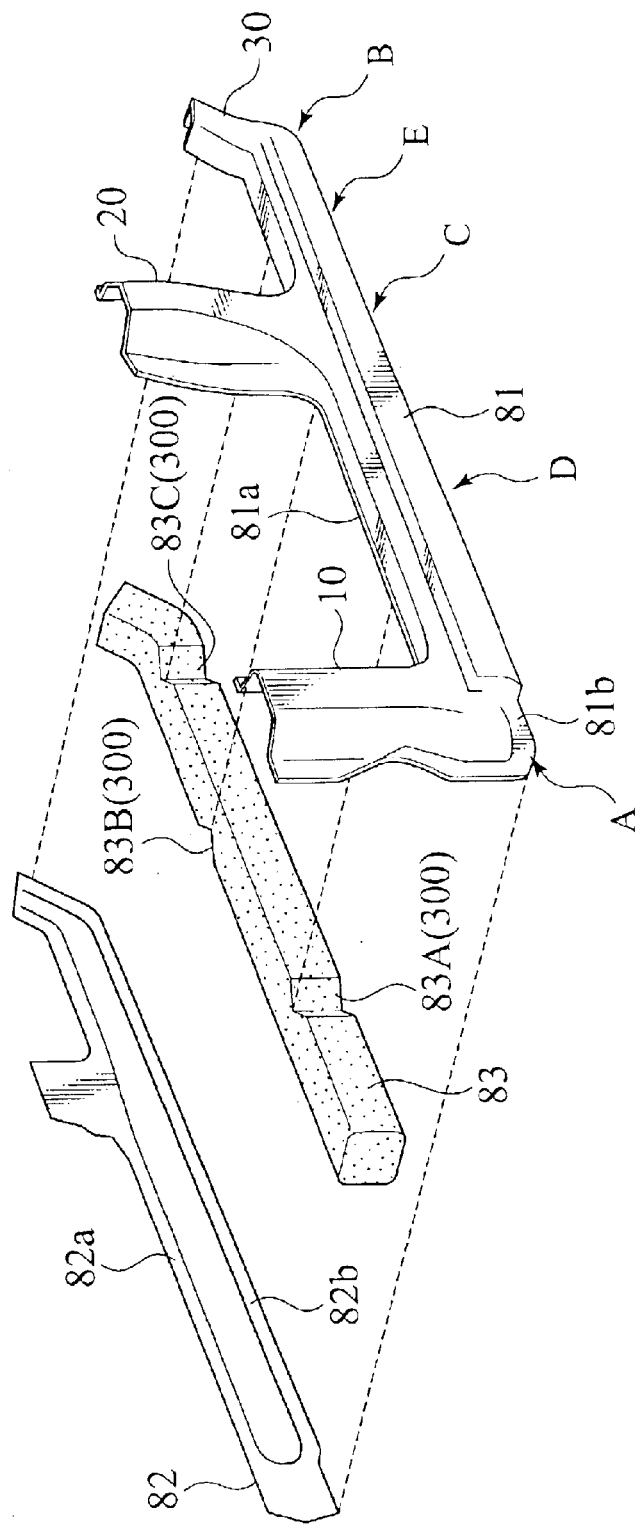
FIG. 46 is an exploded perspective view of FIG. 45.
Figure 47:
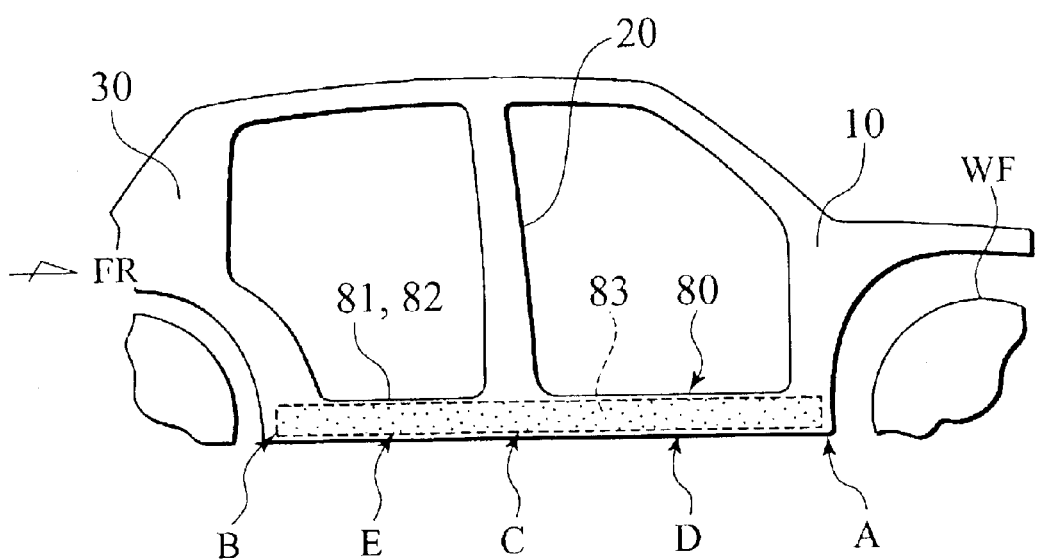
FIG. 47 is an explanatory side view showing the arrangement of a reinforcement of FIG. 46.

Particularly, since the number of peaks of a waveform in the buckling mode of the outer member 121 is 2(two) of an even number and the number of peaks of a waveform in the buckling mode of the reinforcement 122 is 3(three) of an odd number in this embodiment, the positions of the peaks of the outer member 121 and the reinforcement 122 do not agree with each other perfectly, thereby taking effect similar to the effects of the previously-mentioned embodiments. When the prime numbers as the number of peaks of both elements (121, 122) are respective odd numbers, for example, in case of the number of peaks of the outer member 121 being 5(five) and the number of peaks of the reinforcement 122 being 3(three) as shown in FIG. 44, only both peaks at the point D of both elements (121, 122) agree with each other. Nevertheless, if the outer member 121 is joined to the reinforcement 122 to reinforce the side member extension 120 at the point D, it becomes possible to avoid synchronization of the deformations of the outer member 121 and the reinforcement 122 in the side member extension 120 as a whole, thereby taking effect similar to the effects of the previously-mentioned embodiments.

Repeatedly, in the outer member 121, the deformation-mode adjusting mechanism 300 is formed by the strength changing parts owned by the member 121 in itself (i.e. indispensable bending part at the point C, connecting parts with the other framework members 140, 150). In the reinforcement 122, the deformation-mode adjusting mechanism 300 is formed by the beads 122A to 122C as the weakened part, which are formed in the aimed positions of peaks. That is, according to this embodiment, it is possible to construct the deformation-mode adjusting mechanism 300 with ease.

In the outer member 121, as a matter of course, the strength changing parts may be provided by processing the outer member 121 with reinforcing parts or weakened parts. Even so, since the number of peaks in the outer member 121 is smaller than the number of peaks in the reinforcement 122, the side member extension 120 will be advantageous in view of outward appearance.

Additionally, as the number of peaks in each element (121, 122) is adjusted between both ends of the same element in the longitudinal direction, it is possible to attain the optimum buckling mode in accordance with required properties.

(1st. Modification)

FIGS. 45 to 49 show the first modification of the third embodiment of the present invention. In this modification, the reinforcing structure in accordance with the above concept of the third embodiment is applied to the side sill 80 (also see FIG. 1).

The side sill 80 is formed by an outer member having a sill outer piece 81 and a sill inner piece 82, and a reinforcement 83 arranged inside the outer member (81, 82) to extend from the front end A of the outer member to the rear end B in the longitudinal direction.

The sill outer piece 81 and the sill inner piece 82 are shaped so as to have substantial hat-shaped sections. The sill outer piece 81 has respective flange parts 81a, 81b joined to respective flange parts 82a, 82b of the sill inner 82 by spot-welding, providing a closed section.

The outer member (81, 82) has a front-end point A connected to the front pillar 10, a rear-end point B connected to the rear pillar 30 and an intermediate point C between the points A and B, connected to the center pillar 20.

In this modification, these "strength changing parts" resulting from the connection with these framework members (10, 20, 30) form the deformation-mode adjusting mechanism 300.

Here, it is assumed that when a collision load F is exerted to the front-end point A of the side sill 80 in the axial direction through a front wheel WF, an outer-member's portion (81, 82) between the points A and C (as the bearing points) is buckled inward while making a deformation peak of a center point D' therebetween, and another outer-member's portion (81, 82) between the points B and C (as the bearing points) is buckled outward while making a deformation peak of a center point E' therebetween.

The reinforcement 83 of hard urethane is provided with a weakened part 83A at a point D shifted from the above point D' in the fore-and-aft direction, a weakened part 83B at a point E shifted from the above point E' in the fore-and-aft direction and a weakened part 83C at the point C. These weakened parts 83A to 83C of the reinforcement 83 form the deformation-mode adjusting mechanism 300.

The weakened parts 83A, 83C at the points D, E are formed by wedge-shaped vertical notches formed on an outside wall of the reinforcement 83, while the weakened part 83B at the point C is formed by a wedge-shaped vertical notches formed on an inside wall of the reinforcement 83. Due to the collision load F, respective portions of the reinforcement 83 are curved in the opposite directions to the notches of the weakened parts 83A to 83C while making the notches as respective deformation peaks. That is, the reinforcement 83 is buckled inward at the points D, E and also buckled outward at the point C.

Therefore, as similar to the third embodiment mentioned above, it is established that the number (n) of peaks in a buckling waveform of the outer member (81, 82) is 2(two) of a prime number and the number of peaks of a waveform in the buckling mode of the reinforcement 83 is 3(three) of a prime number different from the number of the outer member (81, 82).

Figure 48:
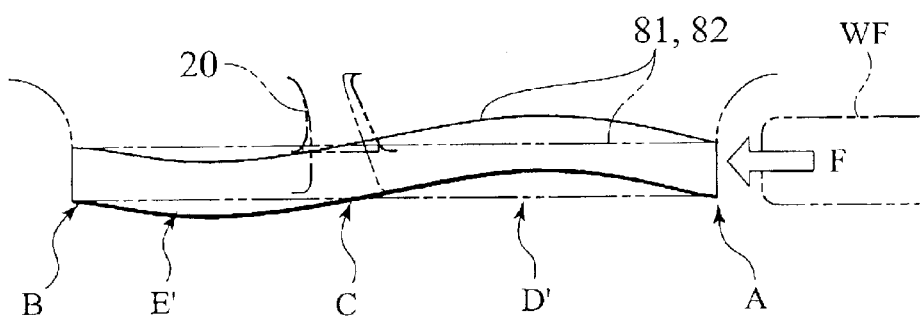
FIG. 48 is an explanatory side view of an outer member of FIG. 47, showing its buckling behavior.
Figure 49:
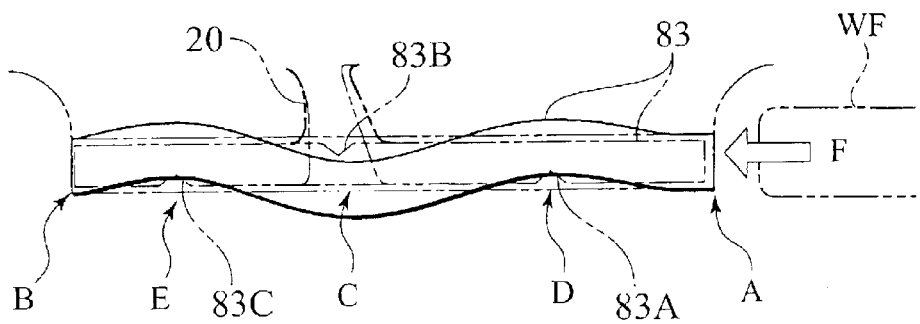
FIG. 49 is an explanatory side view of a reinforcement of FIG. 47, showing its buckling behavior.
Figure 50:
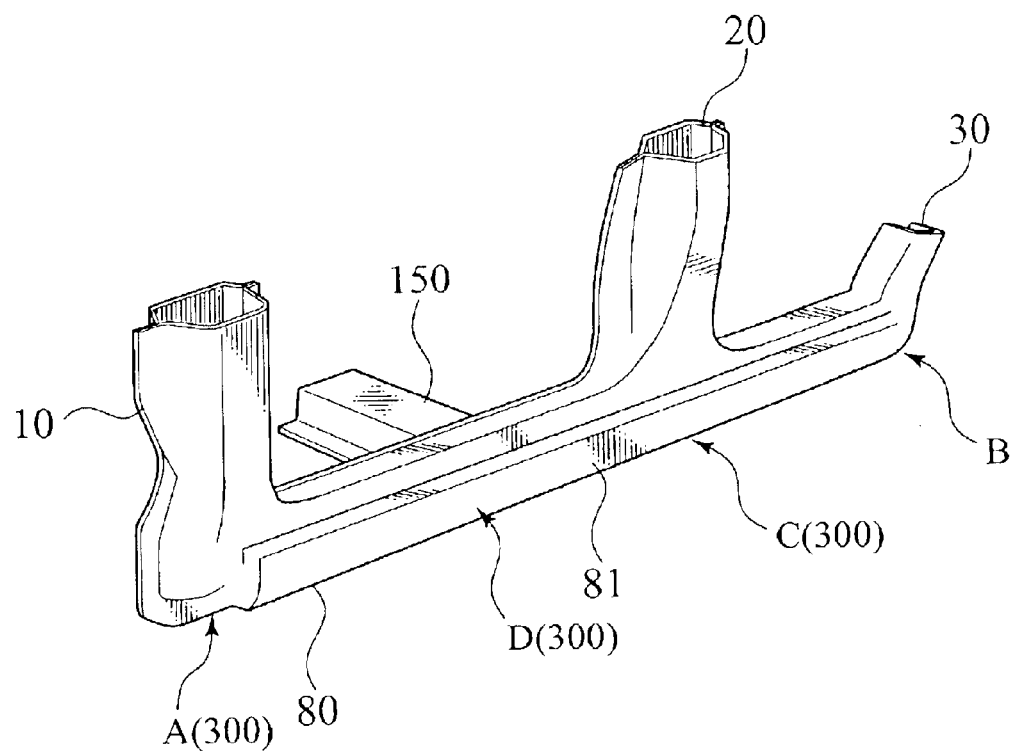
FIG. 50 is a perspective view of the side sill embodying the reinforcing structure in a second modification of the third embodiment of the invention.
Figure 51:
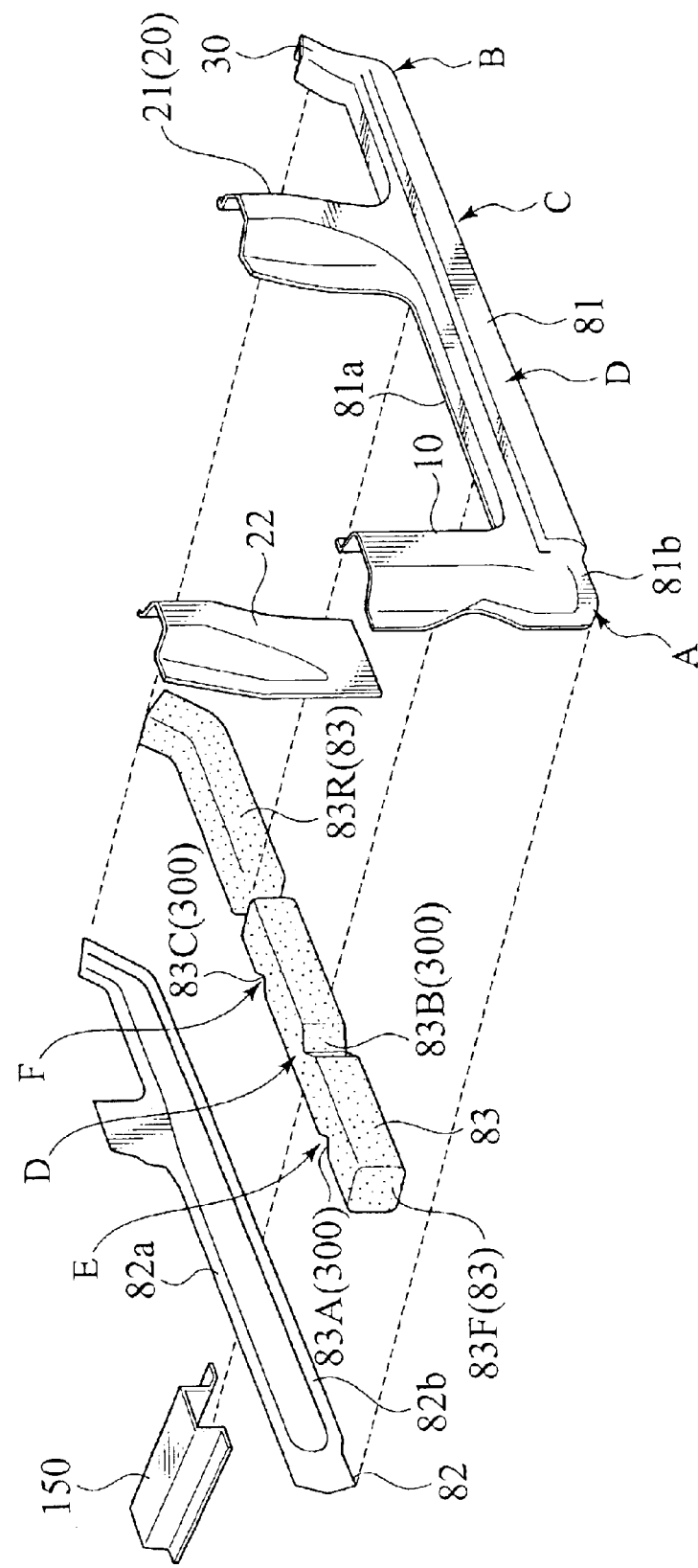
FIG. 51 is an exploded perspective view of FIG. 50.
Figure 52:
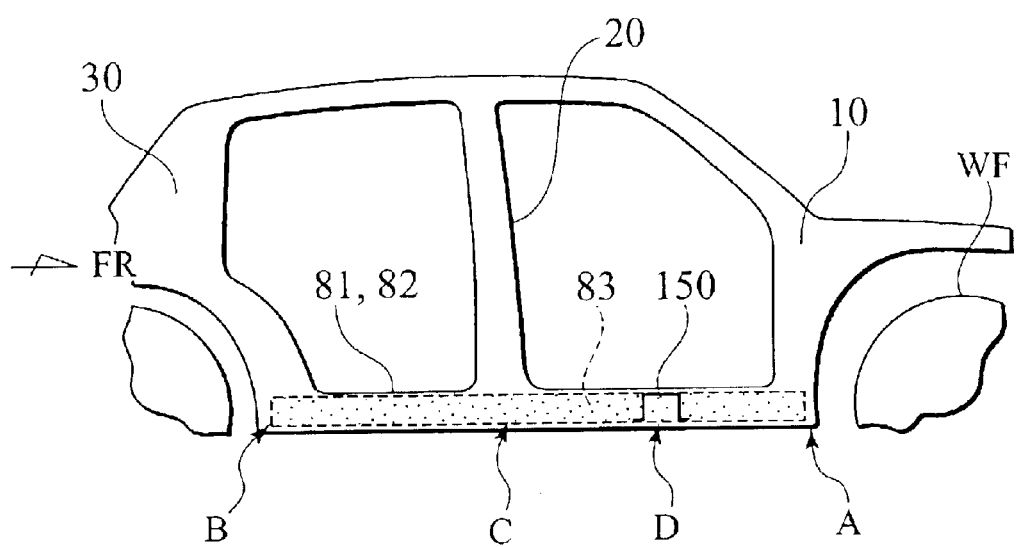
FIG. 52 is an explanatory side view showing the arrangement of a reinforcement of FIG. 51.
Figure 53:
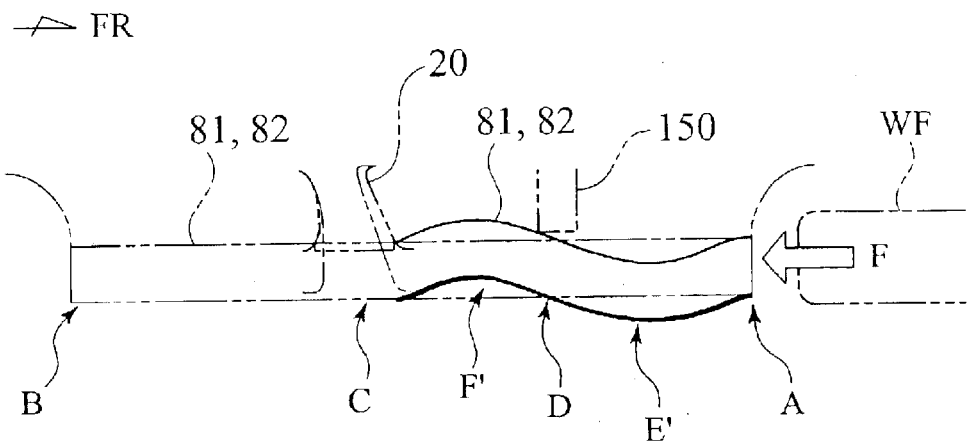
FIG. 53 is an explanatory plan view showing the buckling strength of an outer member of FIG. 51.
Figure 54:
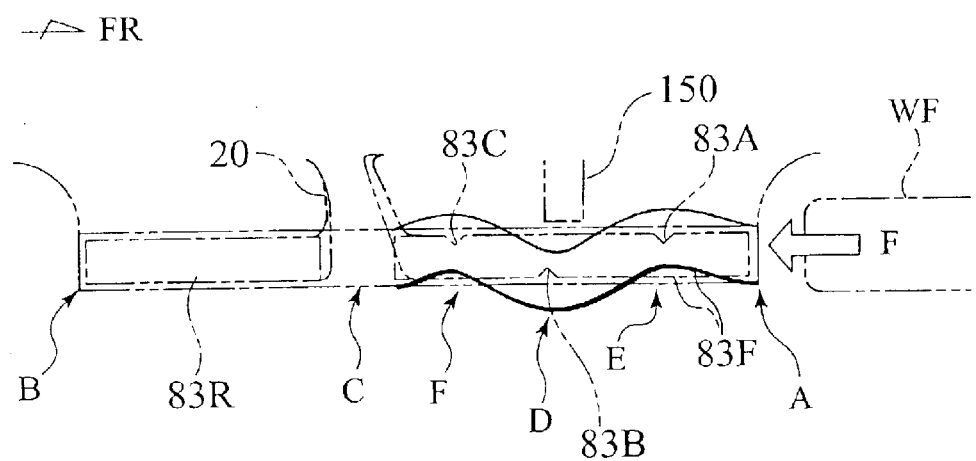
FIG. 54 is an explanatory plan view of a reinforcement of FIG. 51, showing its buckling behavior.

FIGS. 48 and 49 show the operation of the side sill 80 being subjected to the collision load F through the front wheel WF moved back at a vehicle front collision.

The outer member (81, 82) is buckled to be substantial S-shaped in plan view while making the nodes in the wavy deformation of the points A, C and B. On the other hand, the reinforcement 83 is buckled inward at the point D, outward at the point C and again inward at the point E while making the weakened parts 83A, 83B, 83C as the starting points of deformation.

As a result, the side sill 80 as a whole has respective peaks of the points D, D', C, E' and E in a "bucking mode" waveform in the longitudinal direction, so that the deformation is dispersed in a wide area. Thus, at the initial stage of deformation, the outer member (81, 82) and the reinforcement 83 are independently buckled to share the collision load, thereby allowing dispersion of the deformation to the whole side sill 80. With the progress of deformation, the outer member (81, 82) interferes with the reinforcement 83 at the above points D, D', C, E' and E; nevertheless these points are shifted from each other. Therefore, the growth of local deformations in both the outer member (81, 82) and the reinforcement 83 can be restricted by interference therebetween and additionally, the deformation of the side sill 80 can be restricted by a resistance force due to the interference, thereby taking effect similar to the effect of the third embodiment mentioned before.

Although it has been assumed that the outer member is buckled inward in its front half portion and outward in the rear half portion, the opposite case may be assumed with their reverse phases.

(2nd. Modification)

FIGS. 50 to 54 show the second modification of the third embodiment of the present invention. Also in this modification, the reinforcing structure in accordance with the above concept of the third embodiment is applied to the side sill 80.

According to the second modification, the reinforcement 83 of the first modification is divided into a front portion 83F and a rear portion 83R at the connecting part with the center pillar 20. The center pillar 20 includes an outer member 21 and a reinforcement 22 arranged inside the outer member 21 to extend up and down. The reinforcement 22 has its lower end extending toward the interior of the side sill 80. Respective partition ends of the portions 83F, 83R are arranged to abut against the lower end of the reinforcement 22.

Different from the arrangement of FIG. 38, the floor cross member 150 is welded to an upper face (cabin side) of the floor panel 70. Each end of the floor cross member 150 in the longitudinal direction is connected to a substantially intermediate part of the side sill 80 between the front pillar 10 and the center pillar 20.

In this modification, it is attempted to buckle the substantially-front part of the outer member (81, 82) in a S-shaped pattern in plan view by a collision load F while establishing the point A in connection with the front pillar 10, the point C in connection with the center pillar 20 and the point D in connection with the floor cross member 150 as the bearing points for the 36 side sill 80. Thus, respective reinforced parts at the points A, C and D form the deformation-mode adjusting mechanism 160 in the outer member (81, 82).

In this modification, the outer member (81, 82) is constructed so that, by the collision load F, one front portion between the points A and D is curved outward while making an intermediate point E' therebetween as a deformation peak and making the points A, C and D as bearing points, and that the other front portion between the points D and C is curved inward load F while making an intermediate point F' therebetween as a deformation peak.

Correspondingly, the front portion 83F of the reinforcement 83 is provided, at its inside positions shifted from the points E' and F' in the fore-and-aft direction, with weakened parts 83A, 83C in the form of wedge-shaped vertical notches. Further, a weakened part 83B in the form of a wedge-shaped vertical notch is also formed on the outside of the reinforcement 83 at a position substantially identical to the point D. These weakened parts 83A to 83C form the deformation-mode adjusting mechanism 300 in the reinforcement 83. Consequently, by the collision load F, the front portion 83F of the reinforcement 83 is buckled inward while making the points E, F as the deformation peaks and also buckled outward while making the point D as the deformation peak.

That is, in the second modification as well, it is established that the number (n) of peaks in a buckling waveform of the outer member (81, 82) is 2(two) of a prime number and the number of peaks of a waveform in the buckling mode of the reinforcement (front portion) 83F is 3(three) of a prime number different from the number of the outer member (81, 82).

Therefore, in the front half portion of the side sill 80 between the front pillar 10 and the center pillar 20, the outer member (81, 82) and the reinforcement (front portion) 83F exhibit a buckling behavior similar to that of the first modification (note: reverse phase in waveform mode against the first modification), thereby taking effect similar to that of the first modification.

Additionally, since the respective numbers of peaks in waveforms of the buckling mode of the outer member (81, 82) and the reinforcement 83 are adjusted in a specified area of the side sill 80 between the other framework members, for example, within a substantially-half part of the side sill 80 between o the front pillar 10 and the center pillar 20, the buckling deformation in the substantially-half part of the side sill 80 allows energy to be absorbed effectively.

[4th. Embodiment]

Figure 55:
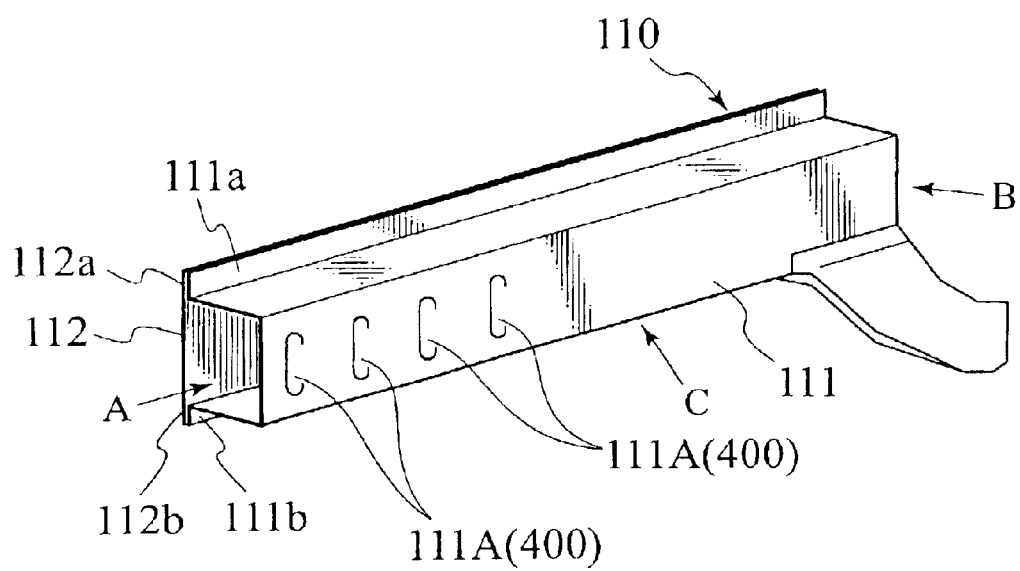
FIG. 55 is a perspective view of a front side member embodying the reinforcing structure in accordance with a fourth embodiment of the invention.
Figure 56:
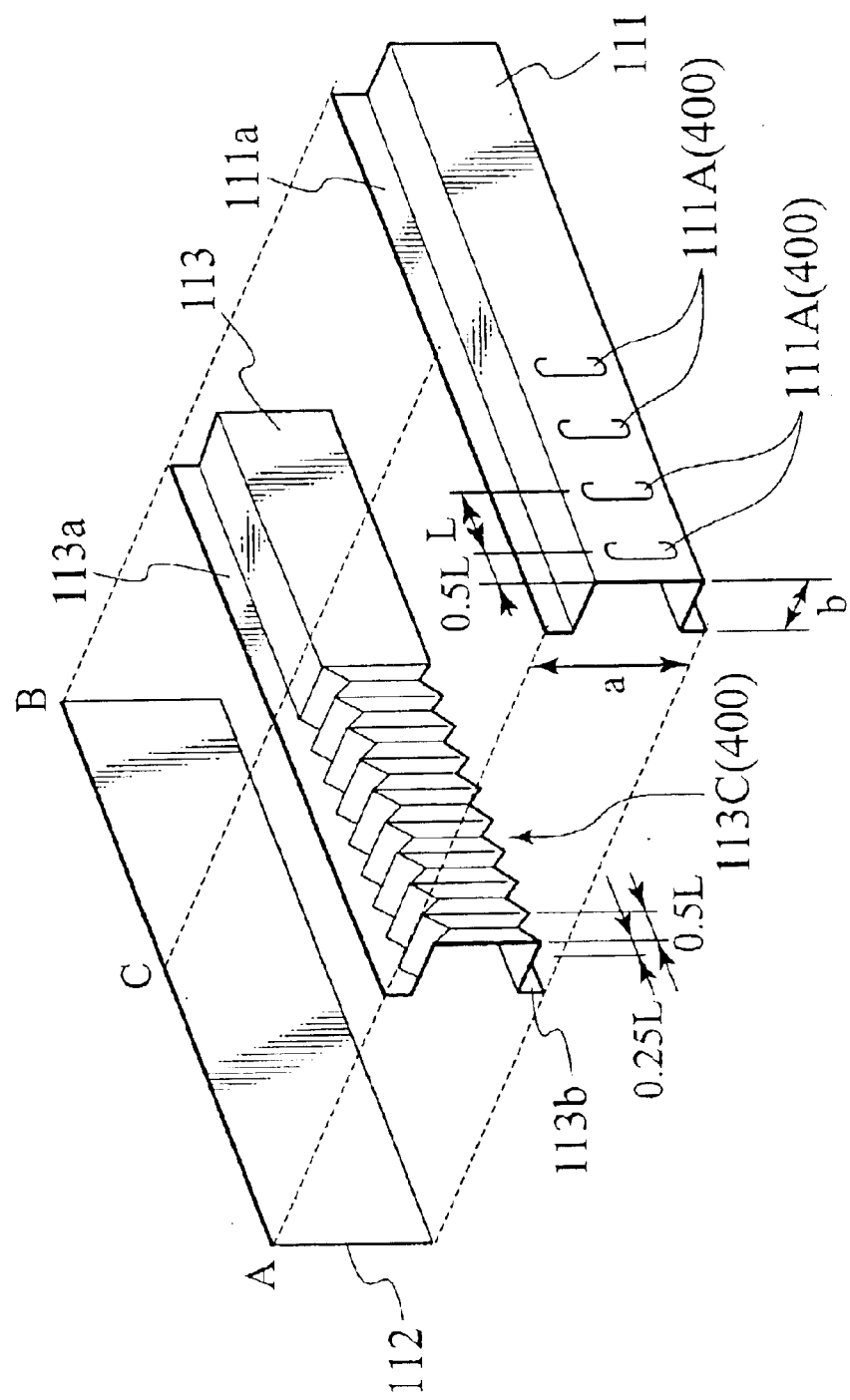
FIG. 56 is an exploded perspective view of FIG. 55.
Figure 57:
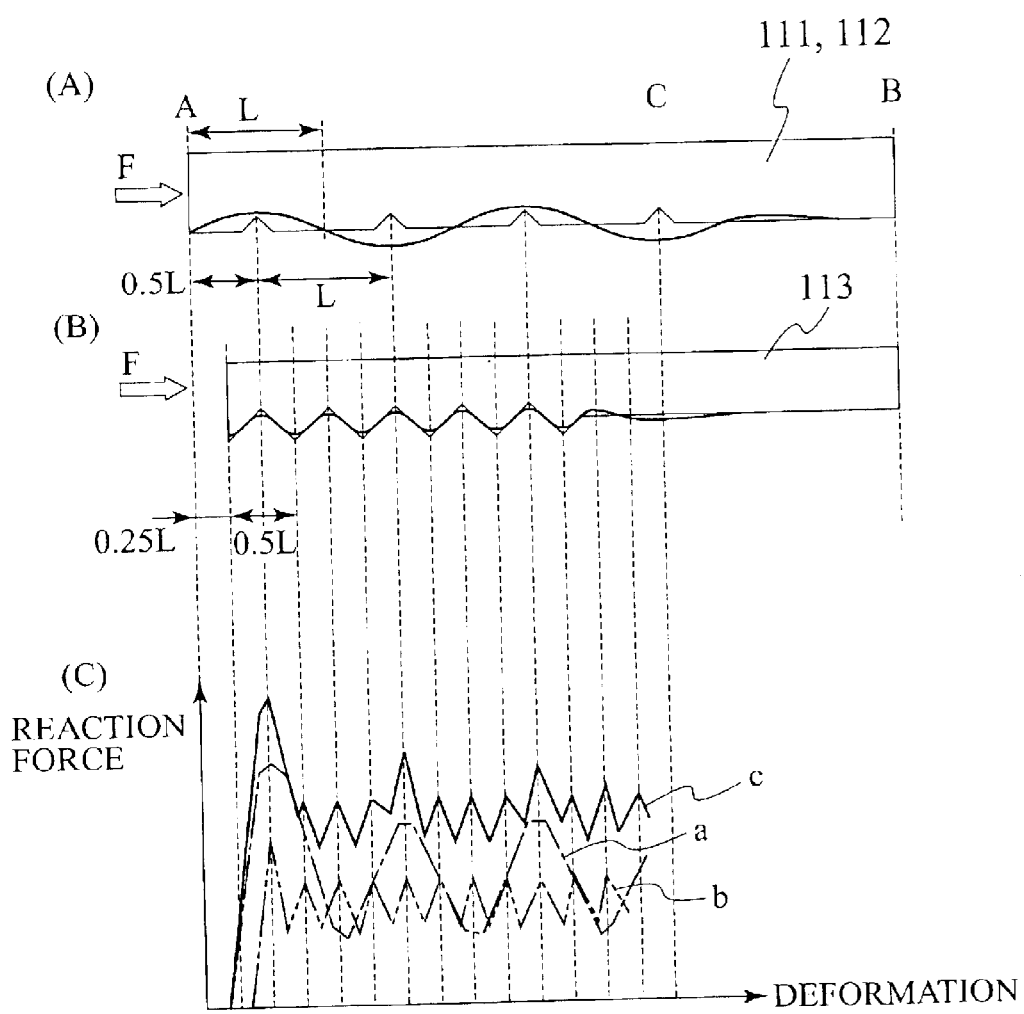
FIG. 57 is a graph explaining the operation of the front side member of FIG. 55.
Figure 58:
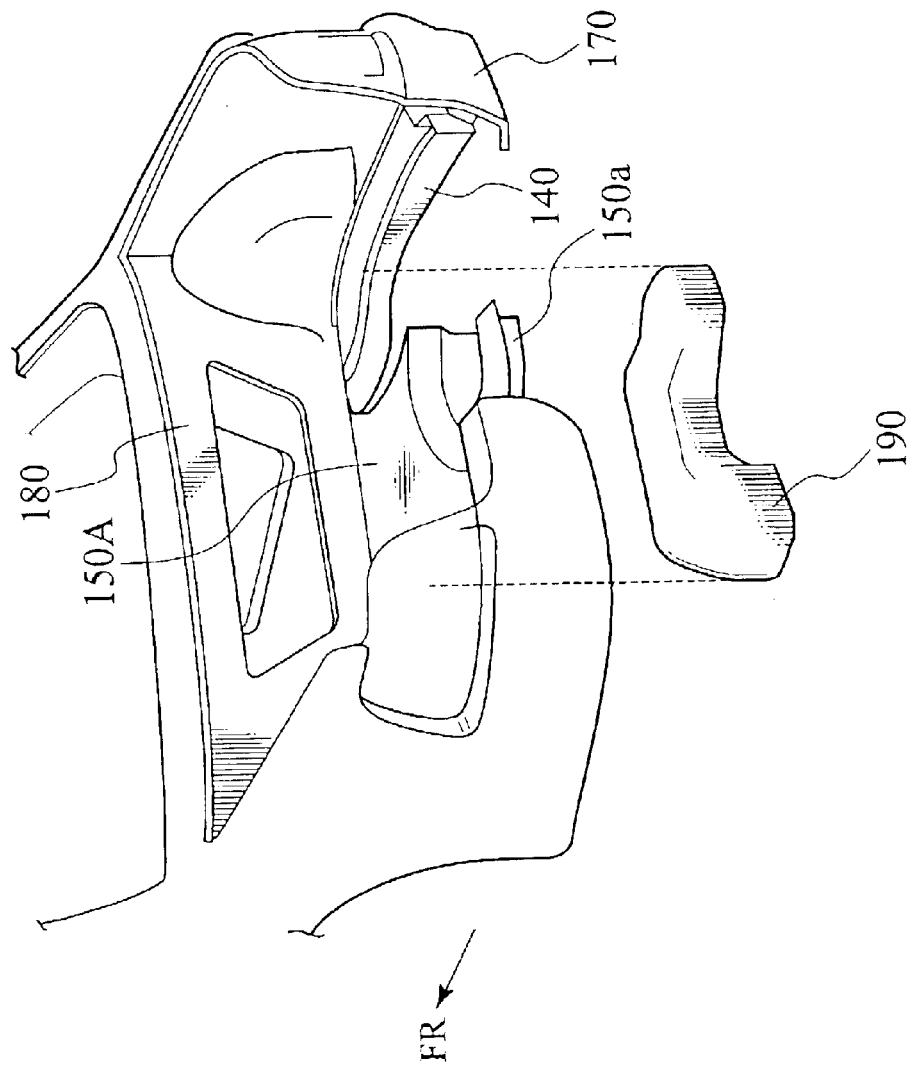
FIG. 58 is a partially-exploded perspective view showing a frame on the rear side of the vehicle, to which the present invention is applied.
Figure 59:
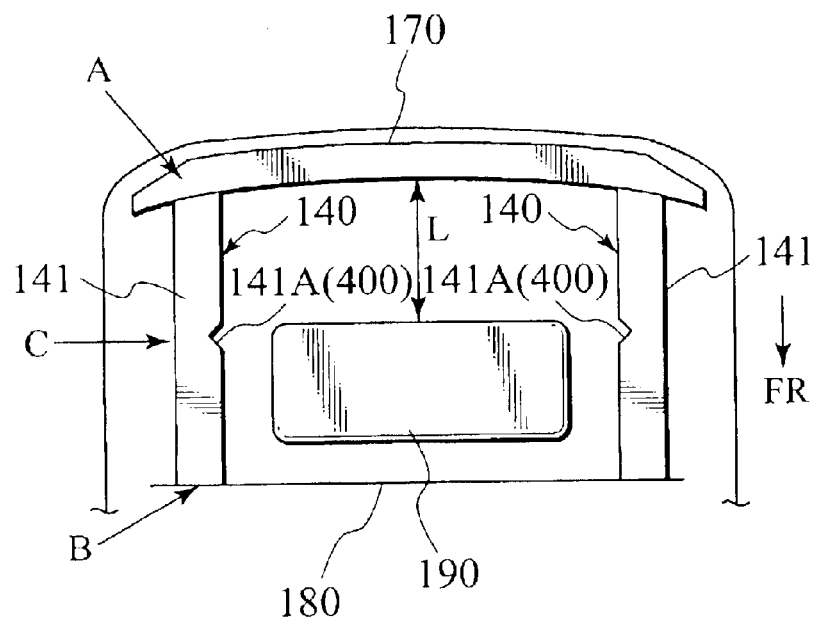
FIG. 59 is an explanatory plan view showing the arrangement of a rear side member in a first modification of the fourth embodiment of the invention.
Figure 60:
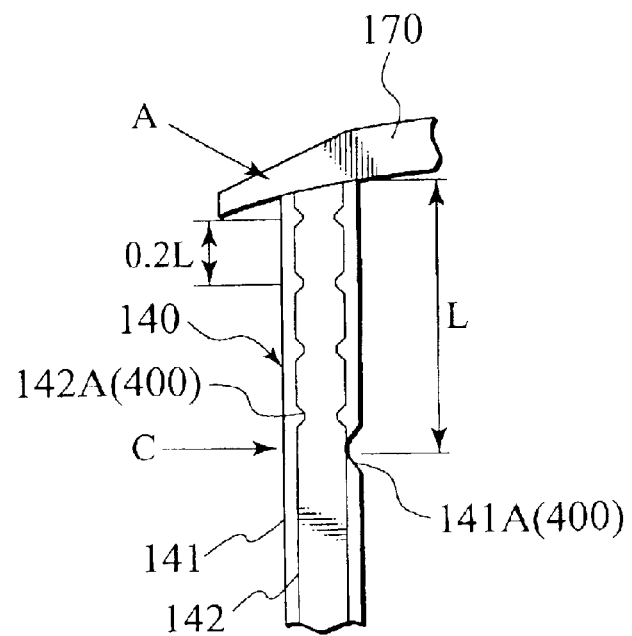
FIG. 60 is an enlarged view of part of FIG. 59.

FIGS. 55 to 57 show the fourth embodiment of the present invention. According to the fourth embodiment, the reinforcing structure of the invention is applied to the front side member 110 (also see FIG. 1).

The front side member 110 is formed by the outer member having the "member" inner piece 111 and the "member" outer piece 112, and the reinforcement 113 arranged inside the outer member (111, 112) to extend from the front end A of the outer member to the rear end B in the longitudinal direction.

The member inner piece 111 is shaped so as to have a substantial hat-shaped section, while the member outer piece 112 is shaped in the form of a flat plate. The member inner piece 111 has respective flange parts 111a, 111b joined to respective flange parts 112a, 112b of the member outer piece 112 by spot-welding, providing a closed section.

Although the outer member (111, 112) and the reinforcement 113 of the front side member 110 are respectively made from frame materials in the embodiment, these elements (111, 112, 113) may be formed by hollow extrusions of light metals, such as aluminum alloy.

As for the buckling properties of the outer member (111, 112) and the reinforcement 113 in the axial direction, it is established that the number of peaks in a "buckling mode" waveform of the reinforcement 113 is more than twice the number of peaks in a "buckling mode" waveform of the outer member (111, 112).

Also in this embodiment, various weakened parts in the outer member (111, 112) and the reinforcement 113 form a waveform (deformation-mode) adjusting mechanism 400.

Here, a front end (i.e. connecting part with a front bumper) of the front side member 110 is represented by a point A, the rear end joined to the dash panel 130 (FIG. 1) by a point B and a substantial center between the front end and the rear end is represented by a point C, respectively. According to the embodiment, the member inner piece 111 is provided, on its sidewall, with a plurality of beads 111A as the weakened parts, which induce the buckling deformation in the piece's portion from the point A to the point C, thereby providing the deformation-mode adjusting mechanism 400 in the outer member (111, 112).

The bead 111A are provided in the form of dents all sinking into the inside of the member inner piece 111. When [a] represents a width of a longitudinal section of the outer member, [b] a width of the cross section and [L] represents an average of intervals (pitch) L of the adjoining beads 111A respectively, there is established the following relationship among these parameters:

$$L=(a+b)/2$$

Further, the foremost bead 111A is formed in a position apart from the point (front end) A by 0.5L.

On the other hand, the reinforcement 103 has a bellows part 113C (as the weakened part) formed on its upper, lower and side walls to extend from the point A to the point C, providing the deformation-mode adjusting mechanism 400 in the reinforcement 113.

The reinforcement 103 has it front end arranged in a position shifted from the point A designating the front end of the inner member 111 backward by 0.25L. The bellows part 113C is formed to extend from the front end of the reinforcement 103 up to the point C, consisting of respective bellows-pieces at intervals of 0.5L in pitch.

FIG. 57 shows the operation of the front side member 110 constructed above when it is subjected to an external force F by a front collision. In the figure, a diagram part (A) illustrates the buckling mode of the outer member (111, 112), a diagram part (B) the buckling mode of the reinforcement 113 and a diagram part (C) illustrates the property of reaction force of the front side member 110.

When the collision load (external force) F is exerted to the front end (point A) of the outer member (111, 112) at the vehicle front collision, a collapse is induced in the outer member at the beads 111A on the sidewall of the member inner piece 111 as the starting point of deformation. Consequently, the outer member (111, 112) is collapsed in the deformation mode of axial bellows, as shown in (A) of FIG. 57.

Then, there is produced one deformation peak (i.e. reaction peak) while the outer member (111, 112) is collapsed by one pitch L of the beads 111A.

On the other hand, although the reinforcement 113 is also collapsed in the axial direction since it receives the collision load via the front end, the deformation is started with a delay of 0.25L against the deformation at the point A of the outer member (111, 112). Additionally, since the front half part (point A to point C) of the reinforcement 113 is provided with the bellow part 113C originally, the reinforcement 113 is collapsed in the deformation mode of bellows in accordance with the shape of the bellows part 113C, as shown in (B) of FIG. 57. Then, there is produced one deformation peak (i.e. reaction peak) while the bellows part 113C is collapsed by one pitch 0.5L.

Accordingly, the outer member (111, 112) generates a first reaction peak in a position where the outer member has collapsed from the point A by a length of 0.5L as shown in with a line (a) of FIG. 57, while the reinforcement 113 also generates a first reaction peak in a position where the reinforcement 103 has collapsed from the point A by a length of 0.5L apart from the point A by a length of 0.5L as shown in with a line (b) of FIG. 57. Consequently, as shown with a resultant line (c) by putting respective reaction properties of the lines (a) and (b) together, it is possible to enhance an initial reaction force of the front side member 110 as a whole.

When the outer member (111, 112) has collapsed from the point A by a length of L, there is produced a trough (sink) of reaction force. At this time, however, the reaction property of the reinforcement 113 has already passed a trough (sink) of reaction force in a position apart from the point A by a length of 0.75L and therefore, the reinforcement 113 generates a next reaction peak in a position apart from the point A by a length of L. Consequently, it is possible to reduce the falling degree of a reaction force of the front side member 110 as a whole.

After that, the reaction peaks of the outer member (111, 112) and the reaction peaks of the reinforcement 113 are produced at different timing and different intervals respectively. Thus, it is possible to maintain a high level of reaction force irrespective of passage of time since the beginning of collapse and velocity of deformation, whereby the absorption of energy of the front side member 110 can be enhanced furthermore.

According to the fourth embodiment of the invention, since the outer member (111, 112) and the reinforcement 113 are respectively provided with the weakened parts (bead, bellows) 111A, 113C forming the deformation-mode adjusting mechanism 400, it is possible to establish the positions of the peaks in respective deformations of the outer member (111, 112) and the reinforcement 113 suitably and additionally, the adjustment of the weakened parts 111A, 113C in position and number allows the position of the peaks in the deformations to be modified in accordance with required properties of buckling mode easily.

(1st. Modification)

FIGS. 58 to 63 show the first modification of the fourth embodiment of the present invention. Also in this modification, the reinforcing structure in accordance with the above concept of the fourth embodiment is applied to rear side members 140.

On both left and right sides of a rear compartment, the rear side member 140 are arranged below a rear floor panel 150A to form a framework member in the fore-and-aft direction of the vehicle. Each rear side member 140 includes an outer member 141 welded to the lower face of the rear floor panel 150A to have a hollow (closed) section, and a reinforcement 142 arranged inside the outer member 141 to extend between both ends of the member 141 in the longitudinal direction.

In this modification, both of the outer member 141 and the reinforcement 142, which are made from respective frame members having substantial hat-shaped cross sections, are welded to the lower face of the rear floor panel 150A, thereby providing the above closed section. Alternatively, of course, these elements may be made from hollow extrusions of aluminum alloys or the like.

Here, a point A represents a position where the rear end of the outer member 141 is connected with a rear bumper 170, while a point B represents another position where the front end of the outer member 141 is connected with a lower reinforced part of a seat back panel 180. The reinforcement 142 is arranged so as to extend from the pint A to the point B.

Below the rear floor panel 150A, a fuel tank 120 is arranged in front of a spare-tire pan 150a and carried between the left rear side member 140 and the right rear side member 140.

At an intermediate position between the point A and the point B, for example, a center point C corresponding to the position of the rear end of the fuel tank 190, there is formed a bead 141A in each rear side member 140, which forms the weakened part to induce the buckling deformation of the member 140 due to an axial load applied thereon. In this modification, the beads 141A forms the deformation-mode adjusting mechanism 160 in the outer member 141 of the rear side member 140.

The bead 141A is formed by a vertical dent which sinks toward the interior side of the outer member 141, on its inner wall of in the width direction of the member 141. Consequently, when the axial load is exerted to the rear side member 140, the outer member 141 can be deformed outward in the width direction of the vehicle to prevent its interference with the fuel tank 190. In the rear side member 140, a peak of deformation due to the axial load is formed by the bead 141A as the starting point of the deformation, so that the outer member 141 is sure to be deformed outward in the width direction of the vehicle. Therefore, in this modification, the bead 141A forms a deformation control mechanism for restricting the deformation of the rear side member 140, in addition to the deformation-mode adjusting mechanism 400.

On the other hand, the reinforcement 142 is provided, from the point A to the point C, with a bellows part 142A which forms the deformation-mode adjusting mechanism 400 in the reinforcement 142 of the rear side member 140.

When an effective collapse space for the rear compartment by a vehicle rear collision is assumed to be a range L from the point A up to the rear end of the fuel tank 180, it is desirable to form the bellows part 142A including bellows-pieces at intervals of a tiny pitch less than 0.5L as possible and also desirable to arrange the so-formed bellows part 142A on the side of the point A closer to the point C as the main deformation peak of the outer member 141, in concentration. In this modification, the bellows part 142A is formed so as to have bellows-pieces at intervals of a tiny pitch of 0.2L, thereby producing the deformation peaks five times as many as the number of peaks of the outer member 141.

Figure 61:
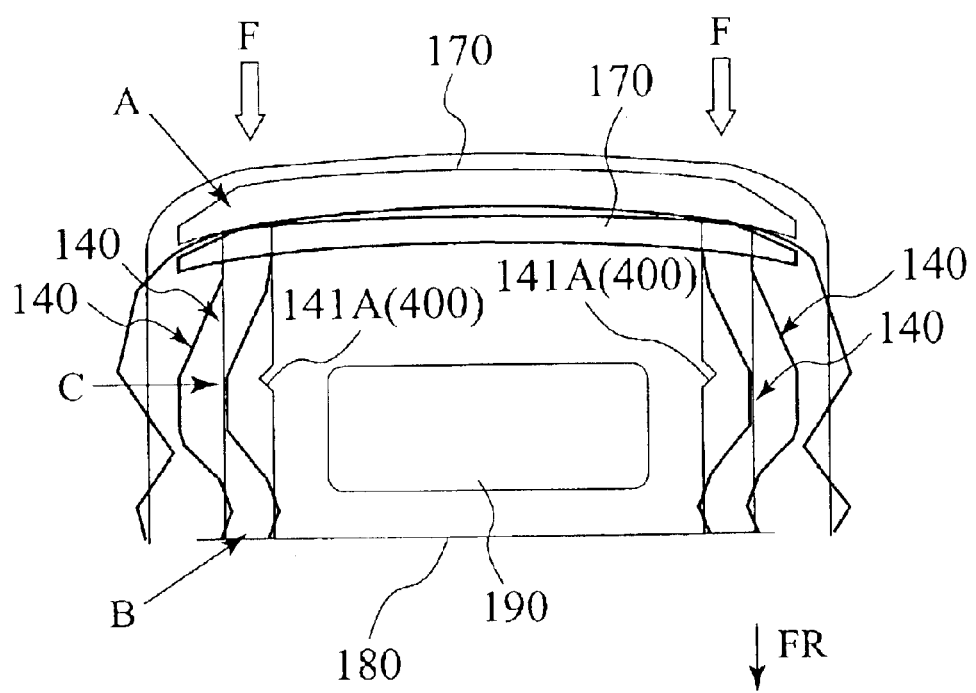
FIG. 61 is an explanatory view which shows a deformation behavior of the rear side member in a first modification of the fourth embodiment.
Figure 62:
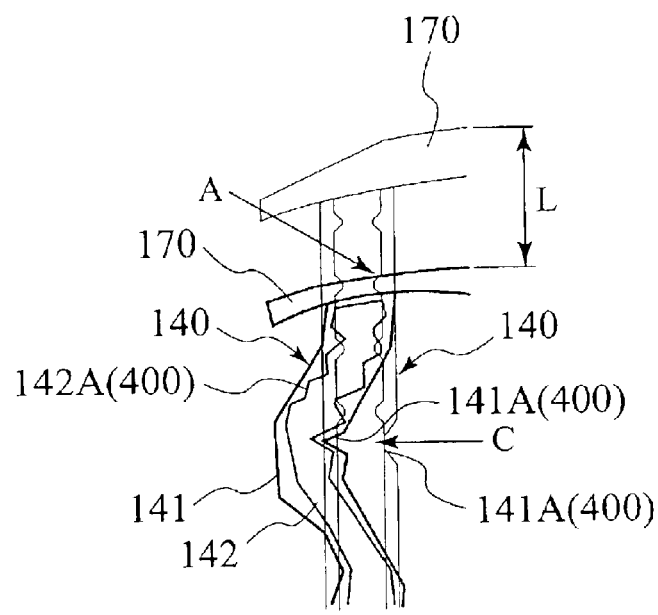
FIG. 62 is an enlarged view of part of FIG. 61.

FIGS. 61 and 62 show the operation of the rear side members 140 constructed above when they are subjected to an external force F by a rear collision.

When the collision load (external force) F is exerted to the respective rear ends (point A) of the outer members 141 by the vehicle rear collision, the outer members 141 are buckled with the beads 141A as the starting points of deformation. Consequently, each of the outer members 141 is folded outward in the width direction of the vehicle while making a deformation peak of the point C. Thus, there is produced one reaction peak while the outer member 141 is folded in the range of L.

On the other hand, the reinforcement 113 is also collapsed in the axial direction since it receives the collision load F via the front end (point A) and finally deformed outward in the width direction under the influence of folding of the outer member 141. However, since the bellows part 142A between the point A and the point C is formed so as to have bellows-pieces at intervals of a pitch of 0.2L, the reinforcement 142 produces five bellows-shaped deformations at the maximum, so that five reaction peaks appear at the maximum as well.

Figure 63:
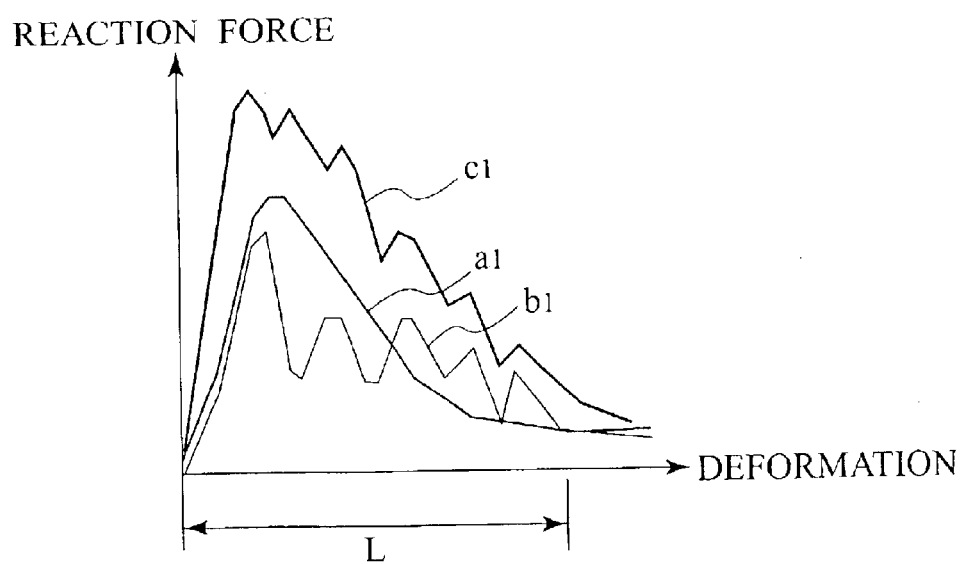
FIG. 63 is a graph showing the level of a reaction force of the first modification of the fourth embodiment.
Figure 64:
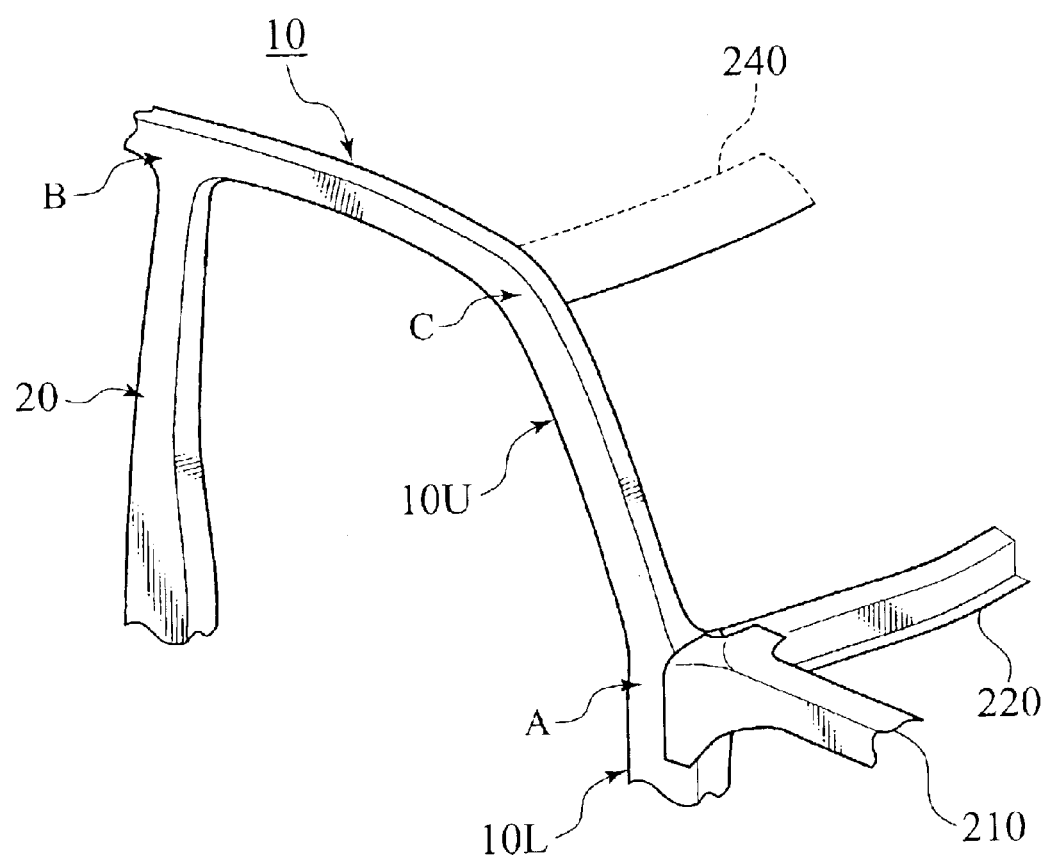
FIG. 64 is a perspective view of a front pillar embodying the reinforcing structure in accordance with a fifth embodiment of the invention.

FIG. 63 show the properties of reaction force of the rear side members 140. In the figure, a line $(a_1)$ designates the reaction property of the outer member 141, a line $(b_1)$ the reaction property of the reinforcement 142, and a line $(a_1)$ designates the reaction property as a result of composing these properties.

As it will be understood from the figure, the outer member 141 produces the only reaction peak while the rear side member 140 is deformed within the area of L, so that the reaction force falls after passing the reaction peak. To the contrary, the reinforcement 142 produces five reaction peaks at the maximum. Therefore, it is possible to restrict the reduction of reaction force in the latter half of deformation. As similar to the fourth embodiment mentioned before, it is possible to maintain a high level of reaction force irrespective of passage of time since the beginning of collapse and velocity of deformation, whereby the absorption of energy of the rear side member 140 can be enhanced furthermore.

Especially, according to this modification of the fourth embodiment, each outer member 141 is provided with the bead 141A as the deformation-mode adjusting mechanism 400 and also the deformation control mechanism, which allows the deformation peak (at the point C) of the outer member 141 to grow into a specified direction, i.e., outside in the width direction of the vehicle due to the axial load. Therefore, the rear side members 140 of the modification become effective in arranging a protection component, such as the fuel tank 190, out of the influence of collision. Additionally, owing to the provision of the bellows part 142A, since each reinforcement 142 is adapted to concentrate the deformation peaks on the reinforcement's side closer to the point A (input of load) in comparison with the point C of the main peak position of the outer member 141, it is possible to maintain a stable and high reaction force in the latter term of deformation while compensating the reduction in reaction force of the outer member 141.

Repeatedly, the deformation-mode adjusting mechanism 400 is formed by the weakened parts, for example, the beads 111A, 141A and the bellows parts 113C, 142A (i.e. gather of beads) in the fourth embodiment. In a modification, the deformation-mode adjusting mechanism 400 may include a member's parts for concentrating a stress, for example, "strength" changing parts, inflections on profile, etc.

[5th. Embodiment]

FIGS. 64 to 69 show the fifth embodiment of the present invention. According to the fifth embodiment, the reinforcing structure of the invention is applied to the front pillar 10, as similar to the first embodiment.

In this embodiment, elements similar to those of the first embodiment are indicated with the same reference numerals, respectively.

Similarly, the front pillar 10 is formed by the hollow (closed)-sectional outer member having the pillar outer piece 11 and the pillar inner piece 12, and the reinforcement 13 arranged inside the outer member 10 to extend from the front end A of the outer member 11 to the rear end B in the longitudinal direction.

Both of the pillar outer piece 11 and the pillar inner piece 12 are formed to have substantial hat-shaped sections. The closed section of the outer member is obtained by spot-welding the flange parts 11a of the pillar outer piece 11 with the flange parts 12a of the pillar inner piece 12, respectively.

The outer member (11, 12) is formed, at a point C near the center part bending up and down, with a three-forked structure for connection with a header rail 240 as another framework member, providing the opening 15 on the side of the pillar inner piece 12.

Similarly to the pillar outer piece 11 and the pillar inner piece 12, the reinforcement 13 is formed with a substantial hat-shaped section. In this embodiment, the reinforcement 13 is arranged so as to extend along the inner face of the pillar outer piece 11. Alternatively, according to the specifications of design, the reinforcement 13 may be arranged so as to extend along the inner face of the pillar inner piece 12.

The flange parts 13a of the reinforcement 13 is pinched between the flange part 11a of the pillar outer piece 11 and the flange part 12a of the pillar inner piece 12 and also formed into one body by spot-welding.

Although the closed section of the front pillar 10 is provided by spot-welding two frame members (i.e. the pillar outer piece 11, the pillar inner piece 12) to each other in the fifth embodiment, the outer member may be formed by a hollow extrusion of light metal, such as aluminum alloy. Further, the reinforcement 13 may be made of hard urethane in place of the frame member.

In the embodiment, the above front end A of the outer member (11, 12) designates its part to be connected with other framework members, on the boundary between a pillar upper portion 10U and a pillar lower portion 10L. The other framework members comprise a hood ridge member 210 and a cowl member 220. As well, the above rear end B designates another part of the outer member to be connected with the upper end of the center pillar 20.

According to the embodiment, a waveform adjusting mechanism 500 is provided in each of the outer member (11, 12) and the reinforcement 13 in order to make the positions of respective peaks of the "buckling-mode" waveforms of the outer member (11, 12) and the reinforcement 13 different from each other.

Figure 65:
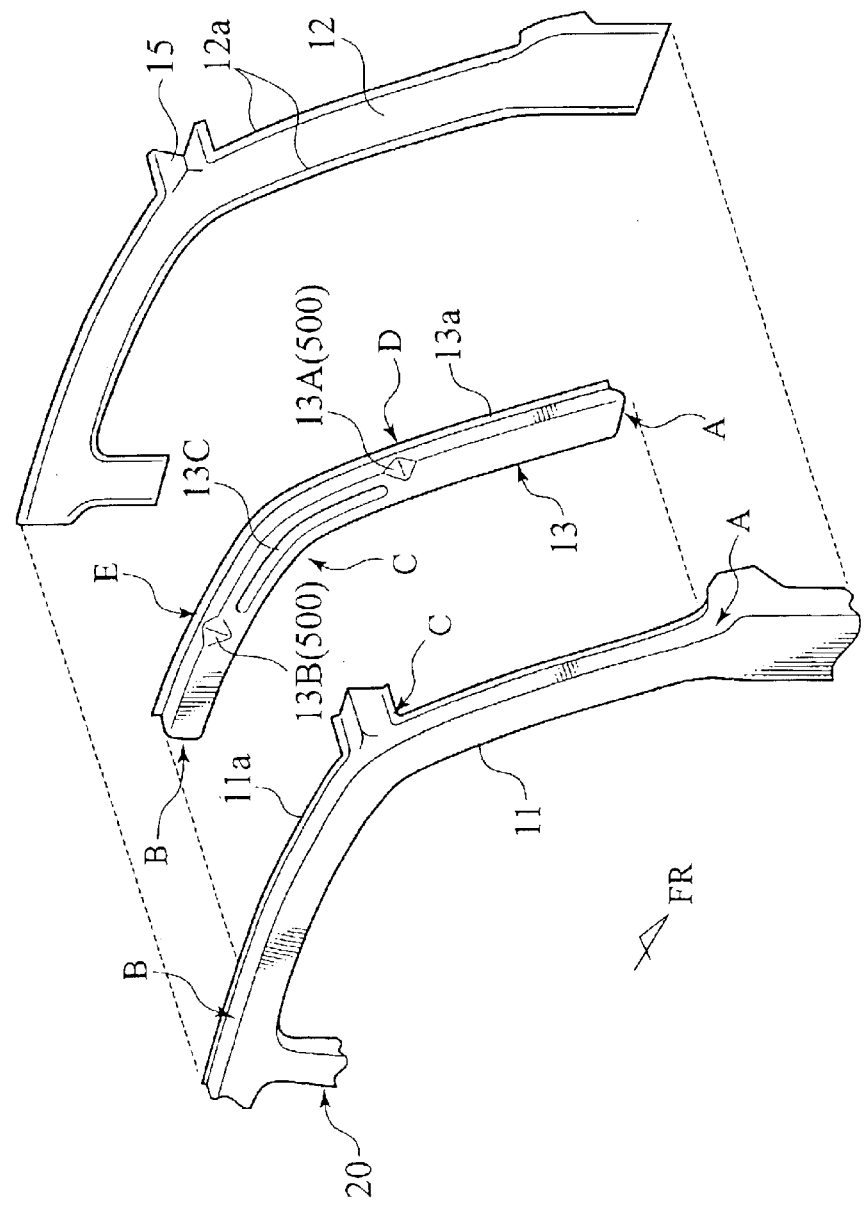
FIG. 65 is an exploded perspective view of FIG. 64.
Figure 66:
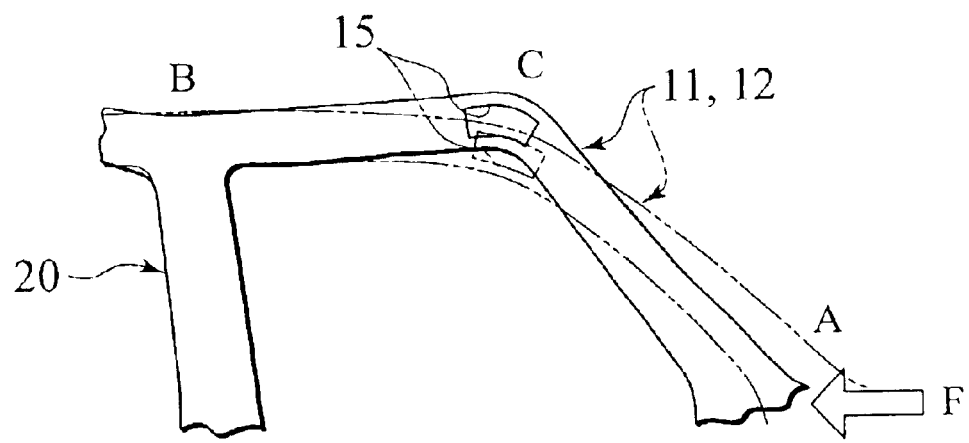
FIG. 66 is a side view showing the buckling behavior of an outer member of FIG. 65.

As shown in FIG. 65, the intermediate portion of the outer member (11, 12) near the point C is substantial V-shaped in side view and also provided with the opening 15, thereby forming a weakened part in strength. Thus, when a collision load F is exerted to the point A from the front side of the vehicle, the outer member (11, 12) is buckled into the bending direction of the intermediate portion near the point C as the starting point of deformation, as shown in FIG. 66. Therefore, this weakened part at the point C forms the waveform adjusting mechanism 500 in the outer member (11, 12).

On the other hand, the reinforcement 13 is provided, on its upper edge, with two beads 13A, 13B as the weakened part to induce the buckling deformation. The bead 13A is positioned at an intermediate point D between the point A and the point C, while the bead 13B is positioned at an intermediate point E between the point C and the point B. That is, these beads 13A, 13B form the waveform adjusting mechanism 500 in the reinforcement 13.

As occasion demands, a reinforcing bead 13C may be provided between the point D and the point E to extent in the longitudinal direction of the reinforcement 13, as shown in FIG. 65.

Figure 67:
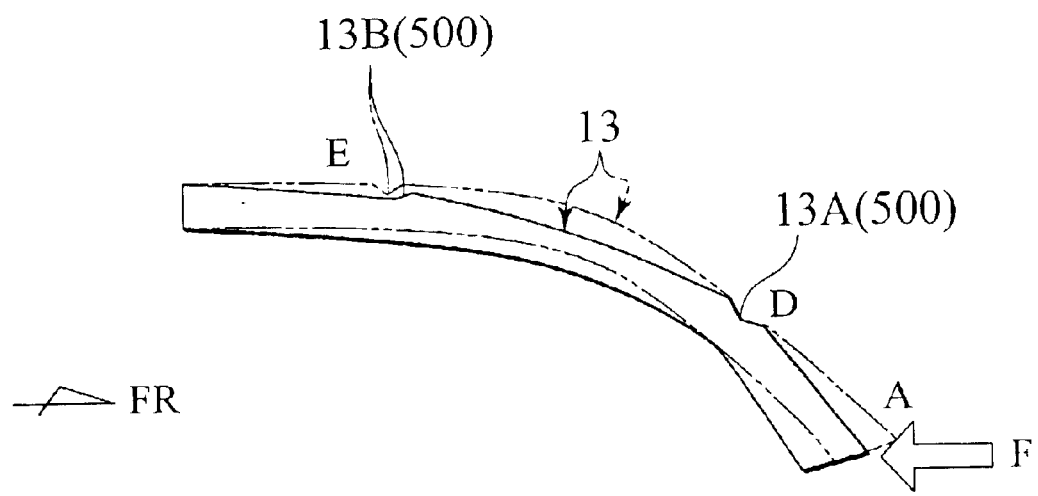
FIG. 67 is a side view showing the buckling behavior of a reinforcement of FIG. 65.
Figure 68:
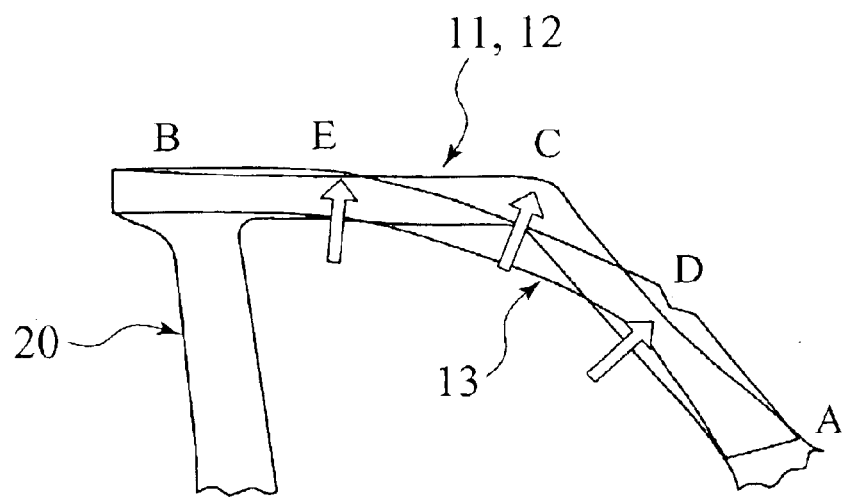
FIG. 68 is a side view combining the buckling behavior of the outer member with the buckling behavior of the reinforcement of FIGS. 66 and 67.

FIGS. 66 to 68 show the operation of the front pillar 10 of the embodiment when it is subjected to the external force F by a vehicle front collision. In the figures, FIG. 66 illustrates the buckling form of the outer member (11, 12), FIG. 67 the buckling form of the reinforcement 13, and the FIG. 68 illustrates the deformation form resulting from the combination of the buckling of the outer member (11, 12) with the buckling of the reinforcement 13.

With the action of a collision load D on the point A of the outer member (11, 12) from its front, the portion at the point C makes a starting point of buckling because of its weakness due to the presence of the bending part and the opening 15, as shown in FIG. 66.

On the other hand, since the reinforcement 13 has the weakened parts 13A, 13B at the points D, E shifted from the point C in front and behind, the reinforcement's portion between the point A and the point C starts a deformation with the point C as a center of the deformation, while the reinforcement's portion between the point C and the point B starts a deformation with the point E as a center of the deformation, as shown in FIG. 67.

That is, the outer member (11, 12) has a single peak of buckling-mode waveform formed by the point C, while the reinforcement 13 has two peaks of buckling-mode waveform formed by the points D, E.

As a result, due to three peaks D, C, E of buckling-mode waveforms, the deformation is dispersed into wide area in the whole front pillar 10 in the longitudinal direction, as shown in FIG. 68. Thus, since the outer member (11, 12) and the reinforcement 13 share the collision load independently of each other at the initial stage of deformation, it is possible to disperse the deformation into the whole front pillar 10.

With the progress of deformation, the outer member (11, 12) and the reinforcement 13 interfere with each other at the points E, C and D. Nevertheless, since their peaks of buckling-mode waveforms do not agree with each other, the growth of a local deformation is restricted due to a mutual interference between the outer member (11, 12) and the reinforcement 13. Additionally, it is possible to restrict the deformation of the front pillar 10 by a resistant force derived from the above mutual interference and also possible to increase the amount of energy absorption with an enhanced reaction force for collapse.

Figure 69:
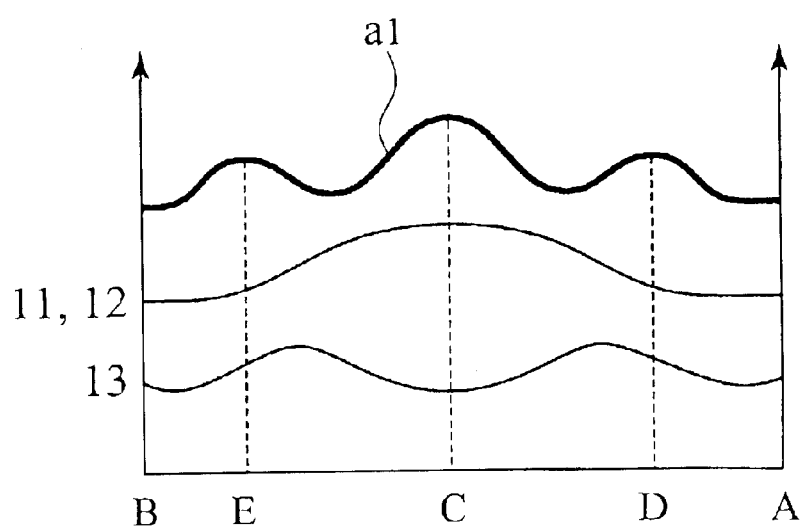
FIG. 69 is a waveform diagram explaining the buckling mode of the front pillar of the fifth embodiment.
Figure 70:
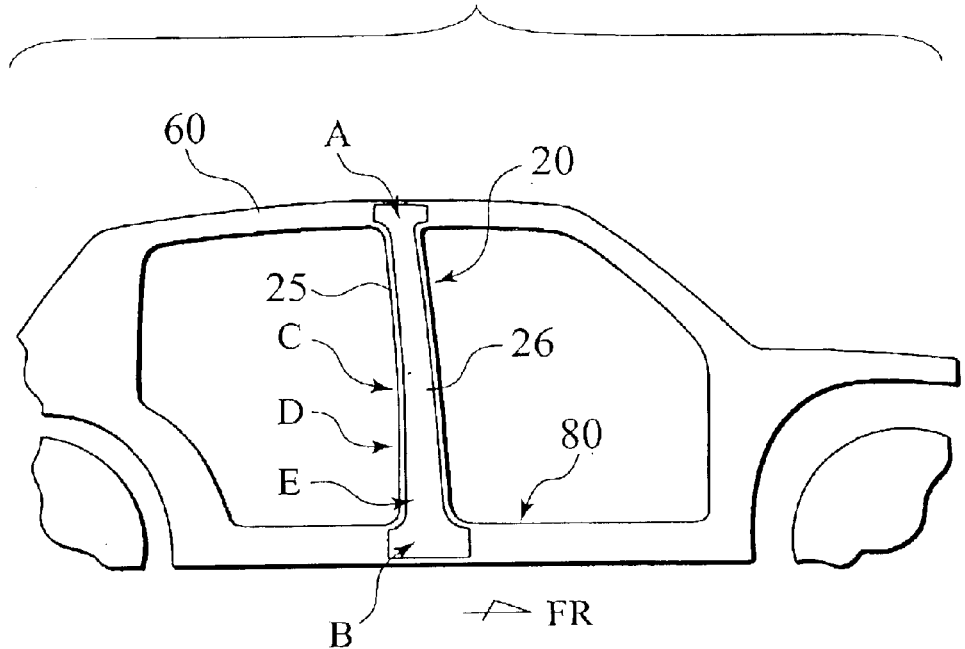
FIG. 70 is a side view of a vehicle equipped with a center pillar in a first modification of the fifth embodiment.

FIG. 69 illustrates an effect brought by the above dispersion of peak in the deformation mode. From the figure, it will be understood that since the position of the peak of the outer member (11, 12) is deviated from the positions of the peaks of the reinforcement 13, a peak in the deformation mode as a whole is dispersed to lower a deformation level of the front pillar 10, as shown with a line ($a_i$) in the figure. Accordingly, it is possible to enhance the reinforcing effect in the front pillar 10 without increasing the plate thicknesses of the outer member (11, 12) and the reinforcement 13 or installing another reinforcing member, improving the performance of the vehicle against collision.

Actually, there is a case that the outer member (11, 12) has to be provided with a weakened part (point C) for reasons of molding the vehicle body. In even a case, by forming weakened parts (D, E) in optional positions on the reinforcement 13 on consideration of the concept of the deformation-mode adjusting mechanism 500 of the fifth embodiment, it is possible to adjust the positions of peaks in both buckling-mode waveforms of the outer member 10 and the reinforcement 13 easily.

Noted that the outer member (11, 12) is different from the reinforcement 13 in terms of the number of peaks of deformation in the above-mentioned embodiment. In the modification, it is also possible to establish respective different positions of peaks of the outer member (11, 12) and the reinforcement 13 in spite of the same number of peaks therebetween and additionally, it is possible to establish the respective numbers of peaks of both elements (11, 12, 13) so as to accord with required properties.

(1st. Modification)

FIGS. 70 to 75B show the first modification of the fifth embodiment of the present invention. According to the first modification, the reinforcing structure on the concept of the fifth embodiment is applied to the center pillar 20.

As mentioned before, the center pillar 20 is connected, at its upper end at the point A, with the roof side rail 60 and also connected, at the lower end at the point B, with the side sill 80.

The center pillar 20 includes an outer member 25 having a hollow (closed) section and a reinforcement 26 arranged in the outer member 25 to extend from the upper end A to the lower end B.

Although it is generally known to construct the outer member 25 by spot-welding a frame member having a substantial hat-shaped section to a flat closing plate, the outer member 25 of this modification is formed by an extrusion of light metal, such as aluminum, having a hollow section. Similarly, the reinforcement 26 is also formed by an extrusion of the same light metal.

The outer member 25 is provided, on its upper and lower ends, with flange parts 25a which abut against the roof side rail 60 and the side sill 80 for welding. The reinforcement 26 is inserted into the hollow section of the outer member 25. Both upper and lower ends of the reinforcement 26 are arranged to penetrate the roof side rail 60 and the side sill 80, respectively. The upper end of the reinforcement 26 abuts against a butting face inside the roof side rail 60 through an upper flange part 26a for welding, while the lower end of the reinforcement 26 abuts against a butting face inside the side sill 80 through a lower flange part 26a for welding.

According to the embodiment, the waveform adjusting mechanism 500 is provided in each of the outer member 25 and the reinforcement 26 in order to make the different positions of respective peaks of the "buckling-mode" waveforms of the outer member 25 and the reinforcement 26.

Figure 71:
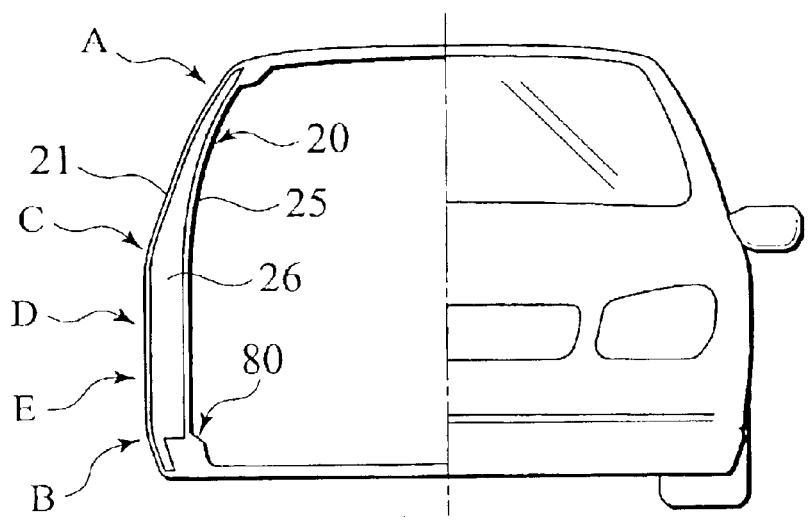
FIG. 71 is a half-sectional front view of the vehicle, showing a section of the center pillar of FIG. 70.
Figure 72:
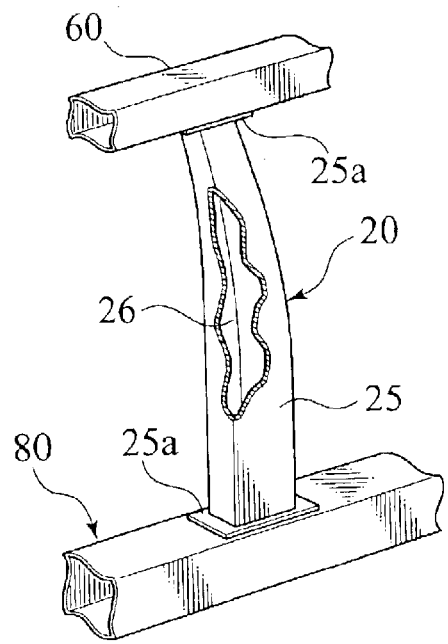
FIG. 72 is a schematic perspective view of the center pillar of FIGS. 70 and 71, including its partial section.
Figure 73:
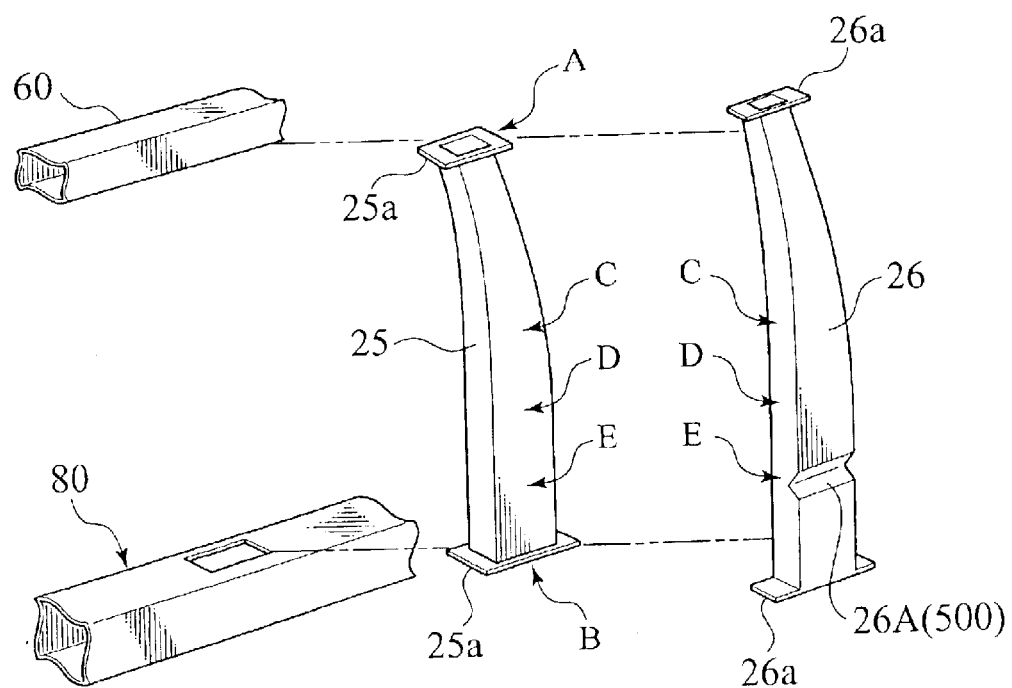
FIG. 73 is an exploded perspective view of FIG. 72.

In the pillar upper portion extending from the point A to the point C (C: general waist line of door) of FIG. 71, which corresponds to an arranging area of a not-shown side window, the outer member 25 is partially shaped so as to draw an outward arc, following the curved configuration of the side window. While, in the pillar lower part extending from the point C to the point B to support a not-shown door, the outer member 25 is shaped so as to be substantially perpendicular to the cabin floor 70 for reasons of the strength of the center pillar 20. Accordingly, the point C between the pillar upper portion and the pillar lower portion forms a substantial V-shaped bending part exhibiting a high resistance against a side collision.

Considering a situation that the other vehicle collides with the center pillar 20 by a flank collision, the position at the point D corresponding to the level of a bumper of the other vehicle or the engine can be regarded as a weakened part since the point D is in an intermediate position between the point C of high strength and the point B reinforced by the connection with the side sill 80, so that the outer member 25 produces the deformation mode having the point D as a peak of deformation. Thus, this weakened part at the point D forms the waveform adjusting mechanism 500 of the outer member 25.

On the other hand, the reinforcement 26 is provided, at a different position from the point D (e.g. one position close to the reinforced point B), with a bead 26A which forms the waveform adjusting mechanism 500 of the reinforcement 26.

Figure 74:
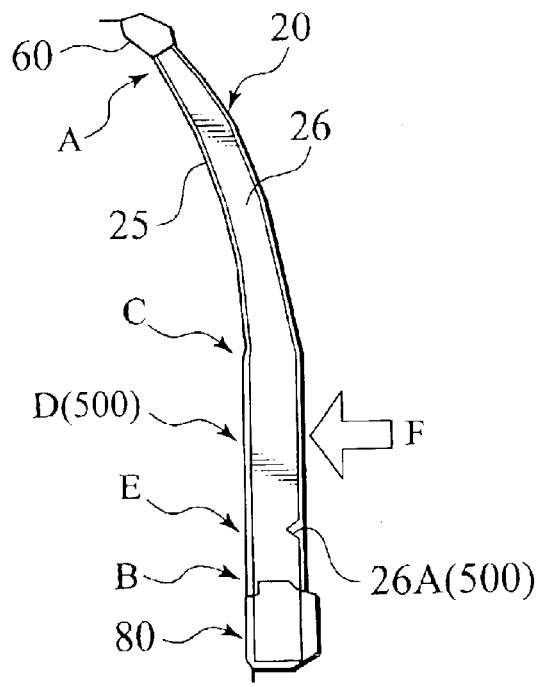
FIG. 74 is a longitudinal sectional view of the center pillar of the first modification of the fifth embodiment.
Figure 75A:
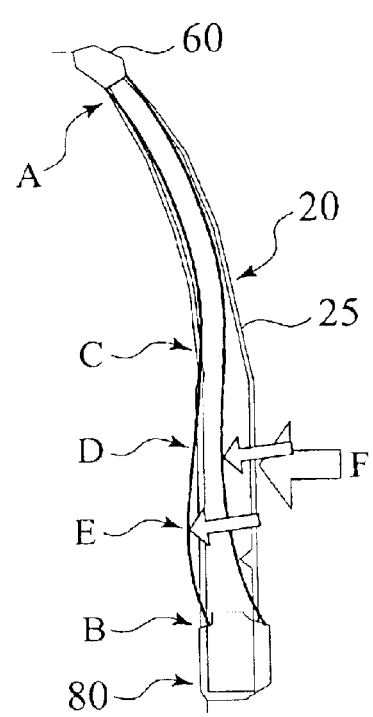
FIGS. 75A and 75B are longitudinal sectional views of the center pillar of the first modification of the fifth embodiment, explaining its deformation mode.
Figure 75B:
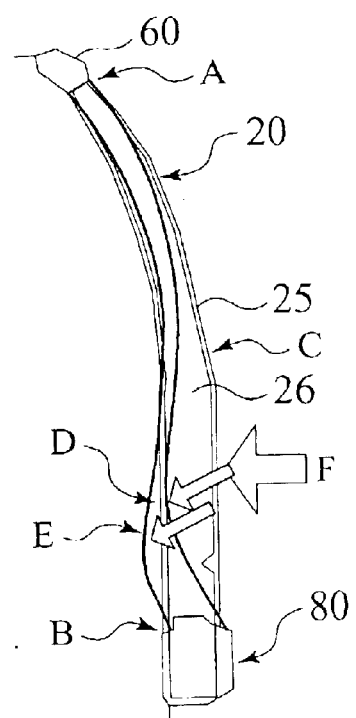
Figure 76:
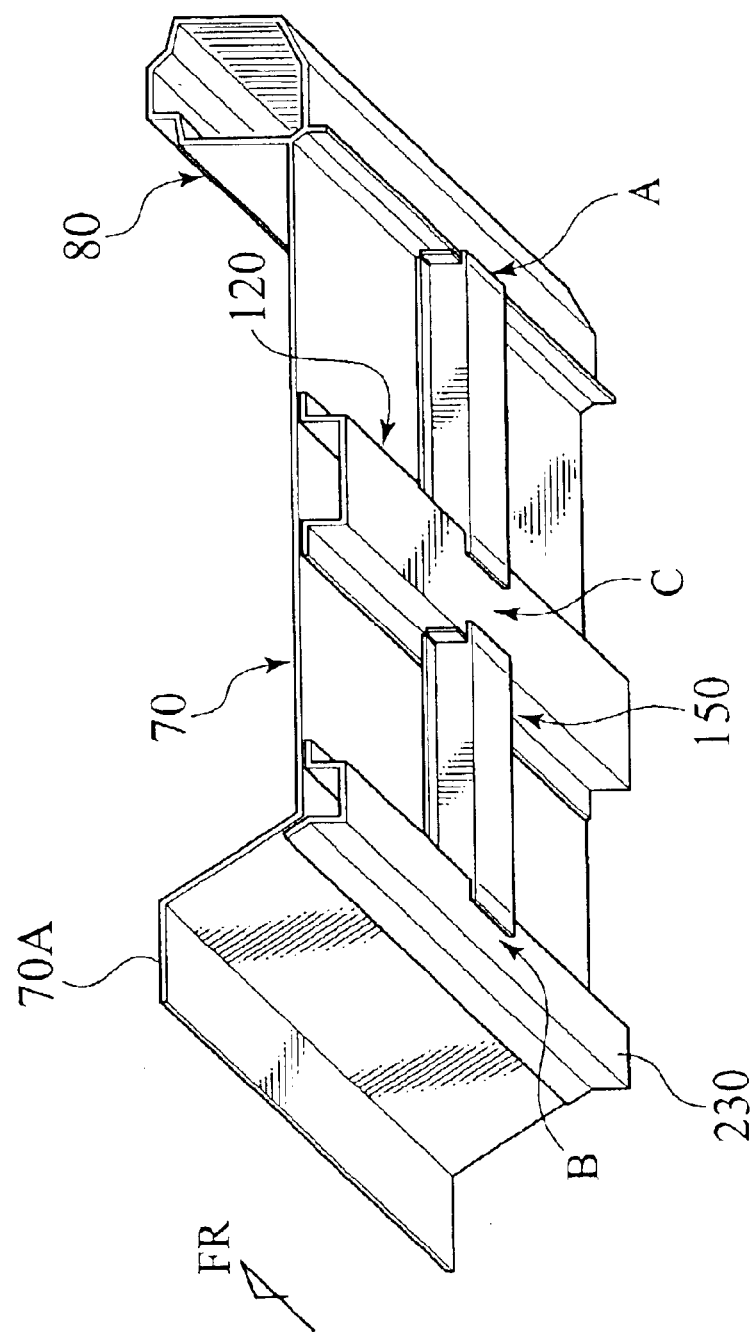
FIG. 76 is a perspective view of a floor framework member of the second modification of the fifth embodiment of the invention, also viewed from the underside of the floor framework member.
Figure 77:
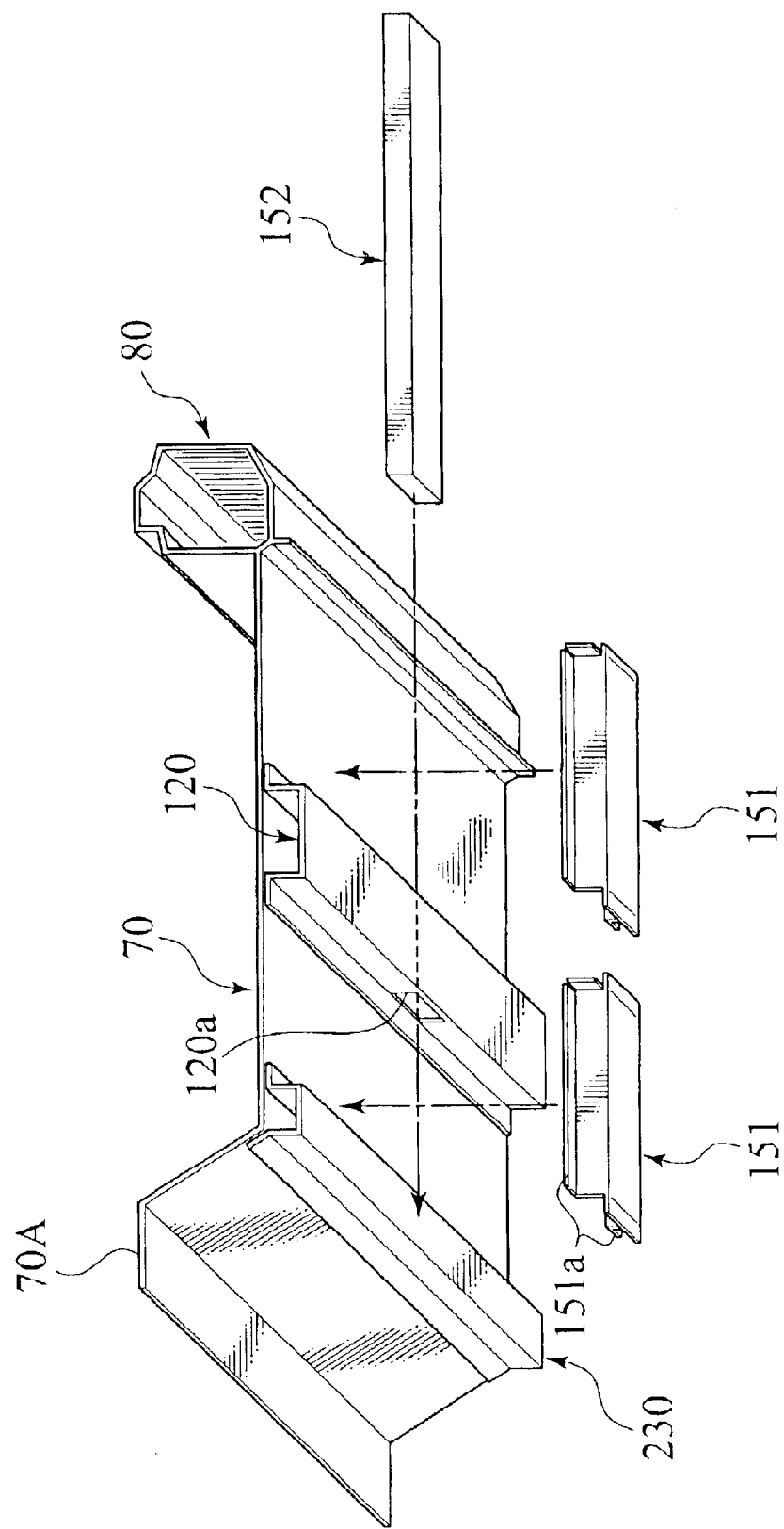
FIG. 77 is an exploded perspective view of FIG. 76.

FIGS. 74, 75A and 75B show the operation of the center pillar 20 of the first modification when it is subjected to an external force F by a side collision.

As mentioned before, when the other vehicle collides with the center pillar 20 by the side collision, the collision load F is exerted to the point D corresponding to the height of the bumper of the other vehicle, so that the outer member 25 is deformed in buckling with the point D as the peak of deformation.

On the other hand, the reinforcement 26 is deformed in buckling with the point E as the peak of deformation due to the bead 26A inducing the buckling deformation at the point E below the point D.

As a result, since the outer member 25 and the reinforcement 26 share the collision load independently of each other at the initial stage of deformation, it is possible to disperse the deformation into the whole center pillar 20. Thereafter, with the progress of deformation, the outer member 25 and the reinforcement 26 interfere with each other at the points D and E, so that the growth of a local deformation is restricted to take effect similar to that of the fifth embodiment.

As shown in FIG. 75A, with the input of the side collision load F, the outer member 25 is deformed in buckling with the point D as the peak of deformation, while the reinforcement 26 is deformed in buckling with the point E as the peak of deformation. Noted that the deformation mode of the reinforcement 26 is inclined from the point D toward the peak position at the point E, as shown in FIG. 75B. Therefore, with the progress of deformation, the peak position of the outer member 25 is moved down toward the point E along the inclination of the reinforcement's wall near its peak position (the point E), in process of the growth of deformation of the outer member 25. As a result, the peak position of the outer member 25 approaches the reinforced point B.

Here noted, the side sill 80 is one of the strongest framework members in various frames forming the vehicle body and also exhibits a high strength for torsion. Therefore, since the peak point D of the outer member 25 approaches the side sill 80 with the progress of buckling, the increasing of resistance force can be expected by the side sill 80.

In this way, according to the first modification, even when the peak position (the point D) of the outer member 25 is apart from the reinforced point B reinforced in the relationship with the other vehicle at the side collision, it is possible to establish a peak-position adjusting mechanism for allowing the peak position (the point D) of the outer member 25 to approach the reinforced point B by positioning the peak position (the point E) of the reinforcement 26 between the points B and D and also adjacent to the point B. Then, this peak-position adjusting mechanism is formed by the reinforcement's wall that has been deformed and inclined in the vicinity of the peak (the point E) of the reinforcement 26. Owing to the provision of the peak-position adjusting mechanism, it is possible to enhance an effect to restrict the deformation of the center pillar 20 furthermore.

Furthermore, since the peak-position adjusting mechanism is formed by the reinforcement's wall, the vehicle equipped with the center pillar constructed above is effective in manufacturing cost.

(2nd. Modification)

FIGS. 76 to 80 show the second modification of the fifth embodiment of the present invention.

The rear end of the aforementioned front side member 110 is arranged to extend along the slanted toe-board face of the dash panel 130 and below the underface of the floor panel 70, thereby forming the side member extension 120 having a closed section. The floor panel 70 is provided, at its center part in the width direction, with a tunnel part 70A. Along a lower ridgeline forming the base of the tunnel part 70A, a tunnel member 230 having a substantial hat-shaped section is welded to the floor panel 70 to extend in the fore-and-aft direction of the vehicle.

Under the floor panel 70, the floor cross members 150 are arranged to extend between the side sill 80 and the tunnel member 230 in the width direction of the vehicle, perpendicularly to the side member extension 120.

The above floor framework members are formed by the side sill 80, the side member extension 120, the floor cross member 150, the tunnel member 140, etc.

According to the second modification of the fifth embodiment, the reinforcing structure on the concept of the fifth embodiment is applied to one of the floor framework members, above all, the floor cross member 150.

The floor cross member 150 includes an outer member 151 welded to the underface of the floor panel 70 through flange parts 151a to form a hollow (closed) section, and a reinforcement 152 arranged in the outer member 151 to extend in the width direction of the vehicle.

In order to transmit and disperse a load inputted by a vehicle front collision to the rear part of a vehicle cabin, the side member extension 120 is required to have a structure succeeding in the fore-and-aft direction of the vehicle.

Therefore, the outer member 151 of the floor cross member 150 is divided into two pieces, at the point C intersecting with the side member extension 120. These pieces are connected with opposing lateral sides of the side member extension 120.

While, the reinforcement 152, which is made from hard urethane material in this modification, is in the form of a continuous body extending from one joint point A (FIG. 78) with the side sill 80 to another joint point B with the tunnel member 230.

Therefore, the side member extension 120 is provided, on both sidewalls thereof, with through holes 120a which allow the passage of the reinforcement 152 through the side member extension 120.

At the above points A and B, the reinforcement 152 is connected to the side sill 80 and the tunnel member 230 by means of adhesive etc. While, the reinforcement 152 is not welded to the outer member 151, thereby defining a slight clearance therebetween.

Although the reinforcement 152 is made from hard urethane material in the second modification, of course, it may be formed by a panel having a substantial hat-shaped section, as similar to the outer member 151. Further, hollow extrusions of aluminum alloy etc. may be employed as respective materials of the outer member 151, the reinforcement 152, the side member extension 120 and the tunnel member 230.

Figure 78:
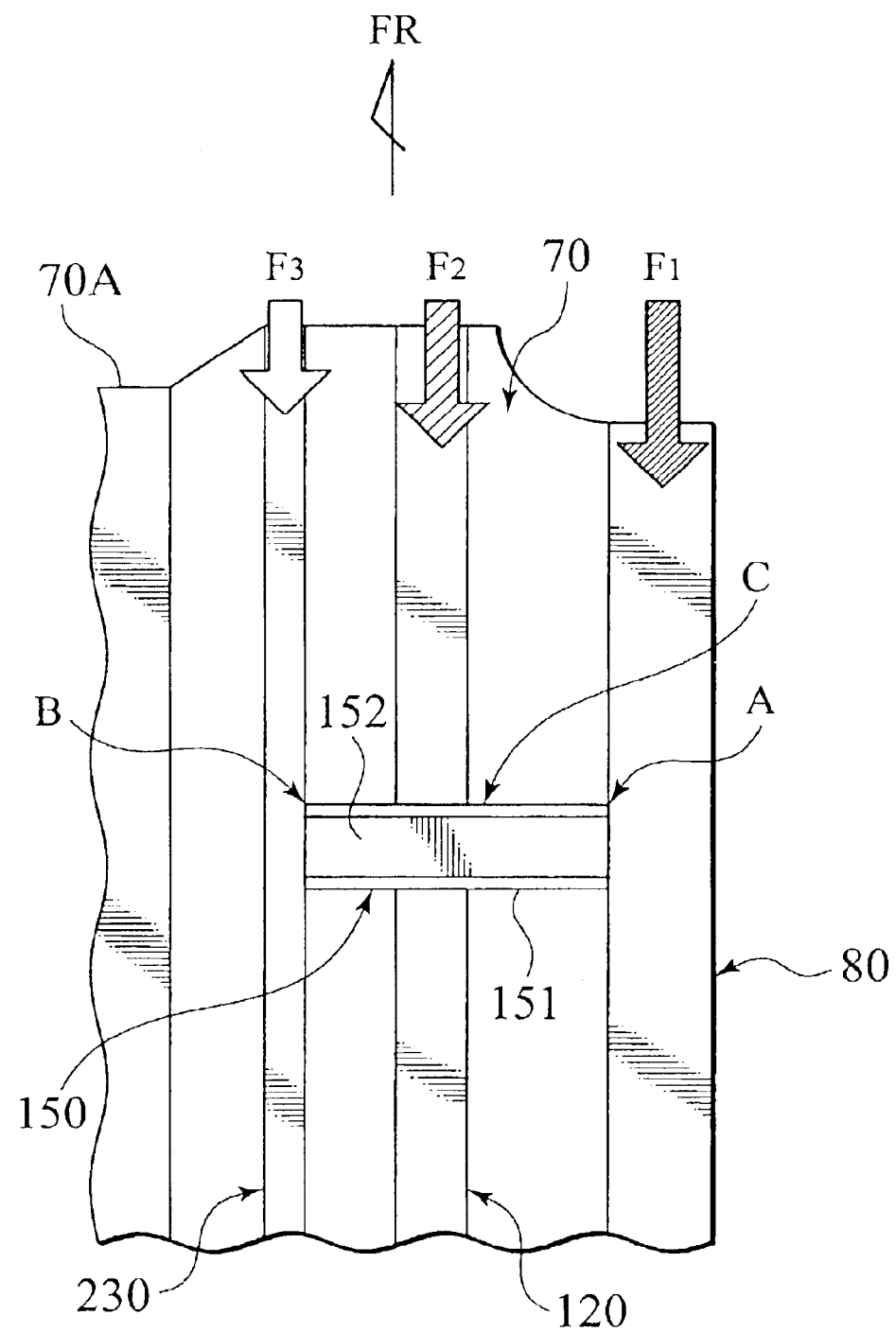
FIG. 78 is a bottom view of the floor framework member of FIG. 76.

FIG. 78 shows the operation of the floor cross member 150 when it is subjected to an external force F by an oblique offset collision at the front face of a vehicle.

At the oblique offset collision, collision loads $F_1$, $F_1$ and $F_3$ whose magnitude is gradually decreased in order are exerted to the side sill 80, the side member extension 120 and the tunnel member 230, respectively.

Therefore, the outermost side sill 80 has a great level of deformation in the fore-and-aft direction of the vehicle, while the innermost tunnel member 230 has a small level of deformation in the same direction. As a result, there is produced a deformation where the vehicle floor is inclined sideways.

Figure 79:
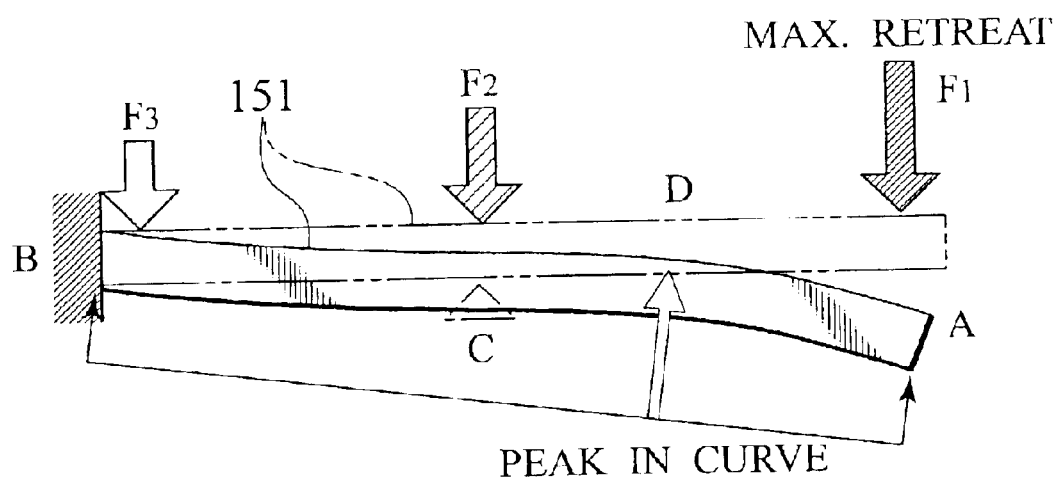
FIG. 79 is a view explaining the deformation mode of an outer member forming a floor cross member of the second modification of the fifth embodiment.
Figure 80:
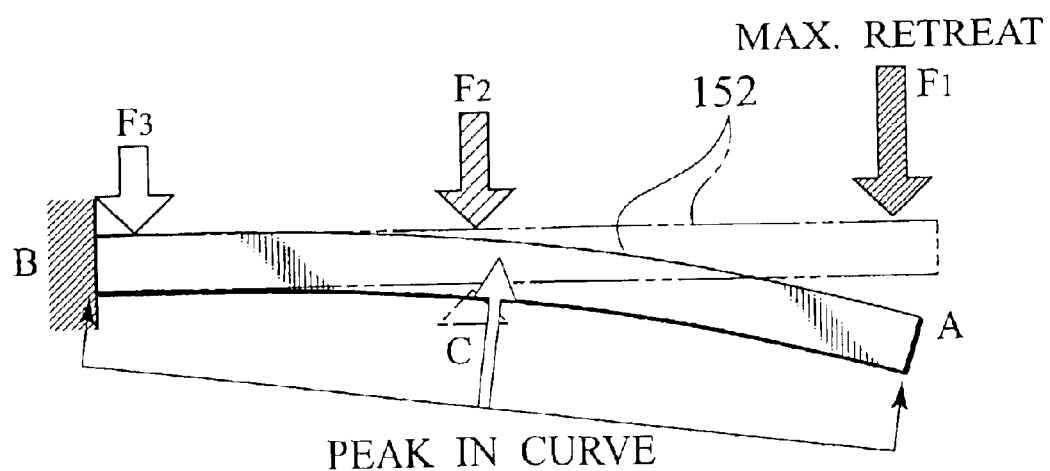
FIG. 80 is a view explaining the deformation mode of an outer member forming a reinforcement of the second modification of the fifth embodiment.

FIG. 79 illustrates the deformation mode of the outer member 151, while FIG. 80 illustrates the deformation mode of the reinforcement 152.

As shown in FIG. 79, the outer member 151 is subjected to a bending deformation including the joint point C intersecting with the side member extension 120, as a bearing end of the member 151. Then, the joint point A of the outer member 151 with the side sill 80 constitutes a maximum retreating position in view of the body standard of the vehicle. In view of a reference line which connects the point A with the point B of the outer member 151, however, the position of a peak in such a curved deformation is formed by a point D in the substantial middle of a span from the point A to the point C.

In the reinforcement 152, similarly, the joint point A constitutes a maximum retreating position in view of the body standard of the vehicle. However, since the bearing end on the opposite side is identical to the point B, the position of a peak in a curved deformation in view of a reference line which connects the point A with the point B is formed by the point C in the substantial middle of a span from the point A to the point B Consequently, the positions of peaks in the deformation mode of the composite of the outer member 151 and the reinforcement 152 have the point D and the point C shifted from each other in the width direction of the vehicle, so that the deformation is dispersed to all over the floor cross member 150, whereby its deformation, above all, the deformation of the floor panel 70 can be restricted.

Thus, according to the second modification of the fifth embodiment, the above-mentioned structure, it is possible to take reinforcing effect suitable for the floor cross member 150 without providing the outer member 151 and the reinforcement 152 with new constituents (e.g. bead) of the waveform adjusting mechanism 500 (e.g. bead).

Finally, it will be understood by those skilled in the art that the foregoing descriptions are nothing but some embodiments of the disclosed reinforcing structure for the body frame of the vehicle. Besides these embodiments, various changes and modifications may be made to the present invention without departing from the spirit and scope of the invention.

Japanese patent applications No. 2002-7903 (filed on Jan. 16, 2002), No. 2002-54410 (Feb. 28, 2002), No. 2002-115136 (Apr. 17, 2002), No. 2002-120716 (Apr. 23, 2002), No. 2002-120714 (Apr. 23, 2002) are expressly incorporated herein by reference in its entirety.

The scope of the invention is defined with reference to the following claims.

What is claimed is:

1. A reinforcing structure for a body frame of a vehicle, comprising:

a hollow outer member arranged on an exterior side of the vehicle;

a reinforcement arranged inside the outer member to extend in the longitudinal direction of the outer member; and a waveform adjusting mechanism for adjusting respective peaks of waveforms in the buckling mode of the outer member and the reinforcement.

2. The reinforcing structure for a body frame of a vehicle, comprising:

a hollow outer member arranged on an exterior side of the vehicle;

a reinforcement arranged inside the outer member to extend in the longitudinal direction of the outer member; and a waveform adjusting mechanism for adjusting respective peaks of waveforms in the buckling mode of the outer member and the reinforcement, wherein the reinforcement is connected to the outer member a part other than a minimum strength part of the outer member, and the waveform adjusting mechanism includes a relief space which is formed between the minimum strength part of the outer member and the reinforcement to relieve bending deformations thereof.

3. The reinforcing structure of claim 2, wherein the minimum strength part of the outer member comprises its changing part in terms of a secondary moment of the outer member which is formed by a plurality of panel member welded each other, and the reinforcement inside the outer member is welded to the outer member, at a part other than the minimum strength part of the outer member.

4. The reinforcing structure of claim 2, wherein the minimum strength part of the outer member comprises an inflection point in the exterior appearance of the outer member which is formed by a pipe member, and the reinforcement inside the outer member is pressed and connected to the outer member, at a part other than the minimum strength part of the outer member.

5. The reinforcing structure of claim 2, wherein the minimum strength part of the outer member comprises an opening formed in the outer member, and the reinforcement inside the outer member is welded to on the outer member, at a part other than the minimum strength part of the outer member.

6. The reinforcing structure of claim 2, wherein the minimum strength part of the outer member comprises a weakened part provided in the outer member, and the reinforcement inside the outer member is connected to on the outer member, at a part other than the minimum strength part of the outer member.

7. The reinforcing structure of claim 2, wherein an overall shape of the reinforcement is shaped with a different curvature from a curvature of the outer member thereby defining a physical clearance between the outer member and the reinforcement, in the vicinity of the minimum strength part of the outer member, thereby forming a relief space for bending deformation.

8. The reinforcing structure of claim 2, wherein only a part of the reinforcement is connected to the outer member thereby defining a dynamic relief space between the outer member and the reinforcement.

9. The reinforcing structure of claim 2, wherein the reinforcement inside the outer member is formed with a closed cross section and also adapted in a manner that a direction to facilitate deformation of the closed cross section agrees with a bending direction of the outer member thereby defining a dynamic relief space between the outer member and the reinforcement.

10. The reinforcing structure of claim 2, wherein the reinforcement inside the outer member is provided, at a position except the minimum strength part of the outer member, with a weakened part.

11. The reinforcing structure for a body frame of a vehicle, comprising:

a hollow outer member arranged on an exterior side of the vehicle;

a reinforcement arranged inside the outer member to extend in the longitudinal direction of the outer member; and a waveform adjusting mechanism for adjusting respective peaks of waveforms in the buckling mode of the outer member and the reinforcement, wherein the waveform adjusting mechanism is adapted so as to establish the number of peaks of a waveform in the buckling mode of the outer member to be different from the number of peaks of a waveform in the buckling mode of the reinforcement.

12. The reinforcing structure for a body frame of a vehicle, comprising:

a hollow outer member arranged on an exterior side of the vehicle;

a reinforcement arranged inside the outer member to extend in the longitudinal direction of the outer member; and a waveform adjusting mechanism for adjusting respective peaks of waveforms in the buckling mode of the outer member and the reinforcement, wherein the waveform adjusting mechanism is adapted in a manner that, when the number of peaks of a waveform in the buckling mode of either one of the outer member and the reinforcement is equal to n, the number of peaks of a waveform in the buckling mode of the other one is set to n+1.

13. The reinforcing structure of claim 12, wherein the waveform adjusting mechanism includes at least one inflection point formed on the contour of at least either one of the outer member and the reinforcement.

14. The reinforcing structure of claim 12, wherein the waveform adjusting mechanism includes at least one changing part in terms of sectional shape of at least either one of the outer member and the reinforcement.

15. The reinforcing structure of claim 12, wherein the waveform adjusting mechanism includes at least one changing part in terms of strength of at least either one of the outer member and the reinforcement.

16. The reinforcing structure of claim 15, wherein the changing part of the strength comprises a weakened part in comparison with the other part of at least either one of the outer member and the reinforcement.

17. The reinforcing structure of claim 15, wherein the changing part of the strength comprises a reinforced part in comparison with the other part of at least either one of the outer member and the reinforcement.

18. The reinforcing structure of claim 11, wherein the number of peaks of the waveform in the buckling mode of the outer member and the number of peaks of the waveform in the buckling mode of the reinforcement are respective prime numbers.

19. The reinforcing structure of claim 18, wherein either one of the number of the peaks of the outer member and the number of peaks of the reinforcement is an even number, and the other of the number of the peaks of the outer member and the number of peaks of the reinforcement is an odd number.

20. The reinforcing structure of claim 18, wherein the waveform adjusting mechanism includes at least one changing part in terms of a strength, which is formed in the outer member.

21. The reinforcing structure of claim 18, wherein the waveform adjusting mechanism includes at least one weakened part which is formed in the reinforcement.

22. The reinforcing structure of claim 18, wherein the peaks of the waveform in the buckling mode of the outer member are arranged between both ends thereof and the peaks of the waveform in the buckling mode of the reinforcement are arranged between both ends thereof.

23. The reinforcing structure of claim 18, wherein the outer member is connected with a plurality of other framework members of the vehicle, and the peaks of the waveforms in the buckling mode of the outer member and the reinforcement are arranged within an area between contact points of the outer member with the framework members.

24. The reinforcing structure of claim 18, wherein the number of peaks of the waveform in the buckling mode of the outer member is smaller than the number of peaks of the waveform in the buckling mode of the reinforcement.

25. The reinforcing structure of claim 11, wherein the number of peaks of the waveform in the buckling mode of the reinforcement is more than twice the number of peaks of the waveform in the buckling mode of the outer member.

26. The reinforcing structure of claim 25, wherein the waveform adjusting mechanism is provided in the reinforcement.

27. The reinforcing structure of claim 25, wherein the waveform adjusting mechanism is provided in the outer member.

28. The reinforcing structure of claim 25, wherein respective positions of the peaks of the reinforcement are concentrated closer to one longitudinal end of the reinforcement than positions the peaks of the outer member, the one reinforcement's end being closer to a collision load inputted than the other longitudinal end of the reinforcement.

29. The reinforcing structure of claim 25, wherein the waveform adjusting mechanism includes at least anyone of a weakened part formed on the reinforcement, a changing part in strength formed on the reinforcement and an inflection point in the exterior appearance of the reinforcement.

30. The reinforcing structure of claim 25, wherein the waveform adjusting mechanism includes at least either one of a weakened part formed on the outer member, a changing part in strength formed on the outer member and an inflection point in the exterior appearance of the outer member.

31. The reinforcing structure of claim 25, wherein the outer member is provided with a deformation control mechanism which controls the deformation of the outer member so that the peak of the waveform in the buckling mode grows in a predetermined direction.

32. The reinforcing structure for a body frame of a vehicle, comprising:
a hollow outer member arranged on an exterior side of the vehicle;
a reinforcement arranged inside the outer member to extend in the longitudinal direction of the outer member; and
a waveform adjusting mechanism for adjusting respective peaks of waveforms in the buckling mode of the outer member and the reinforcement,
wherein the waveform adjusting mechanism is adapted so as to establish the positions of the peaks of the waveform in the buckling mode of the outer member and the positions of the peaks of the waveform in the buckling mode of the reinforcement to be different from each other.

33. The reinforcing structure of claim 32, wherein the waveform adjusting mechanism is provided in the reinforcement.

34. The reinforcing structure of claim 32, wherein the waveform adjusting mechanism is provided in the outer member.

35. The reinforcing structure of claim 32, further comprising a framework member connected to the outer member, wherein the waveform adjusting mechanism is arranged close to a connecting part of the outer member in connection with the framework member.

36. The reinforcing structure of claim 32, further comprising a framework member connected to the outer member, wherein the waveform adjusting mechanism is provided in each of the outer member and the reinforcement, and one waveform adjusting mechanism is arranged close to a connecting part of the outer member in connection with the framework member, while the other waveform adjusting mechanism is arranged apart from the connecting part.

37. The reinforcing structure of claim 33, wherein the waveform adjusting mechanism includes at least one weakened part which is formed in the reinforcement.

38. The reinforcing structure of claim 34, wherein the waveform adjusting mechanism includes at least one weakened part which is formed in the outer member.

39. The reinforcing structure of claim 32, wherein the waveform adjusting mechanism includes a peak-position adjusting mechanism for moving the positions of the peaks of the waveforms in the buckling mode of the outer member and the reinforcement.

40. The reinforcing structure of claim 39, wherein the peak-position adjusting mechanism is formed by either one of an outer member's wall close to the peak of the waveform of the reinforcement and a reinforcement's wall close to the peak of the waveform of the outer member.

41. A reinforcing structure for a body frame of a vehicle, comprising:
a hollow outer member arranged on an exterior side of the vehicle;
a reinforcement arranged inside the outer member to extend in the longitudinal direction of the outer member; and
means for adjusting respective peaks of waveforms in the buckling mode of the outer member and the reinforcement,
wherein the reinforcement is connected to the outer member at a part other than a minimum strength part of the outer member, and the adjusting means includes a relief space which is formed between the vicinity of the minimum strength part of the outer member and the reinforcement to relieve bending deformations thereof.

* * * * *